United States Patent
Schneider et al.

(10) Patent No.: US 8,861,554 B1
(45) Date of Patent: Oct. 14, 2014

(54) SYSTEMS AND METHODS FOR POWERING A SERVICE UNIT

(75) Inventors: Kevin W. Schneider, Huntsville, AL (US); Richard Goodson, Huntsville, AL (US); Steven M. Robinson, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 294 days.

(21) Appl. No.: 12/839,403

(22) Filed: Jul. 19, 2010

Related U.S. Application Data

(60) Provisional application No. 61/226,409, filed on Jul. 17, 2009.

(51) Int. Cl.
*H04M 19/00* (2006.01)

(52) U.S. Cl.
CPC .................... *H04M 19/00* (2013.01)
USPC ........... 370/546; 370/392; 370/400; 370/464; 370/466; 370/467

(58) Field of Classification Search
USPC .......... 370/392, 400, 464, 466, 467, 469, 474
See application file for complete search history.

(56) References Cited

U.S. PATENT DOCUMENTS

| | | | |
|---|---|---|---|
| 6,665,404 B2 | 12/2003 | Cohen | |
| 6,678,375 B1 * | 1/2004 | Henderson et al. | 379/397 |
| 7,031,465 B1 * | 4/2006 | Dibble et al. | 379/418 |
| 7,567,665 B2 * | 7/2009 | Nattkemper et al. | 379/413 |
| 2003/0123648 A1 | 7/2003 | Ashton et al. | |
| 2004/0017911 A1 * | 1/2004 | Nattkemper | 379/399.01 |
| 2005/0152385 A1 | 7/2005 | Cioffi | |
| 2006/0153229 A1 | 7/2006 | Cohen et al. | |
| 2008/0130688 A1 | 6/2008 | Polland | |
| 2009/0060531 A1 | 3/2009 | Biegert | |
| 2010/0074312 A1 * | 3/2010 | Cioffi et al. | 375/222 |
| 2010/0111523 A1 | 5/2010 | Hirth et al. | |
| 2010/0142689 A1 * | 6/2010 | Hansen et al. | 379/93.36 |

OTHER PUBLICATIONS

Sandstrom, U.S. Appl. No. 12/619,397, entitled, "Access Multiplexers and Methods for Multiplexing Telecommunication Signals Using an Arrayed Media Converter," filed Nov. 16, 2009.
Goodson, U.S. Appl. No. 13/178,243, entitled, "Systems and Methods for Extending Optical Network Services Across Non-Optical Channels," filed Jul. 7, 2011.
Genesis Technical Systems, "Bonded DSL Rings Quality of Service (QOS)," http://www.genesistechsys.com/documents/GENESIS_Bro2007.pdf.
Genesis Technical Systems, "Technology," http://www.genesistechsys.com/tech.html.

(Continued)

*Primary Examiner* — Dang Ton
*Assistant Examiner* — Robert M Morlan
(74) *Attorney, Agent, or Firm* — Maynard Cooper & Gale, P.C.; Jon E. Holland

(57) ABSTRACT

The present disclosure generally pertains to systems and methods for powering service units. A service unit has a plurality of first transceivers coupled to a plurality of customer premises (CP) transceivers via drop connections, and each of the drop connections is coupled to a respective one of the CP transceivers. The service unit has forwarding logic that is configured to forward data packets to the first transceivers. The service unit further has a power management unit configured to receive electrical power from at least one of the drop connections and to power at least one component of the service unit based on the received electrical power.

27 Claims, 29 Drawing Sheets

(56) References Cited

OTHER PUBLICATIONS

IP Television Magazine, "Profitable IPTV with DSL Rings," http://www.iptvmagazine.com/2009_06/IPTVMagazine_2009_06_Profitable_IPTV_with_DSL_Rings.html.

Cioffi, et al., "CuPon: the Copper Alternative to PON 00 Gb/s DSL Networks," IEEE Communications Magazine, Jun. 2007, pp. 132-139.

Odling, et al., "The Fourth Generation Broadband Concept," IEEE Communications Magazine, Jan. 2009, pp. 63-69.

Schneider, et al., U.S. Appl. No. 12/839,402, entitled, "Communcation Systems and Methods for Using Shared Channels to Increase Peak Data Rates," filed Jul. 19, 2010.

Ko, et al., U.S. Appl. No. 12/839,400, entitled, "Systems and Methods for Communicating with Multiple Distribution Points of a Network," filed Jul. 19, 2010.

* cited by examiner

SYSTEMS AND METHODS FOR POWERING A SERVICE UNIT

CROSS REFERENCE TO RELATED APPLICATION

This application claims priority to U.S. Patent Application No. 61/226,409, entitled "Communication Systems and Methods," and filed on Jul. 17, 2009, which is incorporated herein by reference.

RELATED ART

Telecommunication services have historically been delivered over the "last mile" (between a local exchange and the customer premises) over copper cable facilities. To support high-speed data services over these facilities, service providers employ digital communication links, such as Asymmetric Digital Subscriber Line (ADSL) or other similar technologies over these copper facilities. A characteristic of DSL and the copper channel is that the achievable data rate decreases as the length of the copper pair increases. Therefore, to offer higher data rates, service providers have shortened the effective length of the copper pair by moving the service provider transceiver of the DSL link from the exchange to an intermediate point in the cable and using a shared fiber-optic facility to transport the signals between the exchange and the intermediate point (or node).

Despite increases in data rates enabled by shortening the length of the copper facilities, the peak data rates for DSL services fall below those offered by Data Over Cable Service Interface Specification (DOCSIS) services. In this regard, a DOCSIS system uses coaxial cable, which permits a much higher peak data rate for a given subscriber than that available via conventional DSL over copper facilities. However, the coaxial cable is shared among many customers such that the actual data rate provided to a particular customer, depending on the number of customers actively communicating via the DOCSIS system, is often much less and, at times, below the data rates afforded by DSL. Nevertheless, in competing for customers, the provider of a DOCSIS system often touts the peak data rates afforded by the DOCSIS system without focusing on the fact that the channel is shared and the average data rate, therefore, decreases as more and more customers become active.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for powering service units residing at a distribution point or other intermediate point between a network facility and a plurality of customer premises transceivers. In one exemplary embodiment, a service unit has a plurality of first transceivers coupled to a plurality of customer premises (CP) transceivers via drop connections, and each of the drop connections is coupled to a respective one of the CP transceivers. The service unit has forwarding logic that is configured to forward data packets to the first transceivers. The service unit further has a power management unit configured to receive electrical power from at least one of the drop connections and to power at least one component of the service unit based on the received electrical power.

In one exemplary embodiment, a system has a high-speed channel, such as an optical fiber, between a network facility, such as a central office (CO), and a first intermediate point between the network facility and a plurality of customer premises (CP). Digital communication links, such as DSL links, are used to carry data between the first intermediate point, such as a feeder distribution interface (FDI), and a second intermediate point, such as the Distribution Point (DP). Non-shared links may then carry the data from the second intermediate point to the CPs. The links between the two intermediate points are bonded to create a high-speed, shared data channel that permits peak data rates much greater than what would be achievable without channel sharing. For example, if there is only one customer active during a particular time period, then all of the capacity of the bonded channel is used to service such customer permitting a relatively high peak data rate for the customer. As more customers become active or, in other words, actively communicate via the bonded channel, the capacity of the channel is divided among the active customers. In such case, each customer's average data rate is below the peak data rate afforded by the system, but each active customer nevertheless benefits by the idleness of the other customers who are not actively communicating. Moreover, by enabling greater peak data rates, the system can be more competitive with other communication systems, such as DOCSIS systems, which enable relatively high peak data rates as described above.

Figure 1:
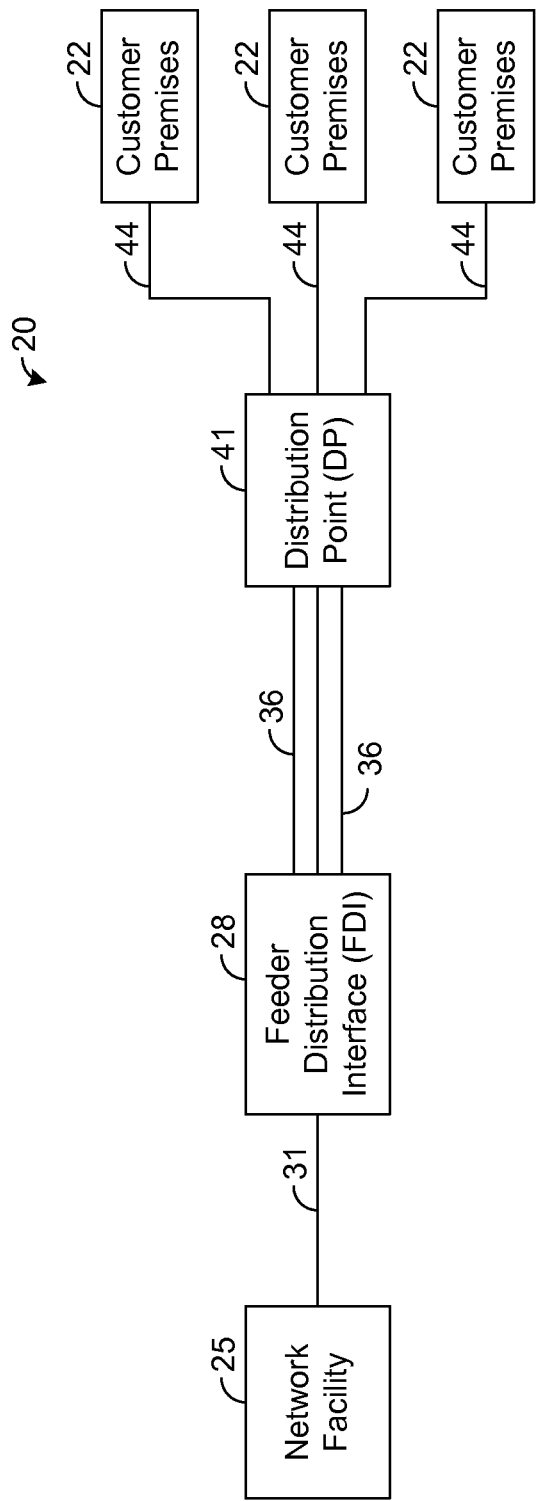
FIG. 1 is a block diagram illustrating a conventional communication system.

FIG. 1 depicts a conventional system 20 for communicating data between a plurality of customer premises 22 and a network facility 25, such as a central office. An optical fiber 31 extends from the network facility 25 to a feeder distribution interface (FDI) 28. The optical fiber 31 provides a high-speed channel that carries data for a plurality of customer premises 22. Equipment at the FDI 28 demultiplexes data from the optical fiber 31 onto a plurality of connections 36, such as twisted-wire pairs, that extend to a distribution point (DP) 41. The FDI equipment multiplexes data in the reverse path from the communication connections 36 onto the optical fiber 31. In this conventional system, there is generally a one-to-one correspondence between a twisted-wire pair running from the FDI 28 to the DP 41 and a twisted-wire pair running from the DP 41 to a customer premises 22, and there is no bonding between the FDI 28 and the DP 41 in the system 20 shown by FIG. 1. In some cases when multiple subscriber lines extend to the same customer premises 22, the links extending from an intermediate point, such as the FDI 28, to such customer premises 22 may be bonded, but such bonded links are not shared by multiple subscribers.

As shown by FIG. 1, the DP 41 is coupled to at least one customer premises 22 via at least one conductive connection 44, such as a twisted-wire pair. The physical connection 44 from the DP 41 to a customer premises 22 is typically referred to as a "drop wire" or a "drop connection." The length of a drop connection 44 is usually short, about 500 feet or less.

The portion of the system 20 from the network facility 25 to the FDI 28 is referred to as the "feeder plant," and the portion of the system 20 from the FDI 28 to the DP 41 is referred to as the "distribution plant." DSL (e.g., Asymmetric DSL (ADSL), Single-pair High-speed DSL (SHDSL), or Very-high-speed DSL (VDSL)) or other modulation techniques and protocols may be employed between the FDI 28 and the customer premises 22.

When DSL is employed between the FDI 28 and customer premises 22, the element that multiplexes data from the DSL links onto a fiber link (and demultiplexes the reverse path) is often referred to as a DSL Access Multiplexer (DSLAM). The DSLAM often performs some level of concentration. In this regard, the data rate on the fiber optic link often is less than the sum of the data rates on all of the DSL links, and the DSLAM uses statistical multiplexing of data packets (either variable length frames or fixed length frames often referred to as cells) to combine (or separate, depending on the direction the data is being transmitted) the different data streams from (or to) their respective DSL links.

There are some natural preferred locations for the DSLAM due to the design of the existing copper infrastructure. In this regard, there are often wiring terminals located at the junction between the feeder plant and the distribution plant (i.e., the FDI 28) and at the junction between the distribution plant and the drop wire (i.e., the DP 41) that provide access to the individual pairs, allowing individual pairs from one section to be connected to the other. These terminals also provide a natural location for the intermediate point DSLAM because of the ease of accessing the individual pairs to inject the DSL signal. When a fiber-fed DSLAM is located at the FDI 28, the architecture is often referred to as fiber-to-the-node (FTTN), and when the DSLAM is located at the DP 41, the architecture is often referred to as fiber-to-the-curb (FTTC). Note that the junction between the distribution and the drop goes by several names around the world, and terms other than the "distribution point" may be used to describe such junction. Note also that the junction between the feeder plant and the distribution goes by several names around the world, and terms other than the "feeder distribution interface" may be used to describe such junction.

FTTC architectures offer more flexibility in the technology and modulation format used in the digital transceiver because a drop cable often only contains pairs destined for a single customer premises. Because spectrum compatibility with signals to other customer premises is not required, it is often possible to use transceivers with lower complexity, cost, and power consumption than might be required in a FTTN architecture. In addition, the short length of the drop wire (typically about 500 feet or less) allows for a high data rate, potentially in excess of 100 Megabits per second (Mbps) in each direction. FTTC architectures have been deployed using ADSL links, VDSL links and 10BASE-T Ethernet links in the past.

Figure 2:
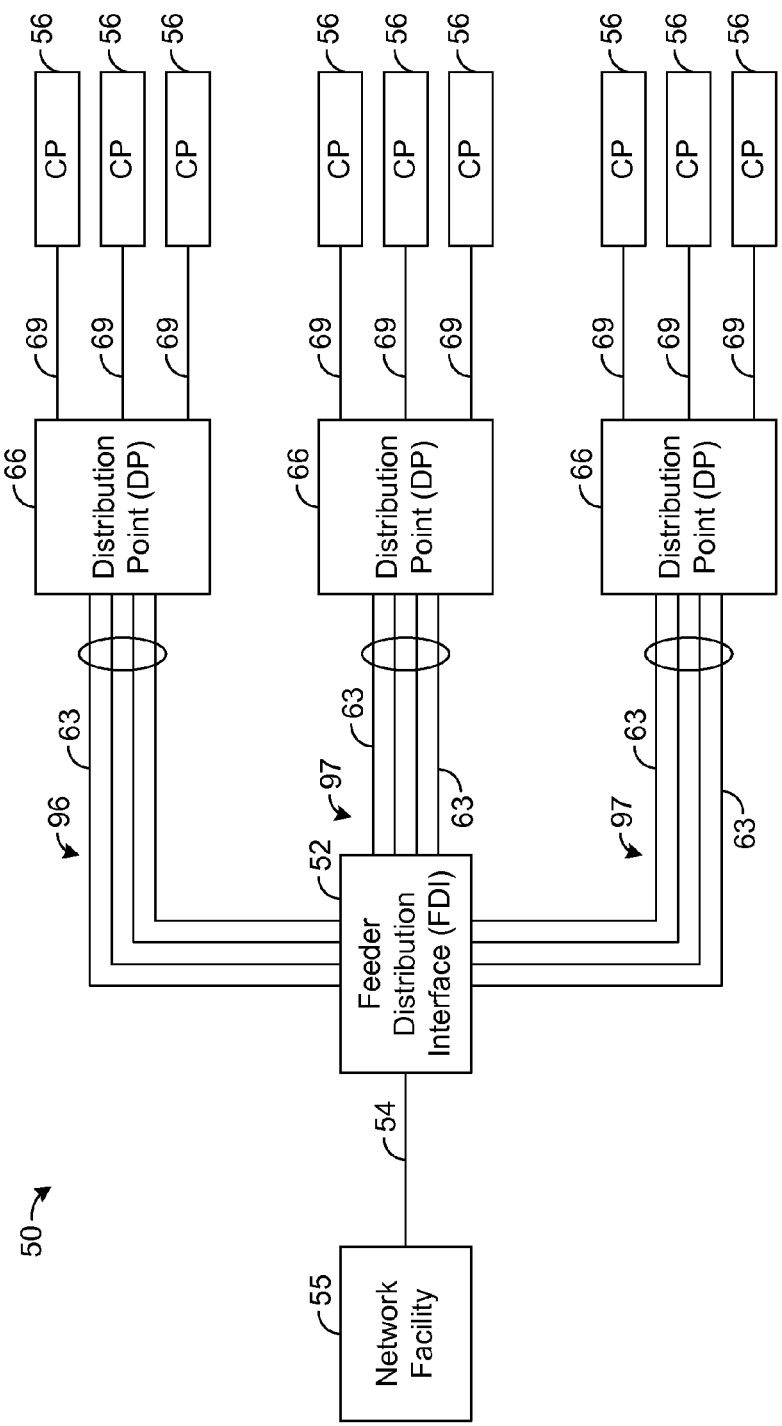
FIG. 2 is a block diagram illustrating an exemplary embodiment of a communication system in accordance with the present disclosure.

However, FTTC architectures require the installation of substantially more fiber routes than FTTN architectures. Thus, FTTN architectures have substantial cost saving benefits when working in a "brownfield" environment, where copper cable is already installed in the distribution plant FIG. 2 depicts an exemplary embodiment of a communication system 50 that has an FTTN architecture and provides relatively high peak data rates. Similar to the conventional system 20, the system 50 shown by FIG. 2 has a feeder distribution interface (FDI) 52 that is coupled to an optical fiber 54 extending from a network facility 55, such as a central office. The optical fiber 54 provides a high-speed channel that carries data for a plurality of customer premises 56. The FDI 52 demultiplexes data from the optical fiber 31 onto a plurality of conductive connections 63, such as twisted-wire pairs, that extend to a plurality of distribution points (DPs) 66. The FDI 52 multiplexes data in the reverse path from the communication links 63 onto the optical fiber 54.

As shown by FIG. 2, each DP 66 is coupled to at least one customer premises 56 via at least one conductive connection 69, such as a twisted-wire pair, referred to as a "drop connection." The exemplary embodiment shown by FIG. 2 depicts three customer premises 56 serviced by each DP 66, but any number of customer premises 56 may be serviced by any of the DPs 66 in other embodiments. In one exemplary embodiment, Ethernet protocol is used to communicate data across the connections 69, but other protocols may be used in other embodiments. Furthermore, for illustrative purposes, it will be assumed hereafter that DSL transceivers are used for the communication across each of the connections 63, but other types of transceivers may be used in other embodiments.

As will be described in more detail below, the connections 63 extending between the FDI 52 and a given DP 66 are bonded to provide a shared, high-speed data channel between the FDI 52 and such DP 66. This is in contrast to the conventional system 20 of FIG. 1 in which the connections 36 between the FDI 28 and DP 41 are not bonded. As described above, the data for a given drop connection 44 of the system 20 is carried by only one of the connections 36 between the FDI 28 and DP 41.

Figure 3:
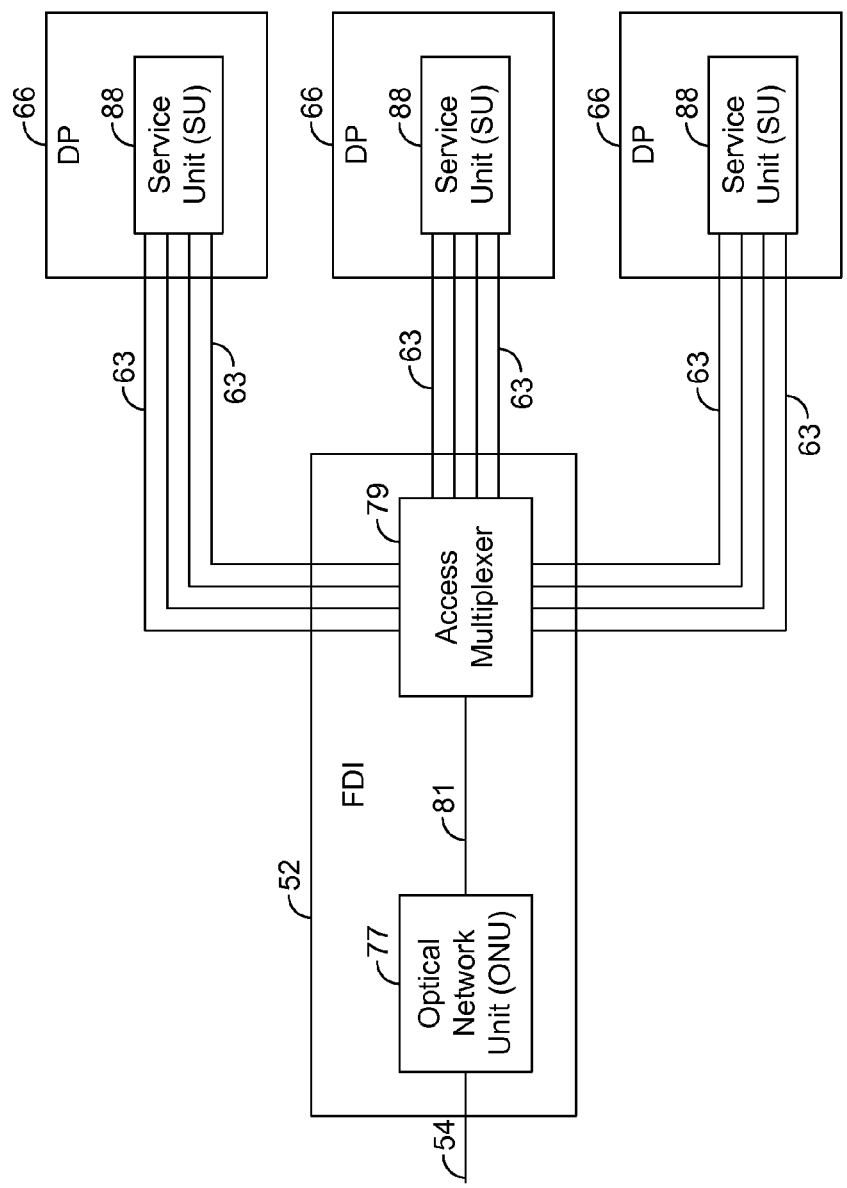
FIG. 3 is a block diagram illustrating an exemplary embodiment of a feeder distribution interface (FDI), such as is depicted by FIG. 2.

FIG. 3 shows an exemplary embodiment of the FDI 52. The FDI 52 comprises an optical network unit (ONU) 77 that is coupled to an access multiplexer 79 via a conductive connection 81. The access multiplexer 79 and the ONU 77 are shown separately, but the functionality of the ONU 77 may be incorporated into the access multiplexer 79 such that a single device performs optical/electrical conversions, as well as multiplexing/demultiplexing. Note that the access multiplexer 79 may reside at various locations. As an example, the access multiplexer 79 may be in close proximity to or in the same cabinet as a cross-connect point of the FDI 52 used for coupling the access multiplexer 79 to the connections 63 and the ONU 77. In another exemplary embodiment, the access multiplexer 79 resides at a central office and interfaces to the loop plant through a distribution frame. Yet other locations of the access multiplexer 79 are possible.

The ONU 77 receives the optical data signal from the fiber 54 and demodulates the optical data signal to recover the data carried by such signal. The ONU 77 then transmits a high-speed data stream to the access multiplexer 79 carrying the data destined for each of the customer premises 56. Thus, the ONU 77 receives the optical data signal transmitted across the fiber 54 and converts the received optical data signal into an electrical signal carrying the data destined for the customer premises 56.

As shown by FIG. 3, the access multiplexer 79 is coupled to a service unit 88 at each respective DP 66 via a plurality of conductive connections 63. In one exemplary embodiment, the access multiplexer 79 communicates DSL signals across the connections 63 and may be referred to as a DSL access multiplexer or DSLAM. In other embodiments, other types of signals may be communicated across the connections 63.

In one exemplary embodiment, the access multiplexer 79 and the service units 88 are configured to employ bonding techniques in order to bond the connections 63 extending between such access multiplexer 79 and service units 88 such that the connections 63 form a high-speed, bonded data channel for each respective service unit 88. In this regard, as known in the art, the bonding of communication connections generally refers to a process of fragmenting packets of a high-speed data stream for transmission across such connections such that each fragment is transmitted across a respective one of the connections. The fragments are re-combined at the other end of the connections to recover the high-speed data stream. Thus, a plurality of bonded connections, collectively referred to as a "bonding group," can be used to achieve an aggregate data rate that is higher than the data rate afforded by any one of the connections. Exemplary bonding techniques are described in commonly-assigned U.S. Pat. No. 7,693,090, entitled "Systems and Methods for Discovery PME Bonding Groups," and filed on Nov. 14, 2006, which is incorporated herein by reference. Exemplary bonding techniques are also described in commonly-assigned U.S. patent Ser. No. 11/074,918, entitled "Network Access Device and Method for Protecting Subscriber Lines," and filed on Mar. 8, 2005, which is incorporated herein by reference.

Generally, during bonding, a packet is fragmented by logic, sometimes referred to as a "bonding engine," on one side of a communication channel comprising a plurality of links. For each fragment, a small amount of overhead, such as a sequence indicator indicating the fragment's sequence among all of the packet's fragments, is appended to the fragment. The fragments are transmitted through the channel, and any fragment may travel across any link of the channel. A bonding engine on the opposite side of the channel uses the sequence indicators to reassemble the fragments into the packet originally fragmented prior to transmission through the channel, and the packet ordering is maintained.

Note that the embodiment shown by FIG. 3 is exemplary. Any number of DPs 66 can be serviced by the FDI 52, and the FDI 52 may include any number of ONUs 77 and access multiplexers 79. Further, as described above, the access multiplexer 79 can be configured to perform optical/electrical conversions so that a separate ONU 77 is not necessary. In addition, any number of connections 63 can extend between the access multiplexer 79 and any of the service units 88. The optical network that provides the optical data signal can be a passive optical network (PON). However, other optical networks may be used to provide the optical signal in other embodiments.

It is also possible and likely for data to flow in the opposite direction as that described above. In this regard, an access multiplexer 79 may receive data from any customer premises 56 serviced by it. For any such CP data received from the connections 63, the access multiplexer 79 multiplexes such data into a data stream for transmission to the ONU 77, which converts the data stream into an optical data signal for transmission across the optical fiber 54.

Figure 4:
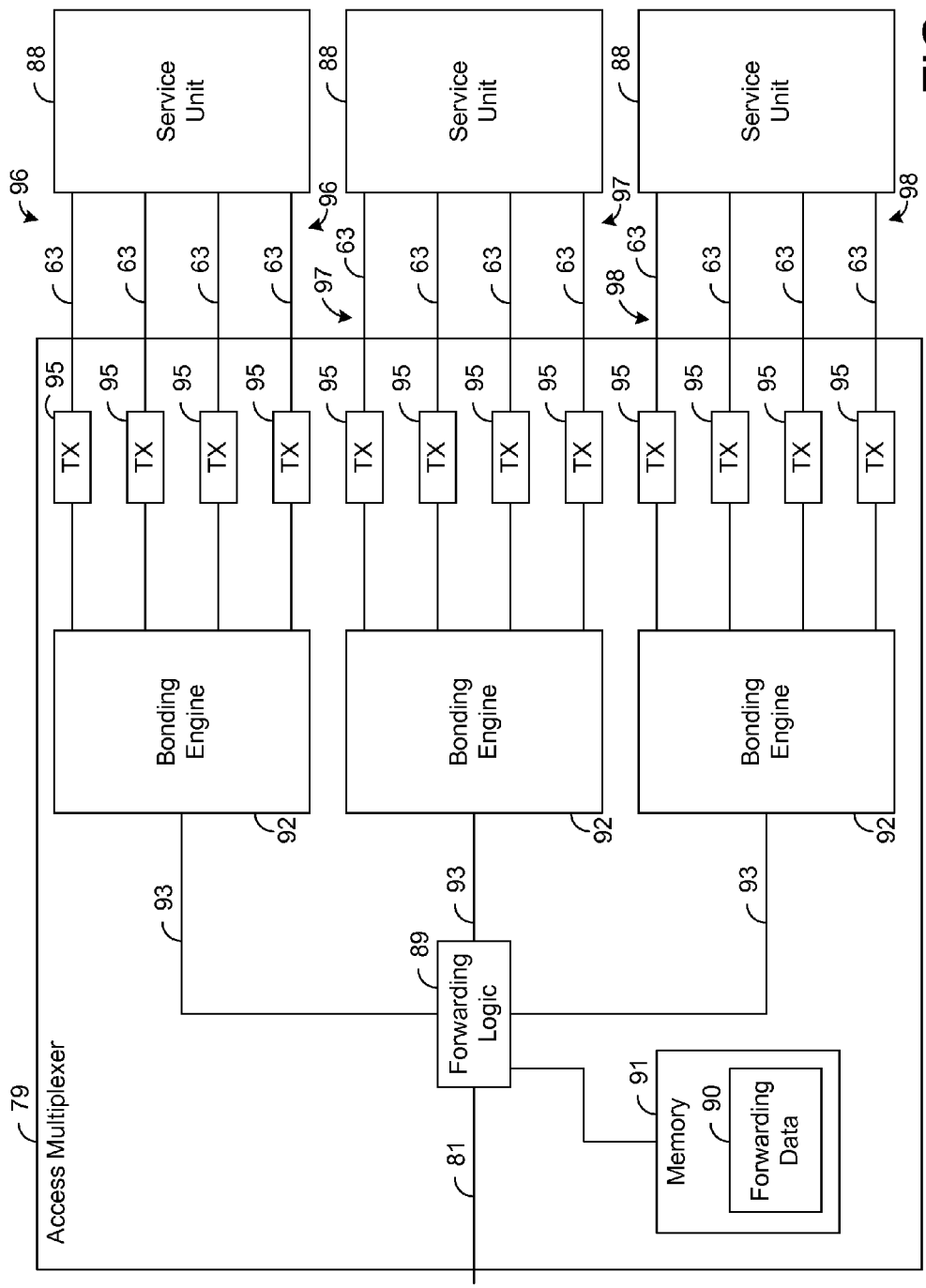
FIG. 4 is a block diagram illustrating an exemplary embodiment of an access multiplexer, such as is depicted by FIG. 3.

FIG. 4 depicts an exemplary embodiment of the access multiplexer 79. The access multiplexer 79 has forwarding logic 89 that is coupled to the electrical connection 81 carrying the high-speed data stream from the ONU 77 (FIG. 3). The forwarding logic 89 is configured to selectively forward the data packets received from such high-speed data stream to a plurality of bonding engines 92 via conductive connections 93. In this regard, the forwarding logic 89 is configured to forward the data packets based on their destination addresses such that they ultimately pass through the appropriate service unit 88 and are received at the appropriate customer premises 56.

In particular, as shown by FIG. 4, forwarding data 90 is stored in memory 91 of the access multiplexer 79. The forwarding data 90 maps each destination address to a particular connection 93, and the forwarding logic 89 uses the data 90 to forward each data packet to the bonding engine 92 that is coupled to the connection 93 correlated with the packet's destination address by the data 90. In the present embodiment, each bonding engine 92 receives from the forwarding logic 89 a stream of data packets to be transmitted to the same service unit 88 of a respective DP 66. The forwarding data 90 may be provisioned by a network service provider who has knowledge of which bonding engines 92 are to process which data packets, or the network service provider may provision the access multiplexer 79 to automatically learn the forwarding data 90.

Each bonding engine 92 is configured to divide into fragments its respective data stream received from the forwarding logic 89 for transmission across the communication connections 63 to its respective service unit 88. Specifically, each bonding engine 92 fragments each received data packet into a plurality of fragments and transmits each fragment to a respective one of the transceivers 95 coupled to it. The exemplary embodiment of FIG. 4 shows three bonding engines 92, each forming a respective bonding group 96-98. However, in other embodiments, other numbers of bonding engines and/or bonding groups are possible.

Each transceiver 95 has circuitry for terminating a respective connection 63. Each transceiver 95 also modulates a carrier signal using the data fragments received from the bonding engine 92 coupled to it and transmits the modulated signal across a respective connection 63 to a service unit 88 at a DP 66. Thus, data from the optical data signal carried by the fiber 54 (FIG. 3) is divided across the connections 63. In one exemplary embodiment, each transceiver 95 employs a DSL protocol (e.g., VDSL), but other types of protocols may be used in other embodiments.

Figure 5:
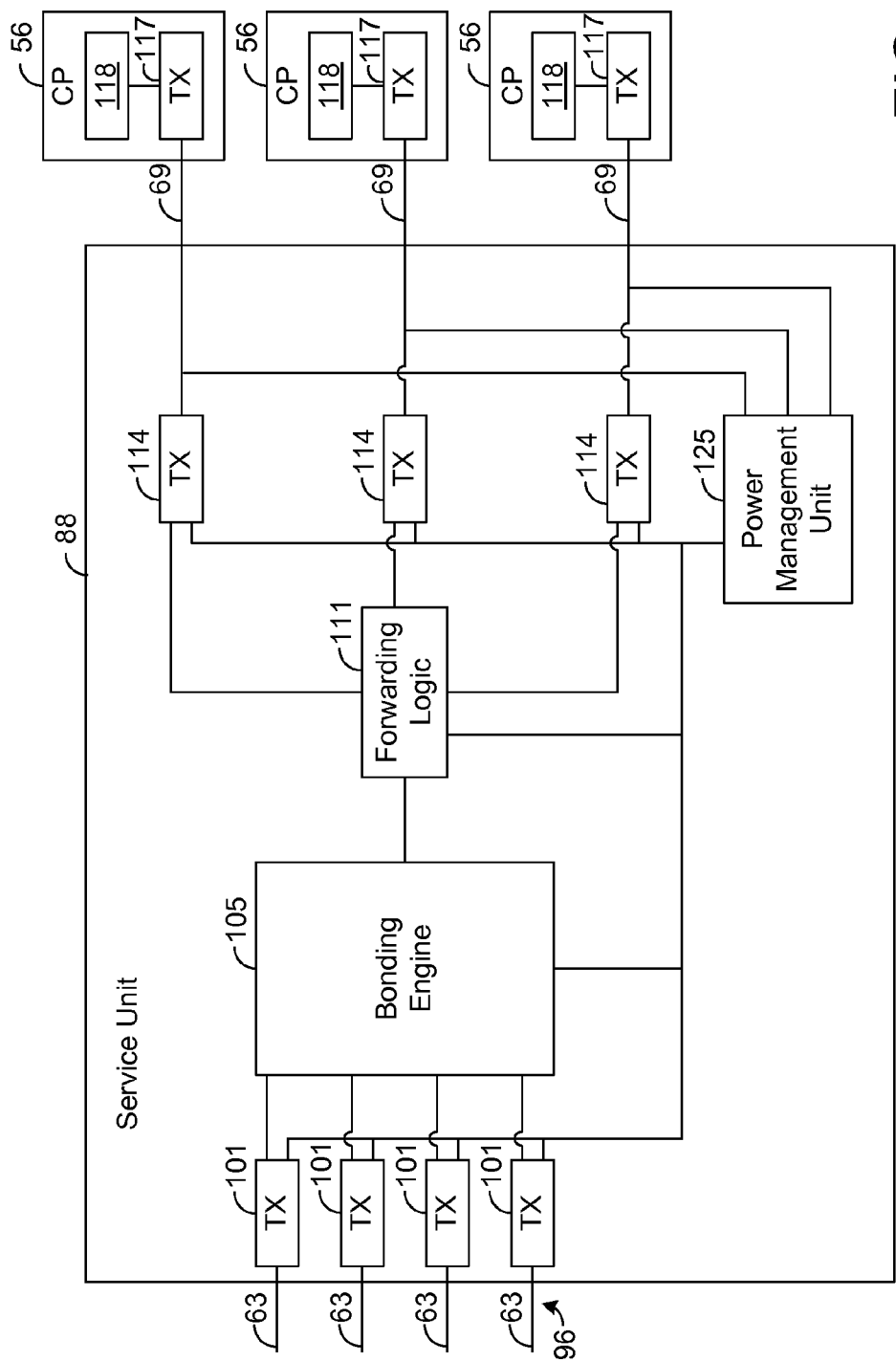
FIG. 5 is a block diagram illustrating an exemplary embodiment of a service unit, such as is depicted by FIG. 4.

FIG. 5 depicts an exemplary embodiment of a service unit 88 coupled to one bonding group 96. The service units 88 for the other bonding groups 97 and 98 may be configured similar to or identical to the service unit 88 depicted by FIG. 5. As shown by FIG. 5, the service unit 88 has a plurality of transceivers 101 respectively coupled to the connections 63 of the bonding group 96. Each transceiver 101 has termination circuitry, which includes active components, for terminating the connection 63 coupled to it. Further, each transceiver 101 demodulates the signal received from its respective connection 63 to recover the data fragments transmitted across such connection 63. The data fragments are transmitted to a bonding engine 105 that assembles the fragments and recovers the high-speed data stream originally fragmented by the bonding engine 92 (FIG. 4) at the access multiplexer 79. The bonding engine 105 transmits the recovered high-speed data stream to forwarding logic 111 that is coupled to a plurality of transceivers 114.

As shown by FIG. 5, each transceiver 114 is coupled to a respective CP transceiver 117 via at least one connection 69, and each transceiver 114 has termination circuitry, which includes active components, for terminating the connection 69 coupled to it. The forwarding logic 111 is configured to forward the data packets of the high-speed data stream to the transceivers 114 based on the destination addresses in the data packets such that each data packet is ultimately received by the CP transceiver 117 identified by the packet's destination address.

The exemplary embodiment depicted by FIG. 5 has three transceivers 114 respectively coupled to three CP transceivers 117 at three different customer premises 56. However, any number of transceivers 114, connections 69, CP transceivers 117, and customer premises 56 are possible in other embodiments. For example, it is possible for more than one connection 69 to be coupled between a transceiver 114 of the service unit 88 and a CP transceiver 117. Further, any customer premises 56 may have more than one CP transceiver 117.

By terminating the connections 63 and 69 at the DP 66, as described above, the wiring at the customer premises 117 is isolated from the connections 63. Thus, any reflections caused by such CP wiring should not affect the communication occurring over the bonded group 96, and such termination may allow more flexibility on modulation formats for the bonded group 96. In addition, it is possible to employ signal processing techniques, such as Vectoring and Multiple-Input Multiple-Output (MIMO), to reduce crosstalk interference affecting the signals transmitted across the connections 63.

In one exemplary embodiment, the components of the service unit 88 are powered by electrical power from one or more customer premises 56. In this regard, each customer premises 56 has a power supply element 118 that is configured to supply electrical power. The power supply element 118 may be battery powered or receive electrical power from a wall plug or other power source, and the power supply element 118 may provide power to the CP transceiver 117. In one embodiment, the power supply element 118 is integral with the CP transceiver 117 and within the same housing (not shown), but the power supply element 118 may be separate from the CP transceiver 117 in other embodiments. Further, the electrical power provided by the power supply element 118 may flow through the CP transceiver 117 or other device to the connection 69, or the power supply element 118 may be coupled directly to the connection 69 such that the electrical power bypasses the CP transceiver 117. In one exemplary embodiment, the data signals transmitted across the connections 69 are Ethernet signals, and the power signals are simultaneously transmitted across the connections 69 using Power over Ethernet (PoE) technology in accordance with IEEE 802.3af-2003 and/or IEEE 802.3at-2009. In other embodiments, other types of data communication and line-powering techniques may be employed.

Each power supply element 118 is configured to apply a power signal to the connection 69 that extends from the service unit 88. The data signals communicated across the connections 69 occupy a higher frequency than the power signal to the connection 69 so that the data signals can be separated from the power signal by known filtering or transformer-coupling techniques. Thus, the presence of the power signal on a given connection 69 should not degrade any data signal simultaneously transmitted across such connection 69. Note that when reverse powering components at a DP 66 via a drop connection 69, it is desirable to not simultaneously communicate across the same connection 69 a Plain Old Telephone Service (POTS) signal that could be affected by the power signal. As will be described in more detail hereafter, a POTS signal may be communicated via a separate drop connection (not shown in FIG. 5) extending to the same customer premises 56, or Voice over IP (VoIP) could be used so that voice is communicated via a broadband signal that can be effectively separated from the power signal.

As shown by FIG. 5, a power management unit 125 at the service unit 88 is coupled to each of the connections 69 and receives each power signal transmitted across the connections 69 from the customer premises 56. The power management unit 125 is configured to provide at least one power signal derived from electrical energy from the connections 69 to various components of service unit 88, such as the transceivers 114, the forwarding logic 111, the bonding engine 105, and/or the transceivers 101. By backpowering the components of the service unit 88 with electrical power from the customer premises 56, it is unnecessary to maintain other types of power sources, such as batteries, at the DP 66.

Depending on the power requirements of the service unit 88 and the amount of electrical power provided from the customer premises 56, it may be desirable to deactivate at least some components of the service unit 88. In this regard, users at the customer premises 56 may unplug one or more CP transceivers 117 or otherwise prevent one or more power supply elements 118 from applying power to one or more drop connections 69. In some cases, there may be insufficient power available to power all of the components of the service unit 88 that depend on power from the customer premises 56. In such case, the power management unit 125 is configured to deactivate (e.g., put to sleep or shut off) one or more components of the service unit 88 so that other components of the service unit 88 may remain functional. When deactivated, a component of the service unit 88 draws less power, if any, than when such component activated.

In one exemplary embodiment, the power management unit 125 is configured to sense the amount of power received from each of the connections 69 and to calculate the total amount of power currently received from the connections 69. The power management unit 125 then compares this total power value to a predefined threshold. If the power value falls below the threshold, the power management unit 125 is configured to transition to a power saving mode in which the power management unit 125 selectively deactivates at least one component of the service unit 88. For example, if the power management unit 125 determines that it is not receiving electrical power from one of the connections 69, then the power management unit 125 is configured to deactivate the transceiver 114 that is coupled to such connection 69. When the power management unit 125 begins to sense electrical power from the foregoing connection 69, the power management unit 125 is configured to activate the transceiver 114 that was previously deactivated.

In some cases, the power management unit 125 may deactivate other components, such as one or more transceivers 101, depending on the power requirements of the service unit 88 and the amount of available power. In this regard, when the available power is insufficient for the service unit's requirements, the power management unit 125 is configured to deactivate transceivers 114 that are coupled to connections 69 not providing power, as described above, and to deactivate a sufficient number of transceivers 101 so that the total power received from the connections 69 exceeds the total power required for the components of the service unit 88 assuming that there is no other power available from other sources. To facilitate the determination of the number of transceivers 101 to deactivate, the power management unit 125 may store data indicative of the power requirements of each of the components of the service unit 88 that run on power from the connections 69. Based on such data, the power management unit 125 can determine the total amount of power that is required depending on which components are activated.

Note that, since the connections 63 are bonded, deactivating any of the transceivers 101 has the effect of reducing the number of active connections 63 (i.e., the connections actively carrying data) and, thus, the aggregate data rate provided by the bonding group 96. However, data for any active CP transceiver 117 can nevertheless pass through the channel provided by the active connections 63. In this regard, since the bonding engine 105 recreates the original data stream, which is forwarded by the forwarding logic 111, regardless of which connections 63 provide the fragments, the loss of data communication across a given connection 63 does not prevent data packets for any of the CP transceivers 117 from reaching the service unit 88. That is, the aggregate data rate of the bonded channel is reduced, but the bonded channel is nevertheless operational for communicating data destined for any of the CP transceivers 117. Accordingly, deactivating one or more transceivers 101 to conserve power affects the total data rate provided but does not preclude any of the CP transceivers 117 from communicating with the network assuming that at least one of the transceivers 101 remains activated.

Figure 6:
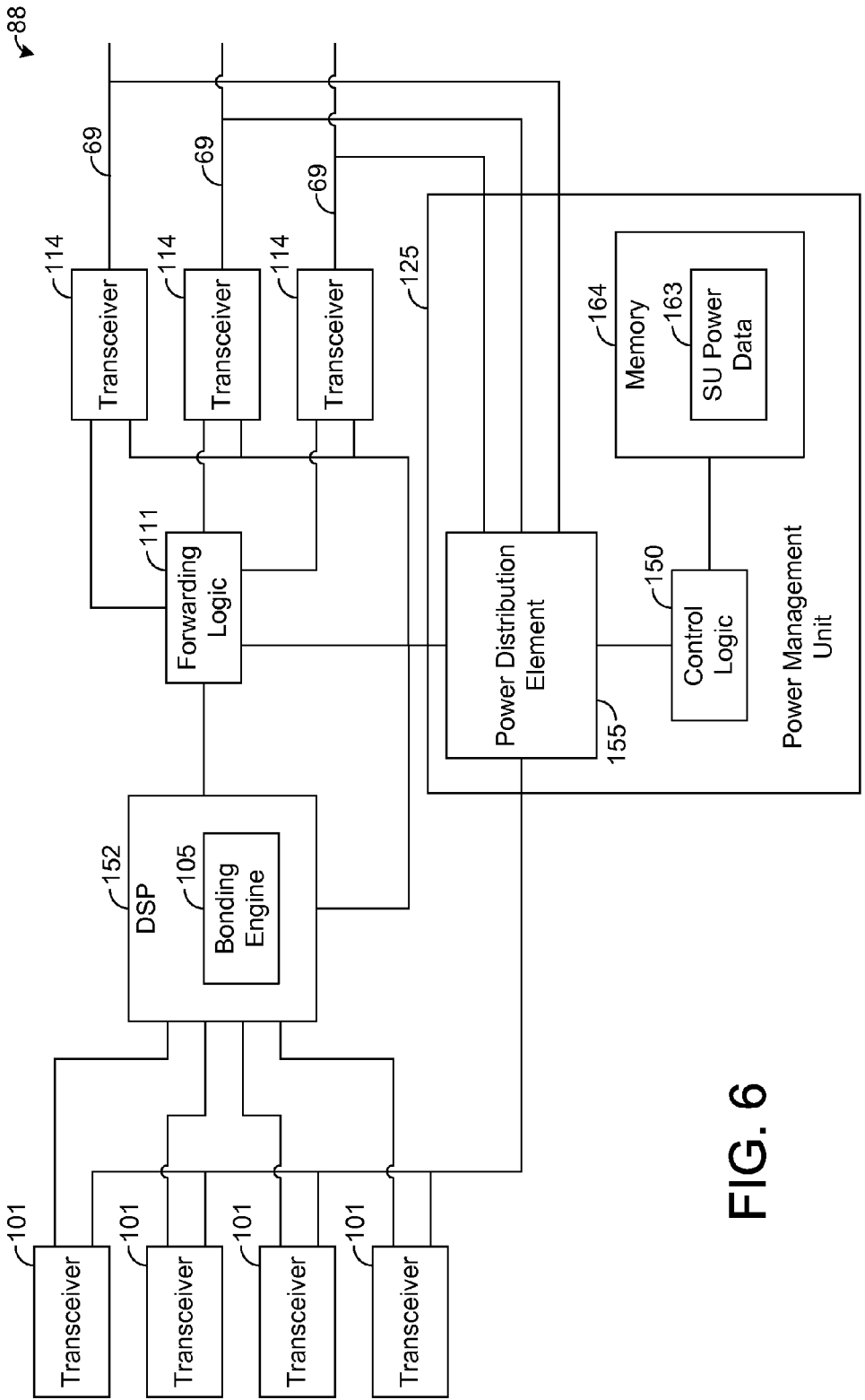
FIG. 6 is a block diagram illustrating an exemplary embodiment of a service unit, such as is depicted by FIG. 5.

FIG. 6 depicts an exemplary embodiment of the power management unit 125. As shown by FIG. 6, the power management unit 125 has control logic 150 that is configured to generally control the operation of the unit 125, as will be described in more detail hereafter. The control logic 150 may be implemented in hardware, software, firmware, or any combination thereof. When at least a portion of the control logic 150 is implemented in software or firmware, the power management unit 125 may include an instruction processing element (not shown), such as a digital signal processor (DSP) or a central processing unit (CPU), for executing instructions of the software or firmware.

Also for the purposes of illustration, the bonding engine 105 is shown as implemented within software that runs on a DSP 152. In other embodiments, the bonding engine 105 may be implemented in hardware, firmware, or any combination of hardware, firmware, and software.

As shown by FIG. 6, the power management unit 125 comprises a power distribution element 155 that is configured to receive electrical power from the drop connections 69. The power distribution element 155 is configured to aggregate and condition the received power. As an example, the power signals transmitted over the connections 69 may be direct current (DC) signals at voltages different from the operating voltage of one or more components of the service unit 88. In such case, the power distribution element 155 outputs a power signal derived from energy from at least one drop connection 69 and regulates the voltage of the output power signal to the required level. Note that the voltage of the power signal provided by the power distribution element 155 to one component of the service unit 88 is not necessarily the voltage of the power signal provided by the power distribution element 155 to another component of the service unit 88.

The control logic 150 has access to predefined service unit (SU) power data 163 that is stored in memory 164. The SU power data 163 is indicative of pre-estimated power requirements of the service unit 88. For example, the SU power data 163 may store a predefined value, referred to hereafter as "power indicator," for each component of the service unit 88. Such power indicator indicates the amount of power estimated to be used by the associated component when it is fully operational. As an example, the power indicator associated with a given transceiver 101 may indicate the amount of power that is estimated for powering the transceiver 101 (e.g., the expected amount of power, within a desired margin of error, to be drawn by the transceiver 101 when it is actively communicating data). Thus, based on the SU power data 163, the control logic 150 can estimate the total amount of power that is expected to be drawn by the activated components of the service unit 88. As an example, the control logic 150 may sum the power indicators of each activated component to determine a value, referred to hereafter as $P_{total}$, that indicates the total power that is estimated for powering the activated components of the service unit 88 (e.g., the total power expected to be drawn by the activated components within a desired margin of error). As more components are deactivated, as will be described in more detail hereafter, it is expected that $P_{total}$ will decrease to reflect a lower power estimate for the service unit 88, and as more components are activated, it is expected that $P_{total}$ will increase to reflect a higher power estimate for the service unit 88.

For illustrative purposes, it will be assumed herein that a deactivated component is completely powered down and does not draw any power. However, if a component does draw some power when deactivated, then the SU power data 163 may indicate how much power is estimated to be drawn in such a deactivated state so that the control logic 150 can include such values in the summation for determining $P_{total}$. In an alternative embodiment, one or more sensors (not shown) for measuring the amount of power drawn by the service unit 88 may be employed to calculate $P_{total}$ so that $P_{total}$ represents a measurement of the actual amount of power currently drawn by the components of the service unit 88.

Figure 7:
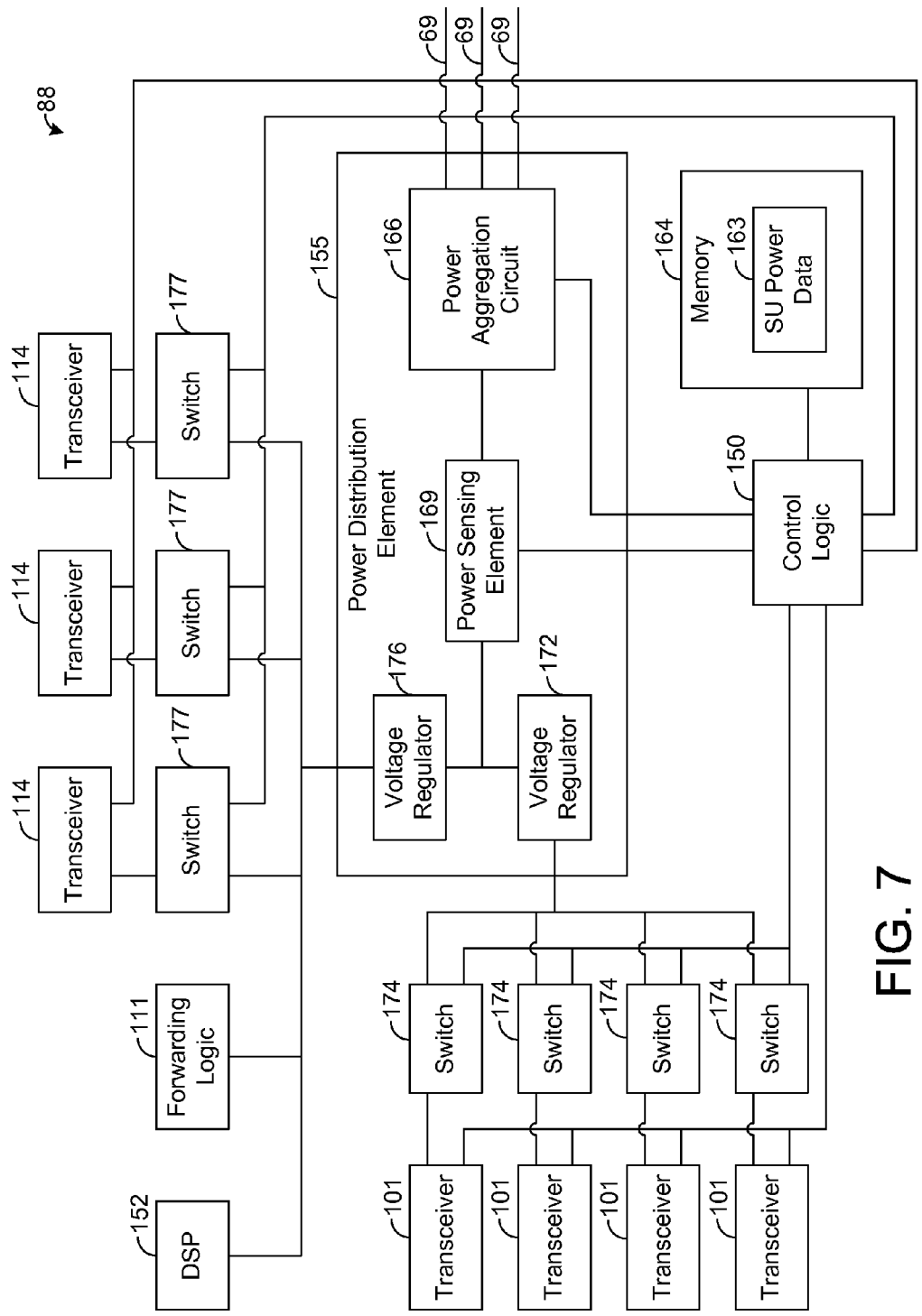
FIG. 7 is a block diagram illustrating an exemplary embodiment of a service unit, such as is depicted by FIG. 6.

FIG. 7 depicts an exemplary embodiment of the power distribution element 155. The data connections are not shown in FIG. 7 for simplicity of illustration. As shown by FIG. 7, the power distribution element 155 comprises a power aggregation circuit 166 that is coupled to each of the drop connections 69 used to supply power to the service unit 88. The circuit 166 combines the electrical power from the connections 69 into a single power signal, which is received by a power sensing element 169. The power sensing element 169 is configured to sense the magnitude of the power signal. As an example, the power sensing element 169 may comprise a voltage sensor (not shown) and a current sensor (not shown) to respectively measure the voltage and current of the power signal. The control logic 150 may use such measured voltage and current to calculate a value, referred to hereafter as "$P_{available}$," indicative of the total power currently provided by the power aggregation circuit 166. As will be described in more detail hereafter, $P_{available}$ is compared to $P_{total}$ by the control logic 150 in one exemplary embodiment to determine whether to activate and/or deactivate components of the service unit 88.

If desired, rather than positioning a power sensing element 169 to receive the output of the power aggregation circuit 166, a plurality of power sensing elements may be respectively coupled to the connections 69 and measure the magnitude of each power signal received from the connections 69. The total available power may then be calculated by the control logic 150 based on the measurements of the power sensing elements. Such measurements may also be used to determine which of the connections 69 is not providing a power signal to the power aggregation circuit 69.

For purposes of illustration, it will be assumed hereafter that the operating voltage specified for the transceivers 101 is different than the operating voltage specified for the forwarding logic 111, the transceivers 114, and the DSP 152. As shown by FIG. 7, each transceiver 101 is coupled to a voltage regulator 172 through a respective switch 174. The voltage regulator 172 receives the power signal sensed by the power sensing element 169 and, based on such power signal, provides a conditioned power signal to the switches 174. Such conditioned power signal has a voltage compatible with the operating voltage specified for the transceivers 101, which are powered by the conditioned power signal. Note that components having the same operating voltage may receive the same power signal from the same voltage regulator.

Also shown by FIG. 7, the forwarding logic 111 and the DSP 152 are coupled to a voltage regulator 176. In addition, each transceiver 114 is coupled to the voltage regulator 176 through a respective switch 177. The voltage regulator 176 receives the power signal sensed by the power sensing element 169 and, based on such power signal, provides a conditioned power signal to the forwarding logic 111, the DSP 152, and the switches 177. Such conditioned power signal has a voltage compatible with the operating voltage specified for the forwarding logic 111, the transceivers 114, and the DSP 152, which are powered by the conditioned power signal.

In one exemplary embodiment, the power aggregation circuit 166 is configured to sense whether power is being received from each connection 69. If power is not being received by any connection 69, the power aggregation circuit 166 notifies the control logic 150. For any such connection 69, it is assumed that data is not being transmitted across the connection 69. In this regard, there could be various reasons why power is not being received. For example, the connection 69 may be severed, or the CP transceiver 117 (FIG. 5) coupled to the connection 69 and through which power is provided may be unplugged or otherwise deactivated. In such examples, data is not being communicated across the connection 69, and the control logic 150 is configured to use the absence of power on the connection 69 as indicating that no data is being communicated. Thus, to conserve power without likely impacting the performance of the service unit 88 in an adverse way, the control logic 150 is configured to deactivate the transceiver 114 that is coupled to the connection 69 from which power is not received. In particular, the control logic 150 is configured to transmit a command, referred to hereafter as "power-down command," to such transceiver 114. In response, the transceiver is 114 configured to power-down completely or at least a portion of the transceiver 114 such that the amount of power drawn by the transceiver 114, if any, is reduced. In such state, the transceiver 114 is unable to communicate data across the drop connection 69.

For purposes of illustration, it will be assumed that the transceiver 114 powers down completely in response to a power-down command. Also, the control logic 150, after waiting a specified time period to allow a graceful power-down of the transceiver 114, is configured to control the switch 177 that is coupled to the transceiver 114 being deactivated such that the switch 177 is transitioned to an open state thereby preventing current from flowing through it.

If the power aggregation circuit 166 later senses power from the aforementioned connection 69, the control logic 150 is notified and, in response, activates the deactivated transceiver 114 coupled to such connection 69. In this regard, the control logic 150 controls the state of the switch 177 coupled to such transceiver 114 to transition the switch 177 from an open state to a closed state such that current flows through the switch 177 thereby providing power to the transceiver 114. In response, the transceiver 114 powers up such that it is fully operational for communicating data. Thus, during times that power is not received from a particular drop connection 69, the transceiver 114 coupled to such drop connection 69 is deactivated. When power is received from the connection 69, the transceiver 114 coupled to such drop connection 69 is activated and ready to communicate data.

As described above, the control logic 150 is configured to calculate $P_{total}$ based on the SU power data 163 (FIG. 6) and which components of the service unit 88 are currently activated. $P_{total}$ is indicative of the total amount of power that is estimated for powering the activated components. The control logic 150 is configured to compare $P_{total}$ to $P_{available}$, which is sensed by the power sensing element 169, as described above. If $P_{available}$ is less than $P_{total}$, then there is insufficient power available for the activated components. In such case, the control logic 150 is configured to deactivate at least one of the transceivers 101 such that the total amount of power that is estimated for powering the activated components is reduced. In particular, the control logic 150 is configured to calculate the number of activated transceivers 101 that should be powered down in order for the available power to be sufficient for powering the service unit 88. The control logic 150 then transmits a power-down command to such number of activated transceivers 101. In response, each transceiver 101 receiving a power-down command is configured to power down completely or at least a portion of the transceiver 101 so that its power requirement is reduced.

In one exemplary embodiment, the control logic 150 has an energy storage device, such as a small battery or a capacitor, to help ensure that the control logic 150 has sufficient power for a short time after a change in the available power to discover such change and power down components as appropriate. A capacitor is generally more preferable for this purpose than a battery, which must be replaced from time-to-time. In this regard, a capacitor may charge using power received from the drop connections 69 or otherwise, and when there is an abrupt change to the available power from the drop connections 69, the capacitor may discharge for a short time thereafter to provide the control logic 150 with power thereby helping to ensure that the control logic 150 has sufficient time to detect the change and deactivate components as appropriate in response to the change.

For purposes of illustration, it will be assumed that each transceiver 101 powers down completely in response to a power-down command. Also, the control logic 150, after waiting a specified time period to allow a graceful power-down of such transceiver 101, is configured to control the switch 174 that is coupled to the transceiver 101 being deactivated such that the switch 174 is transitioned to an open state thereby preventing current from flowing through it.

Thus, if $P_{available}$ exceeds $P_{total}$ indicating that there is sufficient power available to power the activated components of the service unit 88, then the control logic 150 refrains from deactivating any of the transceivers 101. If $P_{available}$ is less than $P_{total}$, then the control logic 150 deactivates a sufficient number of transceivers 101 such that $P_{total}$ falls below $P_{available}$ indicating that there is sufficient power available to power the activated components of the service unit 88.

Note that if at least one transceiver 101 is currently deactivated and if $P_{available}$ exceeds $P_{total}$ by an amount greater than the power indicator for such deactivated transceiver 101, then there is sufficient power to activate the transceiver 101. That is, if the transceiver 101 is activated, then $P_{available}$ will still exceed $P_{total}$ even after $P_{total}$ is updated to account for activation of the transceiver 101. In such a situation, the control logic 150 is configured to activate the deactivated transceiver 101. In this regard, the control logic 150 controls the state of the switch 174 coupled to such transceiver 101 to transition the switch 174 from an open state to a closed state such that current flows through the switch 174 thereby providing power to the transceiver 101. In response, the transceiver 101 powers up such that it is fully operational for communicating data.

Thus, during times that the available power from the drop connections 69 is deemed insufficient to power all of the transceivers 101, at least one of the transceivers 101 is deactivated to reduce the power estimates of the service unit 88. As described above, since the connections 63 coupled to the service unit 88 are bonded, the deactivation of any transceiver 101 may decrease the aggregate data rate of the bonding group 96, but any of the CP transceivers 117 serviced by the bonding group 96 can communicate with the network provided that at least one of the transceivers 101 remains activated. When sufficient power is received from the connections 69 to power all of the transceivers 101, all such transceivers 101 are activated in an effort to maximize the aggregate data rate of the bonding group 96.

In one exemplary embodiment, the service unit 88 is configured such that the electrical power received from a single drop connection 69 is sufficient to power the service unit 88 such that at least one transceiver 101 may remain activated if there is only one drop connection 69 providing power. Thus, if a CP transceiver 117 is actively trying to communicate and is supplying electrical power via the drop connection 69 to which it is coupled, then the service unit 88 should remain operational to allow data to flow therethrough.

In an embodiment described above, it is assumed that the transceivers 101 operate at a voltage different than that used by the forwarding logic 111, the transceivers 114, and the DSP 152. In other embodiments, other configurations are possible. For example, the transceivers 101, the forwarding logic 111, the transceivers 114, and the DSP 152 may operate at the same voltage and receive a power signal from a single voltage regulator. Further, it is possible for any component of the service unit 88 to have a different operating voltage than any other component of the service unit 88.

Figure 8:
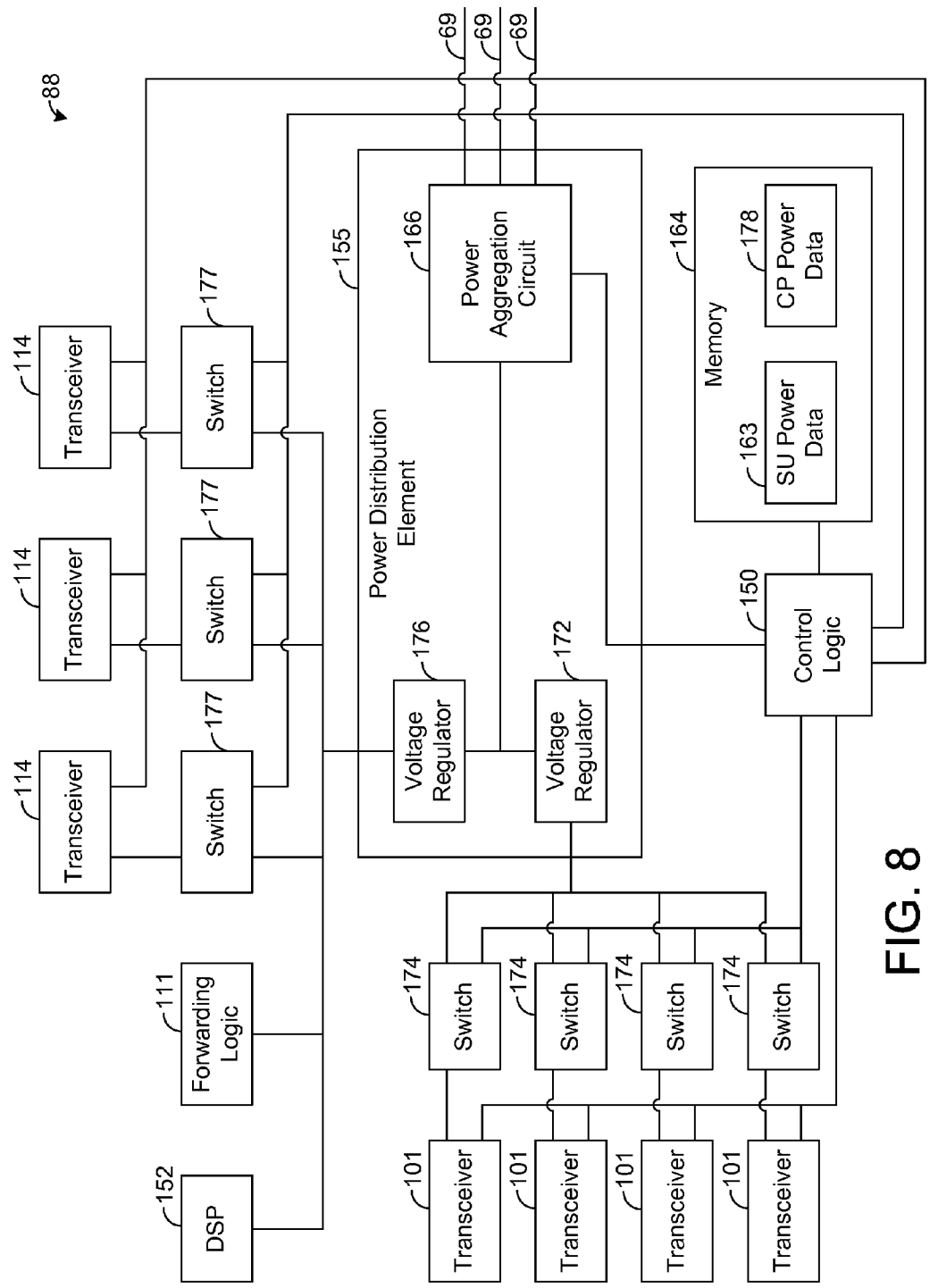
FIG. 8 is a block diagram illustrating an exemplary embodiment of a service unit, such as is depicted by FIG. 6.

FIG. 8 depicts a simplified embodiment of the power distribution element 155. The data connections are not shown in FIG. 8 for simplicity of illustration. As shown by FIG. 8, predefined CP power data 178 is stored in memory 164. The CP power data 178 indicates the amount of power that is estimated to be received from each connection 69 for calculating $P_{available}$. Thus, rather than determining $P_{available}$ from measurements, $P_{available}$ is determined based on the CP power data 178. Accordingly, there is no need to include sensing elements, such as the power sensing element 169 of FIG. 7, in the distribution element 155.

If desired, the CP power data 178 may indicate the estimated amount of power expected from each respective drop connection 69 within a desired margin of error. In such case, the respective power value indicated for each connection 69 may be different depending on various factors, such as the amount of power applied to each respective connection 69 at a customer premises 56, as well as the length and wire gauge of the connection 69.

In such an embodiment, the control logic 150 calculates P available by summing the power values for the connections 69 from which power is received. Thus, it is assumed that, if a connection 69 is determined to be providing power, then the amount of power provided is consistent with the power value that is correlated with the connection 69 by the CP power data 178.

In another exemplary embodiment, as a further simplification, each CP power element 118 is configured to apply the same amount of power, referred to as "$P_{source}$," to its respective drop connection 69, and each connection 69 is constructed using the same gauge wire. Further, rather than calculating a separate power value for each drop connection 69, a single power value, referred to as "$P_{min}$," is calculated a priori and stored in the CP power data 178.

To calculate $P_{min}$, the maximum possible length for any of the connections 69 is determined. Assuming such length for a given connection 69 and assuming that a power supply element 118 applies to the connection 69 a power signal equal to $P_{source}$, the estimated amount of power expected to be received by the power distribution element 155 from the connection 69 is calculated and stored in the data as $P_{min}$. Thereafter, it is assumed that the amount of power received from each connection 69 that is actively providing power is equal to $P_{min}$. Using such assumption, the actual power available may be greater than the $P_{available}$ calculated by the control logic 150 resulting in one or more components needlessly being deactivated, but it will be ensured that there is sufficient power for the components that remain activated.

In operation, the control logic 150 determines the number (K) of drop connections 69 that are currently providing power to the power distribution element 155 based on signals from the power aggregation circuit 166, which is described above as sensing whether power is being received from each connection 69. The control logic 150 then determines $P_{available}$ via the equation: $P_{available} = K \times P_{min}$. As indicated above, such estimation of the available power may not be precise but allows for a simplified implementation of the power management unit 125 while at the same time ensuring that there is sufficient power for the activated components of the service unit 88.

An exemplary operation and use of the power management unit 125 will be described below with particular reference to FIG. 9.

For illustrative purposes, assume that the value $P_{min}$ is determined a priori and is stored in the CP power data 178. Such value represents the minimum power that could be received by the power distribution element 155 from any of the drop connections 69. As shown by block 181 of FIG. 9, the control logic 150 determines $P_{available}$. In this regard, the power aggregation circuit 166 (FIG. 8) senses from which connections 69 the circuit 166 receives electrical power. For illustrative purposes, assume that the power aggregation circuit 166 receives power from three connections 69. In such an example, the power aggregation circuit 166 transmits to the control logic 150 a signal indicating that three connections 69 are providing electrical power.

Based on such number of connections 69, the control logic 150 determines $P_{available}$. In this regard, the control logic 150 retrieves $P_{min}$ from memory 164 and multiples $P_{min}$ by the number of connections 69 that are providing electrical power. In the current example in which three connections are providing electrical power, $P_{available}$ equals $3P_{min}$.

Figure 9:
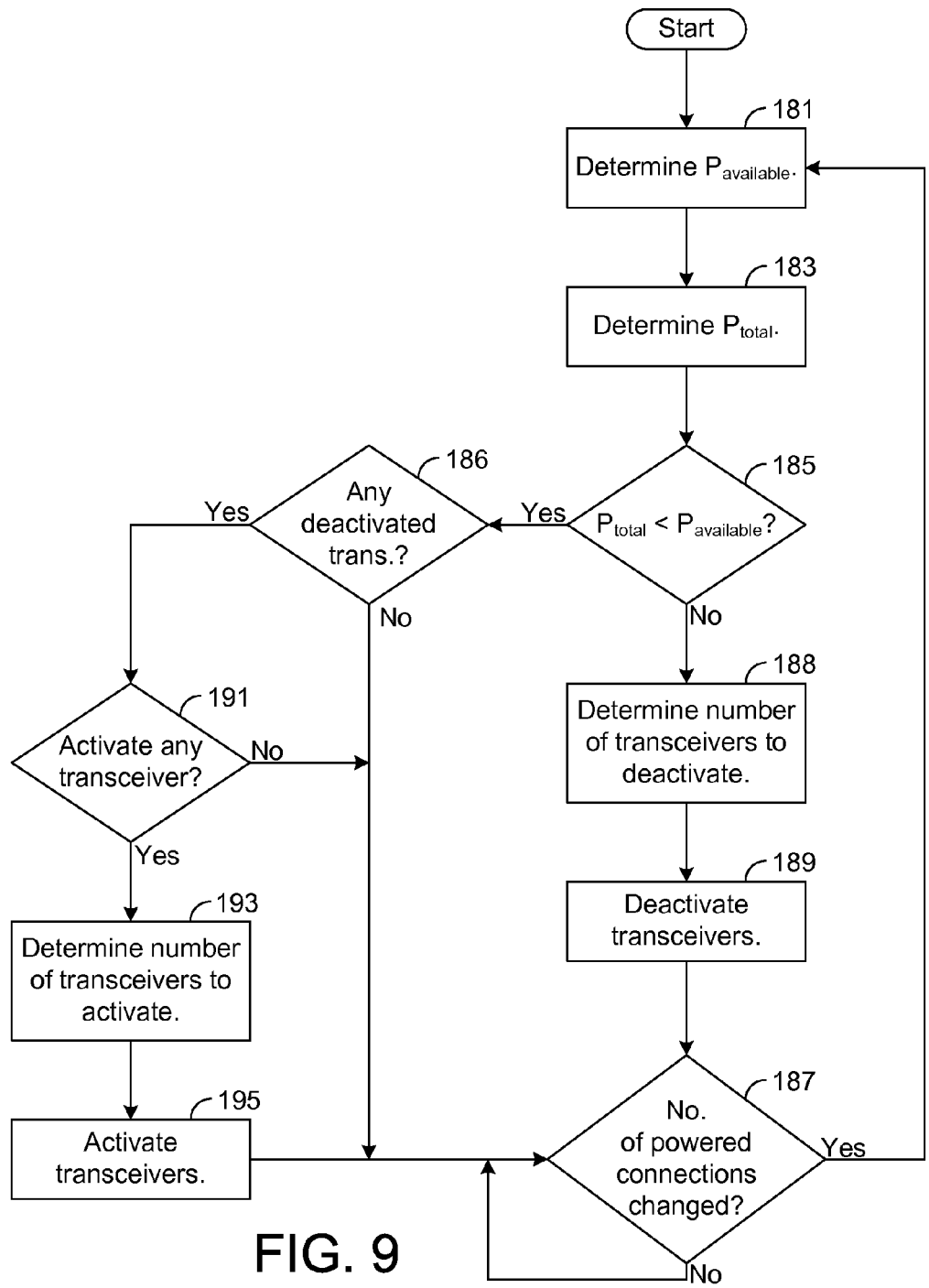
FIG. 9 is a flow chart illustrating an exemplary method for activating and deactivating transceivers in a service unit, such as is depicted by FIG. 6, in order to manage power consumption.

As shown by block 183 of FIG. 9, the control logic 183 also determines $P_{total}$ based on the SU power data 163 and which of the components of the service unit 88 are activated. $P_{total}$ represents the total amount of power that is estimated in order to power the activated components.

As shown by block 185, the control logic 150 compares $P_{total}$ to $P_{available}$. If $P_{total}$ is less than $P_{available}$, then there is sufficient power available to power the activated components of the service unit 88, and the control logic 150 refrains from deactivating any components of the service unit 88 based on the current calculations of $P_{available}$ and $P_{total}$. In addition, the control logic 150 determines whether any of the transceivers 101 are currently deactivated, as shown by block 186. For illustrative purposes, assume that all of the transceivers 101 are currently activated such that the control logic 150 makes a "no" determination in block 186. In such case, the control logic 150 proceeds to block 187 and determines, based on signaling from the power aggregation circuit 166, whether the number of connections 69 providing electrical power has changed.

For illustrative purposes, assume that one of the connections 69 stops providing power to the power aggregation circuit 166. As an example, assume that a user at a customer premises 56 unplugs a CP transceiver 117, which had been applying power from a power supply element 118 to the drop connection 69. When the number of connections 69 providing power changes from three to two, the control logic 150 makes a "yes" determination in block 187 and proceeds to block 181. In block 181, the control logic 150 determines that $P_{available}$ is equal to $2P_{min}$. Note that, in response to such event, the control logic 150 may be configured to deactivate the transceiver 114 coupled to such connection 69, as described above, thereby reducing $P_{total}$ if desired, but such deactivation is optional.

The control logic 150 determines $P_{total}$ for the current state of the service unit 88 in block 183. For illustrative purposes, assume that $2P_{min}$ is less than the calculated $P_{total}$. In such case, there is insufficient power available to power the activated components of the service unit 88, and the control logic 150 makes a "yes" determination in block 185 causing the control logic 150 to deactivate at least one transceiver 101 of the service unit 88, as will be described below.

In this regard, the control logic 150 determines the number of transceivers 101 to deactivate in block 188. In particular, for each transceiver 101 to be deactivated, $P_{total}$ can be reduced by the amount of power that is correlated with such transceiver 101 by the SU power data 163. In block 188, the control logic 150 selects for deactivation the smallest number of transceivers 101 that will reduce $P_{total}$ below $P_{available}$, which is $2P_{min}$ in this example. For illustrative purposes, assume that the control logic 150 determines in block 188 to deactivate one transceiver 101.

After selecting the number of transceivers 101 to deactivate in block 188, the control logic 150 deactivates such number of transceivers 101 in block 189. Thus, in the current example, the control logic 150 deactivates one of the transceivers 101. In this regard, the control logic 150 transmits a power-down command to one of the transceivers 101. In response, the transceiver 101 powers down such that it draws no more power from the voltage regulator 172. After a sufficient amount of time to allow the transceiver 101 to gracefully power down, the control logic 150 transmits a control signal to the switch 174 coupled to such transceiver 101 causing such switch 174 to transition to an open state thereby electrically isolating the deactivated transceiver 101 from the voltage regulator 172. Note that the aggregate data rate provided by the boding group 96 is decreased since data can no longer be transmitted across the connection 63 that is coupled to the transceiver 101 that is now deactivated. After deactivating the transceiver 101, the control logic 150 proceeds to block 187.

Later, assume that the power aggregation circuit 166 begins to receive electrical power from three connections 69 again. As an example, a user at a customer premises may plug in a CP transceiver 117 such that the transceiver 117 begins to apply electrical power to a drop connection 69.

When the number of connections 69 providing power changes from two to three, the control logic 150 makes a "yes" determination in block 187 and proceeds to block 181. In the current example, the value of $P_{available}$ goes to $3P_{min}$, which is greater than $P_{total}$. Thus, the control logic 150 makes a "yes" determination in block 185. However, as described above, one transceiver 101 is currently deactivated such that the control logic 150 makes a "yes" determination in block 186 as well. Thus, the control logic 150 determines whether any of the deactivated transceivers 101 are to be activated, as shown by block 191. In this regard, if the difference between $P_{available}$ and $P_{total}$ is greater than the amount of power associated with any of the deactivated transceivers 101 by the SU power data 163, then there is sufficient power to activate at least one currently deactivated transceiver 101, and the control logic 150 makes a "yes" determination in block 191.

Thus, in block 193, the control logic 150 determines the number of currently deactivated transceivers 101 to activate. In this regard, the control logic 150 selects the maximum number of transceivers 101 that can be activated without causing $P_{total}$ to t exceed $P_{available}$. In the current example, there is only one deactivated transceiver 101, and activation of this transceiver 101 does not cause $P_{total}$ to exceed $P_{available}$. Thus, the control logic 150 determines to activate the one transceiver 101 that is currently deactivated, and the control logic 150 activates such transceiver 101 in block 195. In this regard, the control logic 150 transmits a control signal for causing the switch 174 that is coupled to the foregoing transceiver 101 to transition to a closed state, thereby allowing current to flow. Thus, the deactivated transceiver 101 begins to receive electrical power from the voltage regulator 172 and, in response, powers up. Thereafter, the transceiver 101 begins communicating data thereby increasing the aggregate data rate provided by the bonding group 96.

Referring to FIG. 3, the components of the access multiplexer 79, the ONU 77, the service units 88, the CP transceivers 117, and the power supply elements 118 can be implemented in hardware or any combination of hardware with software and/or firmware. In one exemplary embodiment, all such components are implemented in hardware. However, in other embodiments, at least some of the components are implemented in software. As an example, in one exemplary embodiment, the bonding engines 92 (FIG. 4) and 105 (FIG. 5) are implemented in software and stored in memory (not shown). When any portion of the access multiplexer 79, the ONU 77, the service units 88, the CP transceivers 117, or the power supply elements 118 is implemented in software or firmware, at least one instruction processing element (not shown), such as a digital signal processor (DSP) or a central processing unit (CPU), is used to execute instructions of the software or firmware.

During operation, the system 50 (FIG. 2) enables peak data rates much greater than the conventional system 20 shown by FIG. 1 because of the bonded connections 63. In this regard, assume that the three CP transceivers 117 shown by FIG. 5 are all actively receiving data and share equally the bandwidth provided by the bonding group 96. That is, each CP transceiver 117 receives data at a data rate of x. As used herein, a transceiver is referred to be "active" when it is currently transmitting or receiving data and is referred to as "inactive" when it is not currently transmitting or receiving data. A transceiver may be inactive for a variety of reasons, such as when it is powered down or when it is powered up but there is no data to transmit or receive.

If one of the CP transceivers 117 in the foregoing example becomes inactive, then there is more bandwidth available for the other two active CP transceivers 117, assuming that none of the transceivers 101 at the DP 66 are deactivated for power management issues or other reasons. In this regard, since the connections 63 are bonded, all of the connections 63 may be used to provide data to the two active CP transceivers 117. In such case, the data rate to each active CP transceiver 117 increases to 1.5x. That is, each of the active transceivers 117 share the additional bandwidth made available by the inactivity of the other CP transceiver 117.

Now assume that two CP transceivers 117 become inactive. In such case, all of the connections 63 may be used to provide data to the active CP transceiver 117, assuming that none of the transceivers 101 are deactivated for power management issues. In such case, the data rate to the single, active CP transceiver 117 is 3x or, in other words, three times the available data rate when all three CP transceivers 117 are active. Thus, by sharing the channel between the FDI 52 and the DP 66, the peak data rates provided to the CP transceivers 117 can be significantly increased, as illustrated herein.

In fact, in some cases, the peak data rates achievable can be comparable to or exceed the peak data rates offered by conventional DOCSIS systems. For instance, assume that a DP 66 services four to eight customer premises 56, each having a single CP transceiver 117. Further assume that eight to ten connections 63 service the DP 66 and that the system 50 is configured to provide 20 Megabits per second (Mbps) to each SU transceiver 101. Note that high data rates for the drop connections 69 are feasible given the short distance from the DP 66 to the customer premises 56. In this regard, in one exemplary embodiment, such distance is less than about 500 feet, and spectral compatibility issues are not typically a concern for the drop section of a network.

In the current example, the peak rate available to any single CP transceiver 117 can be about 160-200 Mbps by using the connections 63 as a shared resource. This is comparable to rates out of DOCSIS 3.0 but shared over a much smaller number of subscribers, offering higher average data rates as well.

Figure 10:
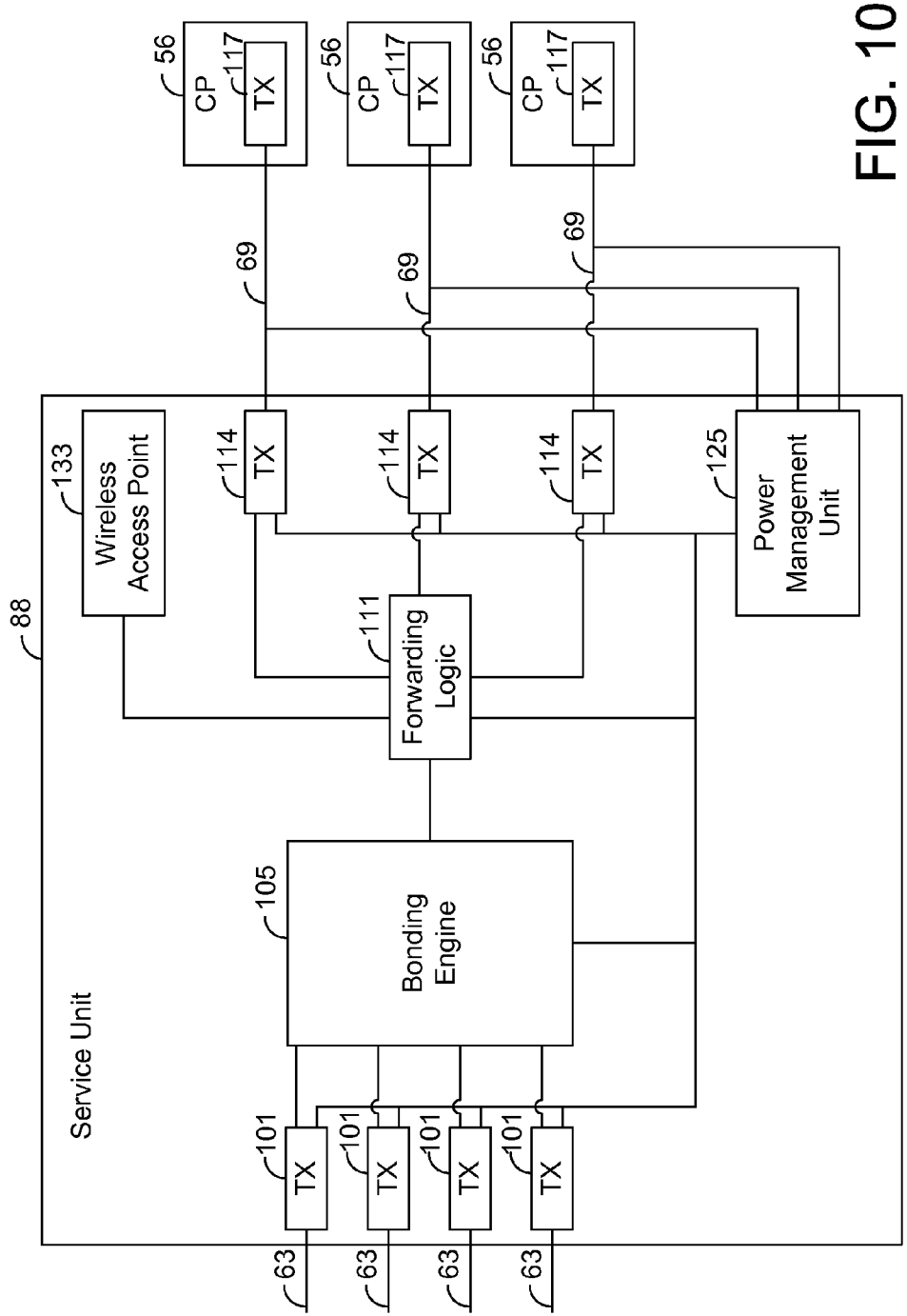
FIG. 10 is a block diagram illustrating an exemplary embodiment of a service unit, such as is depicted by FIG. 4.

FIG. 10 shows an exemplary embodiment in which a wireless access point 133, such as a femtocell, is embedded in the service unit 88. In this regard, the service unit 88 may have an environmentally-hardened housing (not shown), similar to other housings used for other telecommunication equipment, and each of the components shown by FIG. 10 may be housed by and enclosed within such housing. An exemplary housing, which is environmentally-hardened, is described in commonly-assigned U.S. patent application Ser. No. 12/619,397, which is incorporated herein by reference.

The wireless access point 133 is configured to communicate wirelessly with at least one device, such as cellular telephone or a modem, at one or more customer premises 56. As an example, the wireless access point 133 may communicate Voice over Internet Protocol (VoIP) data, but other types of data may be communicated by the point 133 in other embodiments. The data communicated by the wireless access point 133 flows through the bonded channel defined by the connections 63 in the same way that the data for the transceivers 114 flows through such shared channel.

Figure 11:
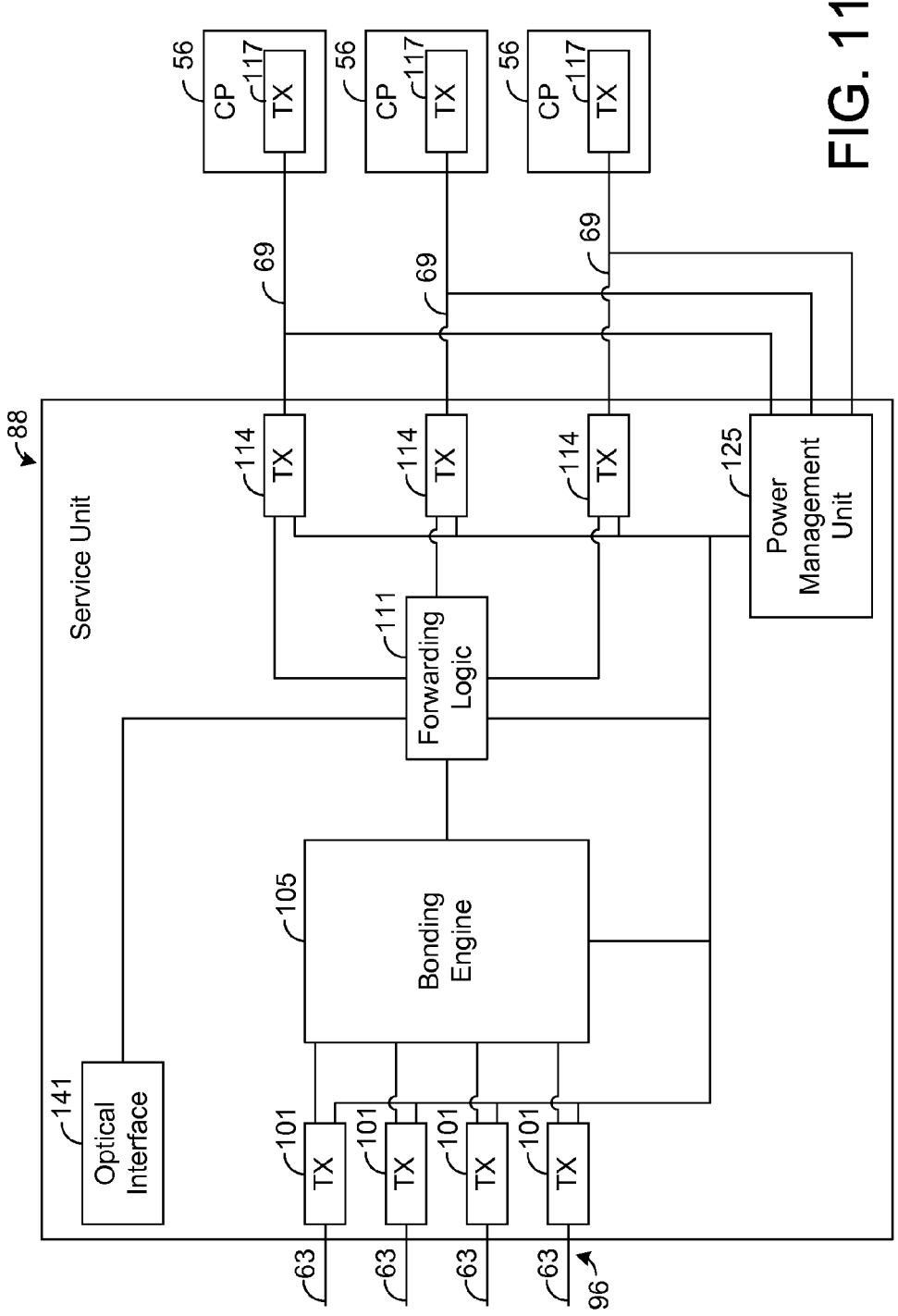
FIG. 11 is a block diagram illustrating an exemplary embodiment of a service unit, such as is depicted by FIG. 4.

In an exemplary embodiment shown by FIG. 11, the service unit 88 comprises an optical interface 141, such as an optical network unit (ONU), for converting an optical data signal to a digital signal defining a high-speed data stream. The optical interface 141, like the other components shown by FIG. 11, may be housed within the environmentally-hardened housing described above. The optical interface 141 is coupled to the forwarding logic 111. When a migration from the channel defined by the connections 63 to an optical channel is desired, an optical fiber (not shown) may be coupled to the optical interface 141. Thus, after such migration, the high-speed data stream forwarded by the forwarding logic 111 is received from the optical interface 141 rather than the bonding engine 105.

Note that the power management unit 125 may be used in a service unit that is not coupled to a bonding group. For example, the connections 63 may not be bonded. In another embodiment of a service unit 88 in which the power management unit 125 is implemented, the service unit 88 does not have transceivers 101 for communicating via copper facilities on the network side of the service unit. As an example, the service unit may have an optical interface 141 on its network side for communicating in a fiber-to-the-DP (FTTDP) architecture without employing any of the transceivers 101. Various other configurations of the service unit 88 are possible in other embodiments.

Figure 12:
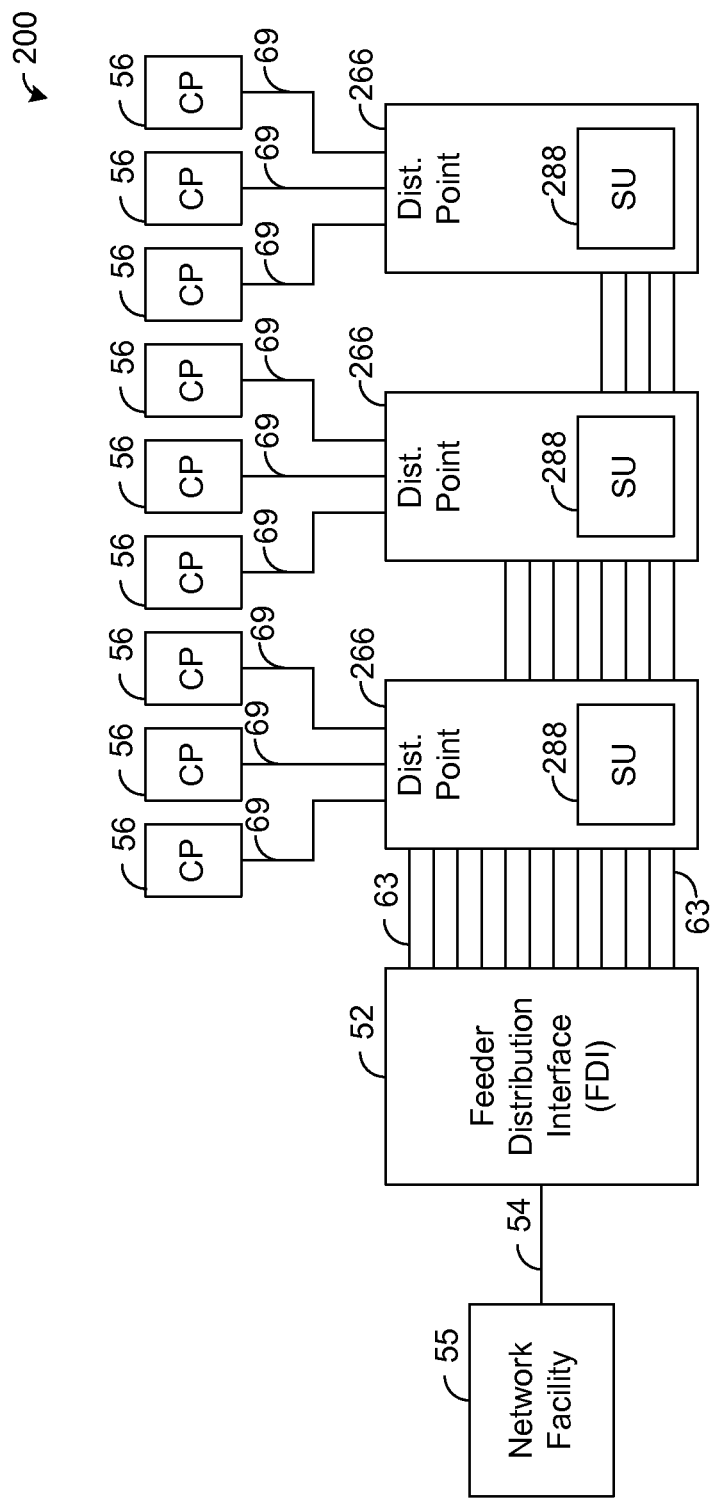
FIG. 12 is a block diagram illustrating an exemplary embodiment of a communication system in accordance with the present disclosure.

When there is extended distance between the DPs 66, active transmission from DP-to-DP can boost the rate of the bonded channel. FIG. 12 shows an exemplary embodiment of a communication system 200 having a plurality of DPs 266 for servicing a plurality of customer premises 56, similar to the embodiment depicted by FIG. 2. However, the DPs 266 are arranged for active communication from DP-to-DP.

Figure 13:
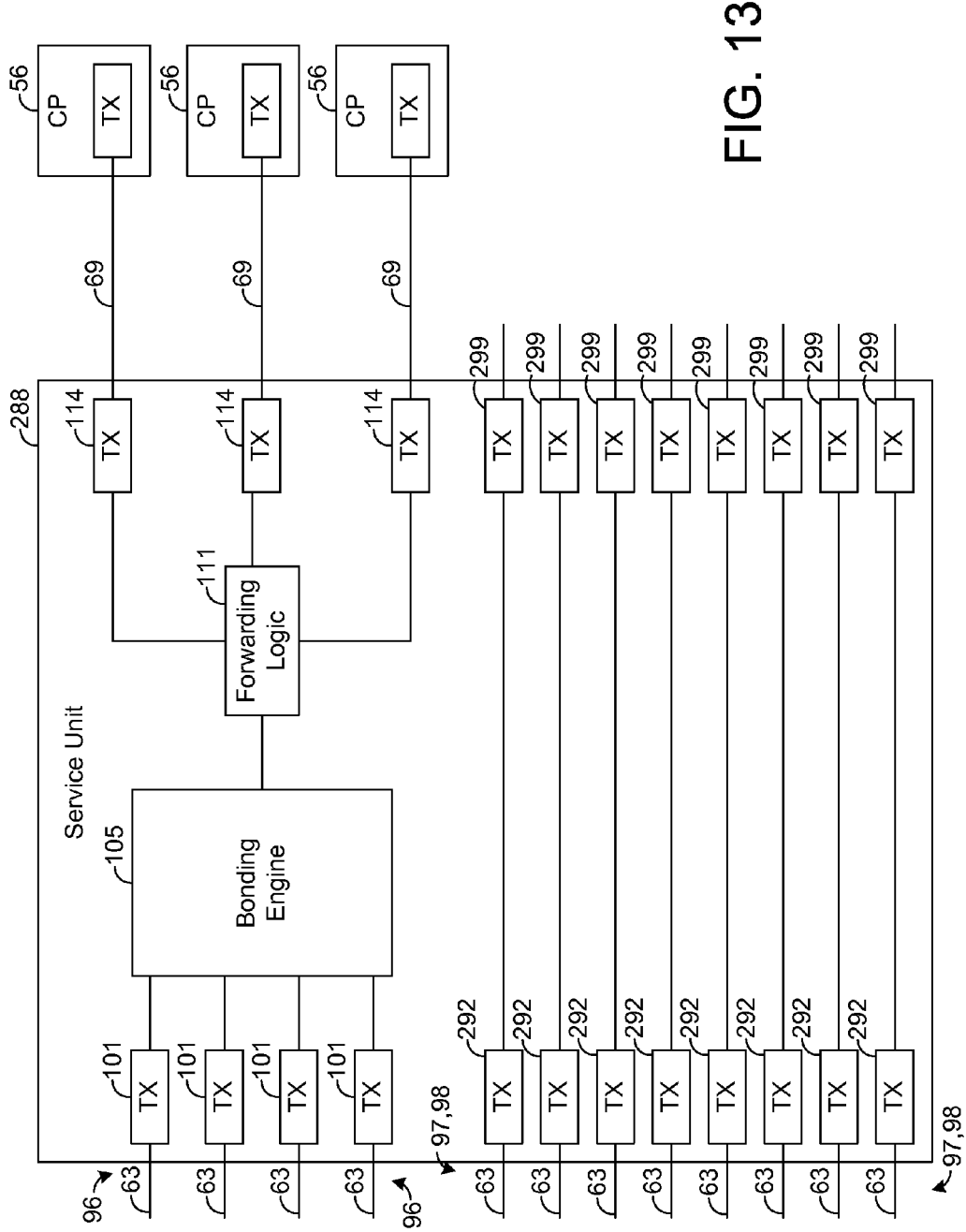
FIG. 13 is a block diagram illustrating an exemplary embodiment of a service unit, such as is depicted by FIG. 12.

Each service unit 288 is coupled to at least one bonding group 96-98 and provides the data from one of the bonding groups 96-98 to at least one customer premises 56. As an example, FIG. 13 shows the service unit 288 for the DP 266 that is coupled directly to the FDI 52 and, thus, to each of the bonding groups 96-98. As shown by FIG. 13, the bonding engine 105 of the service unit 288 is configured to reassemble the fragments carried by the bonding group 96 and to recover the high-speed data stream originally fragmented at the FDI 52 (FIG. 12) and transmitted over the bonding group 96. Further, the forwarding logic 111 forwards the data packets of this high-speed data stream to the customer premises 56, as appropriate. Thus, the data carried by the bonding group 96 is provided to the customer premises 56 in the same way as described above for FIG. 2. Note that the service unit 288 depicted by FIG. 13 may be backpowered by electrical power from the customer premises 56, as described above for FIG. 2, but the components for backpowering the service unit 288 are not shown in FIG. 13 for simplicity of illustration.

Further, in any of the embodiments described herein, it is possible for the service unit to be powered by sources other than customer premises 56. As an example, a service unit may be battery-powered or receive electrical power from the network side, such as from the network facility 55. Various other techniques for powering the components of a service unit are possible in other embodiments.

The DP 266 shown by FIG. 13 has a plurality of transceivers 292, which are each coupled to a respective connection 63 of the bonding groups 97 and 98. Each transceiver 292 is configured to demodulate the data signal received from the FDI 52 in order to recover the digital data carried by such signal. The transceiver 252 then transmits the digital data to another transceiver 299, which modulates a carrier signal with the digital data to form a data signal, which is a regeneration of the data signal received by the transceiver 292. This regenerated signal is transmitted downstream to the service unit 288 of the next DP 266. Thus, the service unit 288 shown by FIG. 13 serves as a repeater for the signals carried by the bonding groups 97 and 98.

The next DP 266 that receives the regenerated signals downstream is similarly configured to provide data from the bonding group 97 to a plurality of customer premises 56 and to regenerate the data signals carried by the bonding group 98. Using DPs 266 as repeaters helps to keep the length of the bonded channels short thereby helping to provide higher data rates through such channels. Note that it is not necessary for any DP 266 to provide a regenerated signal for the data signals passing through it. For example, rather than demodulating a received data signal and then using the data from the received signal to modulate a new carrier signal, a DP 266 may have amplifiers (not shown) that amplify the received signal for transmission to the next DP 266.

Figure 14:
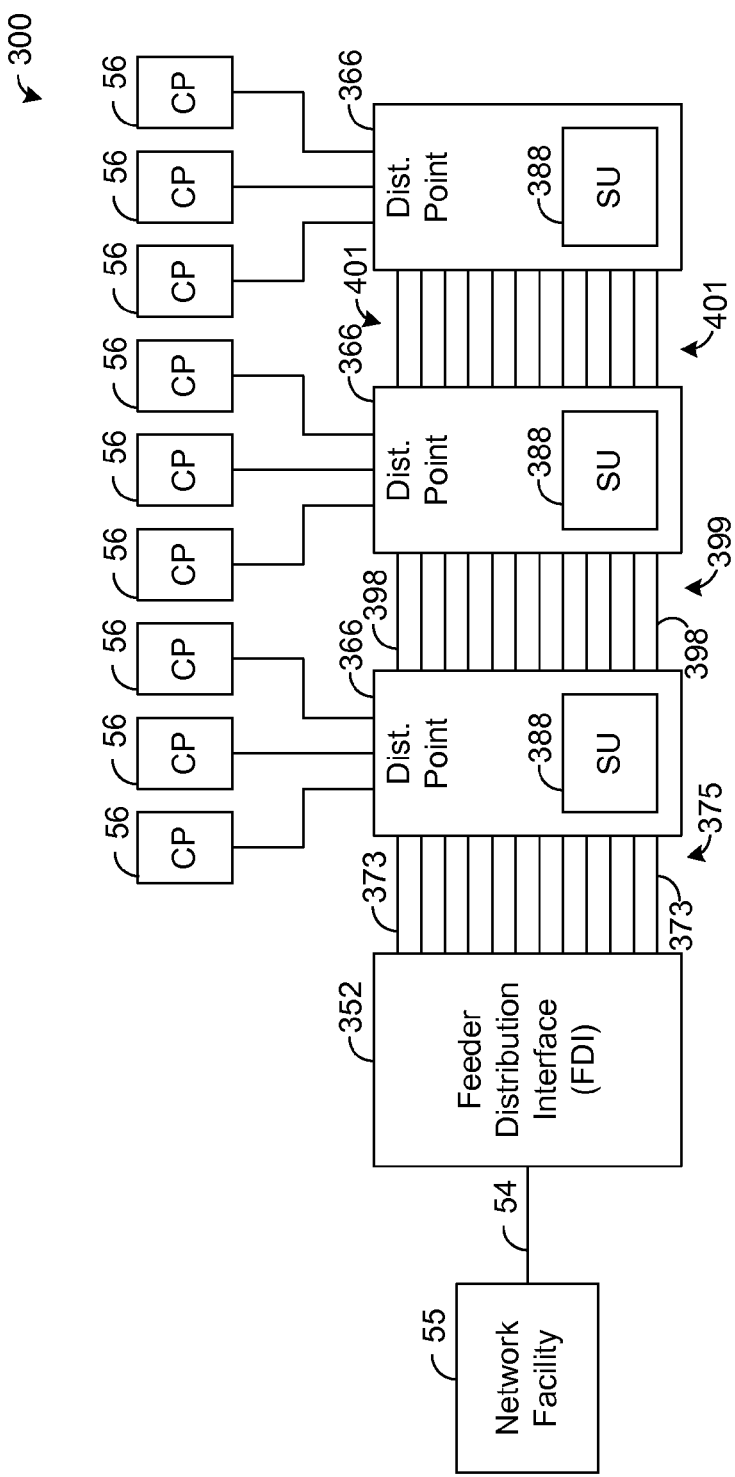
FIG. 14 is a block diagram illustrating an exemplary embodiment of a communication system in accordance with the present disclosure.

In one exemplary embodiment, when there is active communication from DP-to-DP, the data for multiple DPs share the same bonded channel in an effort to provide even greater peak rates for at least some subscribers. FIG. 14 depicts an exemplary embodiment of a communication system 300 in which data for multiple DPs share the same bonded channel. The communication system 300 has an FDI 352 and a plurality of DPs 366 for servicing a plurality of customer premises 56, similar to the embodiment depicted by FIG. 2. However, the DPs 366 are arranged for active communication from DP-to-DP.

Further, a plurality of communication connections 373 forming a single bonding group 375 extend from the FDI 352 to a DP 366, as shown by FIG. 14. As will be described in more detail below, this bonding group 375 carries data for each of the DPs 366.

Figure 15:
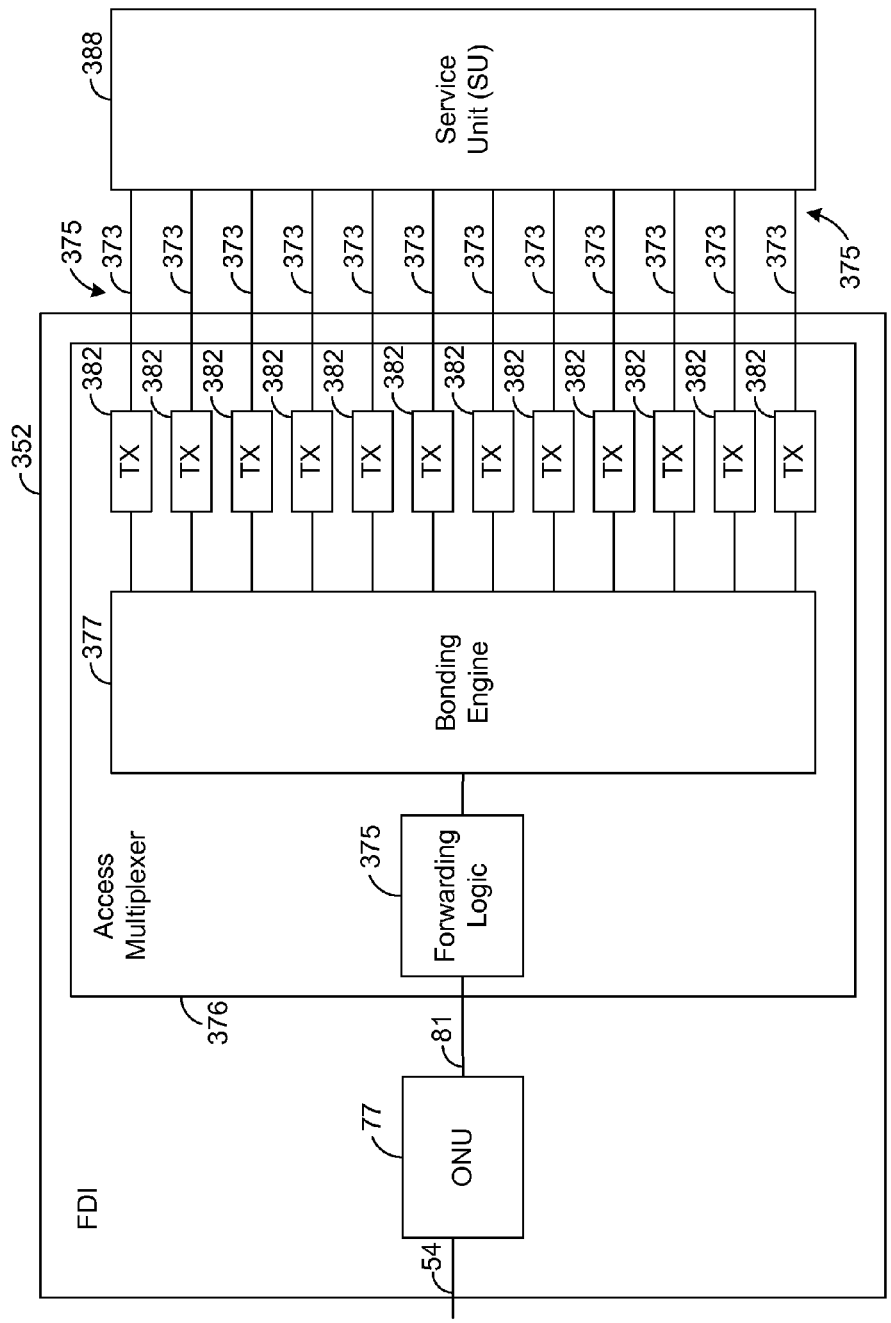
FIG. 15 is a block diagram illustrating an exemplary embodiment of a feeder distribution interface, such as is depicted by FIG. 14.

FIG. 15 shows an exemplary embodiment of the FDI 352 shown by FIG. 14. Forwarding logic 375 of an access multiplexer 376 receives the high-speed data stream transmitted from the ONU 77 and forwards packets of the high-speed data stream to a bonding engine 377. The bonding engine 377 is configured to fragment the data packets of this high-speed stream and distribute the fragments to a plurality of transceivers 382, which transmit the fragments across a plurality of communication connections 373, such as twisted-wire pairs. The embodiment of FIG. 15 is similar to that shown by FIG. 4, which forms three bonding groups 96-98, except that a single bonding group 375 is used to carry the fragments for multiple DPs 266. Note that the access multiplexer 376 may have transceivers and/or other bonding engines not shown by FIG. 15 to which the forwarding logic 375 may forward data packets received from the ONU 377.

Figure 16:
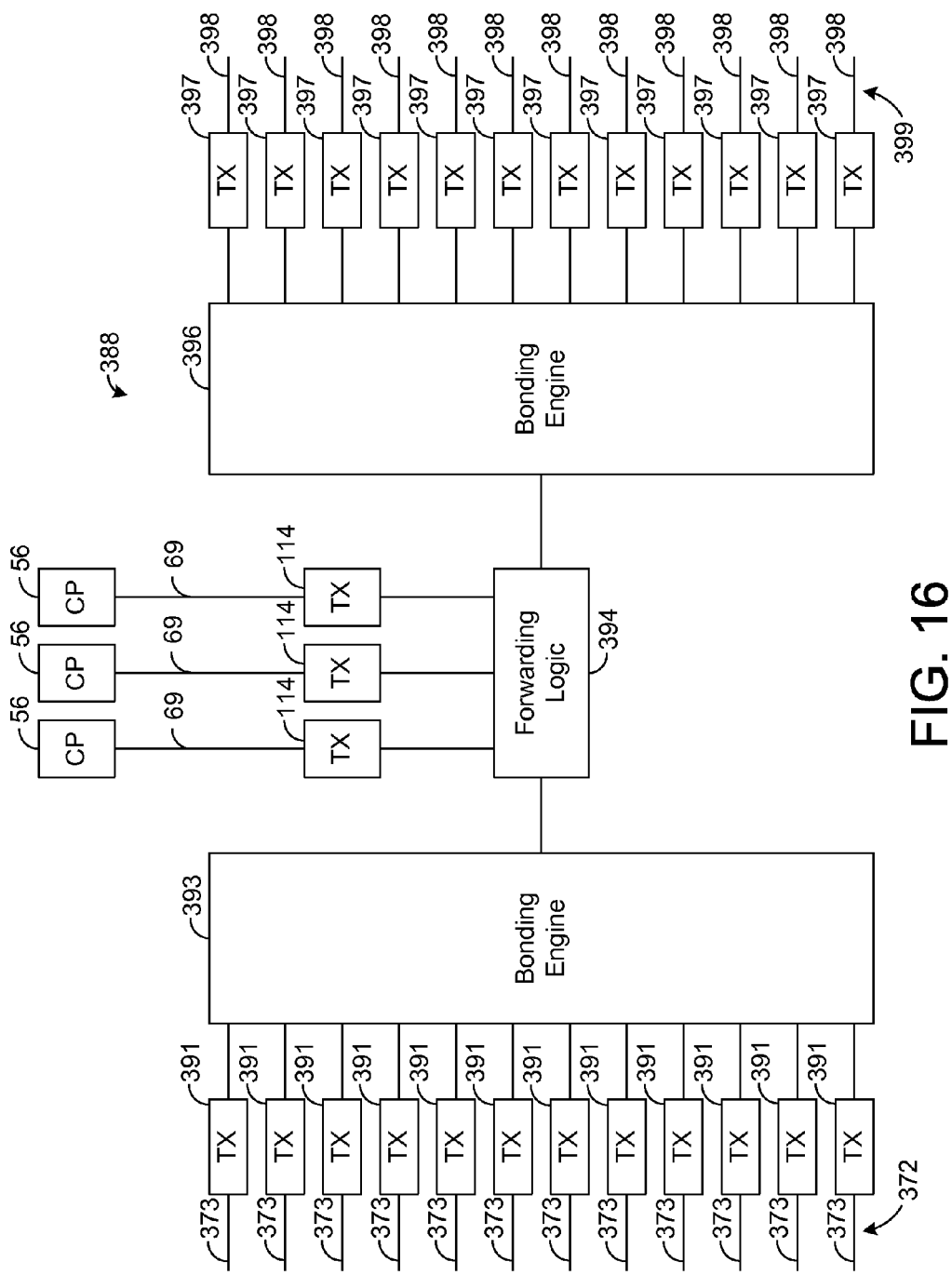
FIG. 16 is a block diagram illustrating an exemplary embodiment of a service unit, such as is depicted by FIG. 15.

FIG. 16 depicts an exemplary embodiment of the service unit 388 at the DP 366 that is coupled directly to the FDI 352. The service unit 388 has a plurality of transceivers 391. Each of the transceivers 391 is coupled to a respective one of the connections 373 of the bonding group 375 and demodulates the data signal received from such connection 373 to recover the fragments carried by the connection 373. A bonding engine 393 reassembles the fragments and recovers the high-speed data stream originally fragmented by the bonding engine 377 (FIG. 15).

Forwarding logic 394 is configured to receive this high-speed data stream and to forward the data packets in this stream based on their destination addresses. In this regard, data packets destined for the customer premises 56 shown by FIG. 16 and coupled directly to the service unit 388 by drop connections 69 are transmitted to transceivers 114, as appropriate, such that they arrive at their respective destinations. The other data packets, which are destined for customer premises 56 coupled directly to downstream DPs 366, are transmitted to a bonding engine 396. The bonding engine 396 is configured to fragment the received data packets and distribute the fragments to a plurality of transceivers 397, which transmit the fragments across a plurality of communication connections 398, such as twisted-wire pairs. Thus, the connections 398 form a bonding group 399 between the service unit 388 shown by FIG. 16 and the service unit 388 of the next downstream DP 366. Note that this next downstream service unit 388 may be configured similar to the one shown by FIG. 16 in order to provide a portion of the data carried by the bonding group 399 to customer premises 56 coupled directly to the downstream service unit 388 and to provide the remaining portion of such data to another DP 366 via a bonding group 401 (FIG. 14).

Accordingly, in the embodiment depicted by FIG. 14, a given bonded channel, such as a bonding group 375 or 399, may carry data for multiple DPs 366. Thus, the number of customers sharing the same bonded channel can be increased making it more likely that, at any given time, a greater number of CP transceivers 117 serviced by the same bonded channel will be inactive.

It should be noted that FIGS. 14-16 show the same number of communication connections within each bonding group 375, 399, and 401, but such a feature is unnecessary. For example, the bonding group 399 may have fewer connections 398 than the number of connections 373 in the bonding group 375 since the bonding group 399 carries less data on average. Further, it is possible for the bonding group 399 to have more connections 398 than the number of connections 373 in the bonding group 375. For example, a shorter distance or a different modulation for the bonding group 375 relative to the bonding group 399 may allow the bonding group 375 to communicate more data across the same number or fewer connections 373 as the number of connections 398 in the bonding group 399. Moreover, any bonding group 375, 399, or 401 may have more or fewer connections than any of the other bonding groups.

Figure 17:
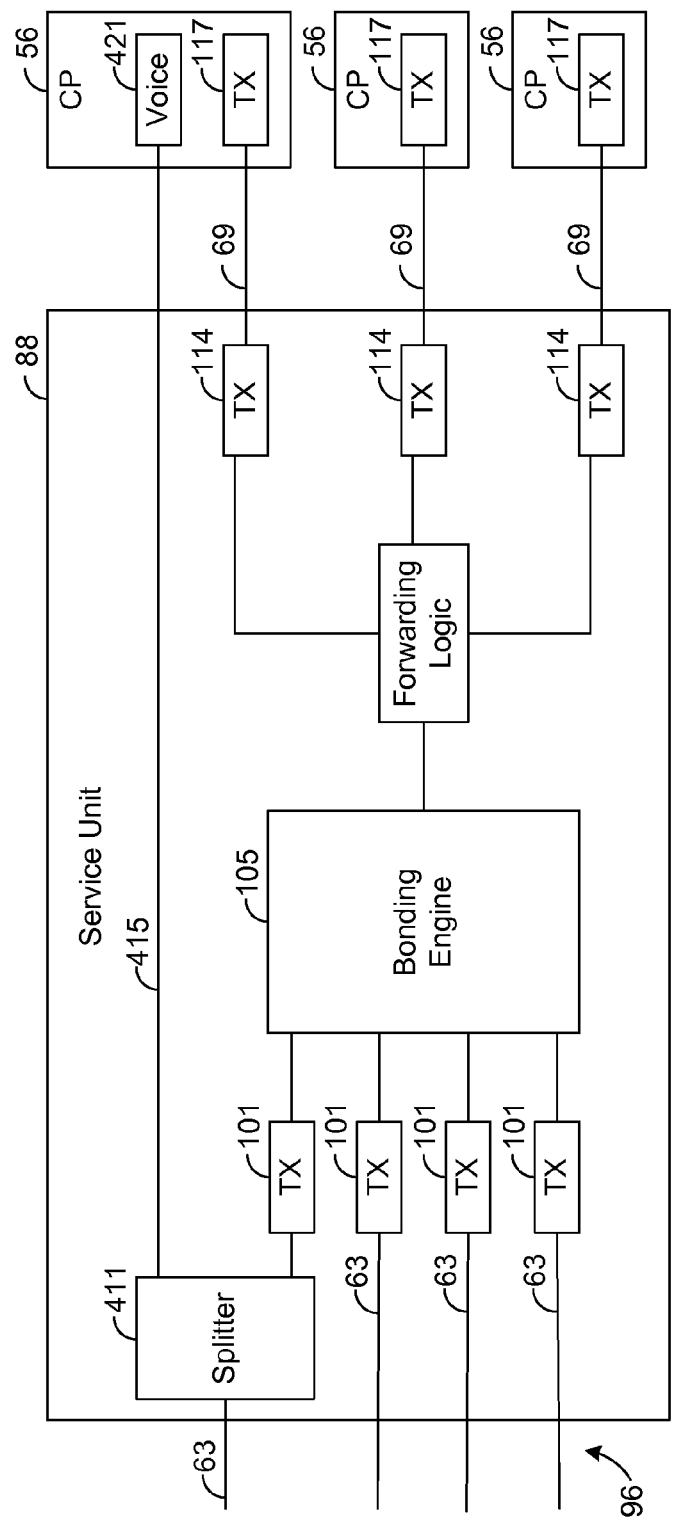
FIG. 17 is a block diagram illustrating an exemplary embodiment of a service unit, such as is depicted by FIG. 3.

FIG. 17 depicts an exemplary embodiment of a service unit 88, such as is depicted by FIG. 3. The service unit 88 of FIG.

Figure 18:
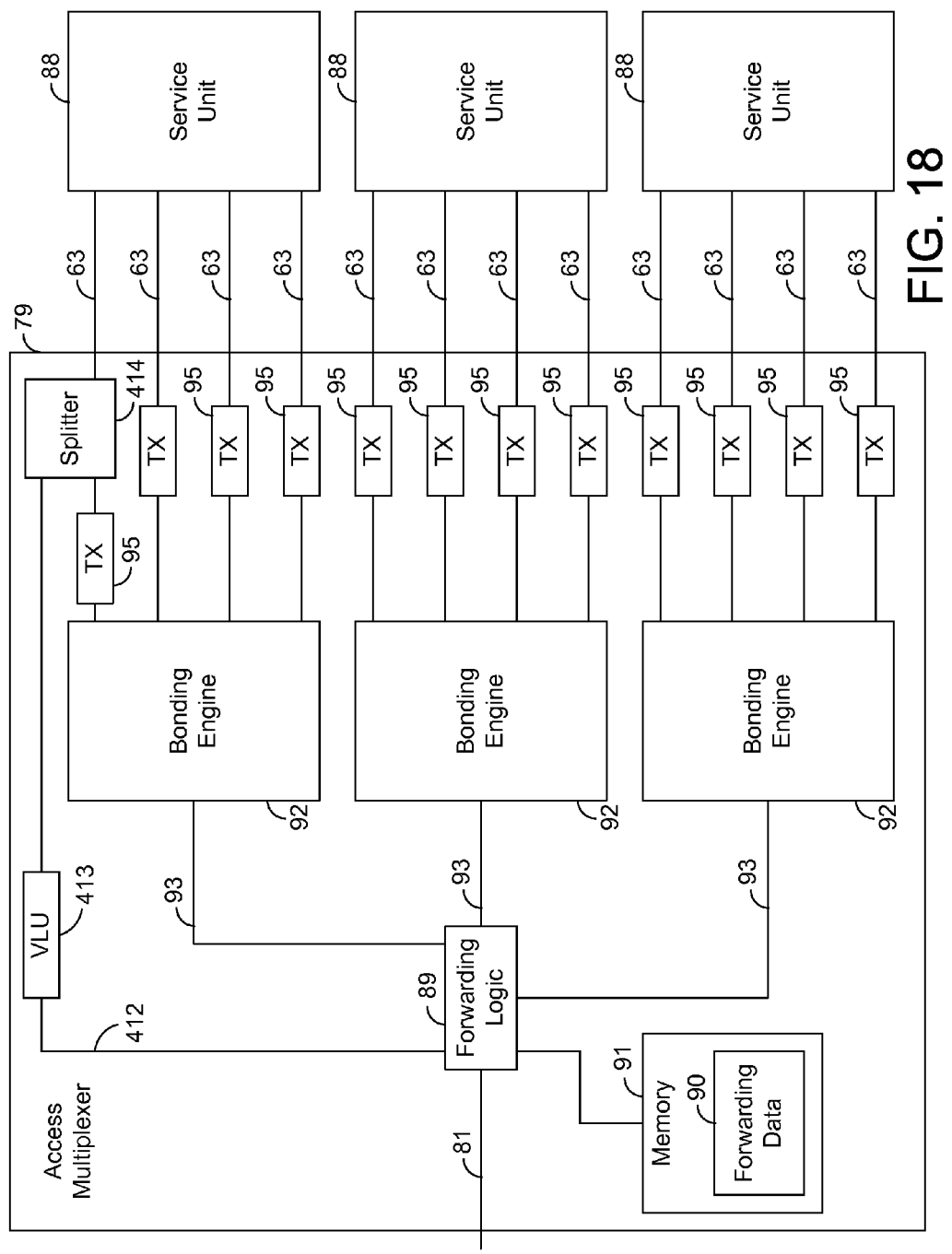
FIG. 18 is a block diagram illustrating an exemplary embodiment of an access multiplexer, such as is depicted by FIG. 3.

17 has a splitter 411 that is coupled to one of the connections 63 of a bonding group 96. The connection 63 coupled to the splitter 411 carries a broadband signal and a voiceband signal. As an example, voice data (e.g., VoIP) may be embedded in the optical data signal received by the FDI 52 (FIG. 2) from the network facility 55. As shown by FIG. 18, the voice data and associated signaling data are forwarded by the forwarding logic 89 via a connection 412 to a voice line unit 413. The voice line unit 413 converts the voice data to an analog voiceband signal and signaling data to telephone signaling functions (e.g., battery, ringing, etc.), which is received by a splitter 414. The splitter 414 combines the voiceband signal from the voice line unit 413 with a broadband signal from a transceiver 95 that is coupled to the splitter 414. Such broadband signal carries the fragments transmitted to the foregoing transceiver 95 by the bonding engine 92 that is coupled to such transceiver 95. The voiceband signal is transmitted at a lower frequency, such as between about 0 and 4000 Hertz (Hz), than the modulated broadband signal. As an example, the broadband signal may be at a frequency greater than about 25 kilo-Hertz (kHz). The voiceband signal and broadband signal are combined on the connection 63 by the splitter 414 to form a combined signal that can be filtered to separate the voiceband signal from the broadband signal. Other techniques for transmitting both a voiceband signal and a broadband signal at different frequencies across a connection 63 are possible in other embodiments.

Figure 19:
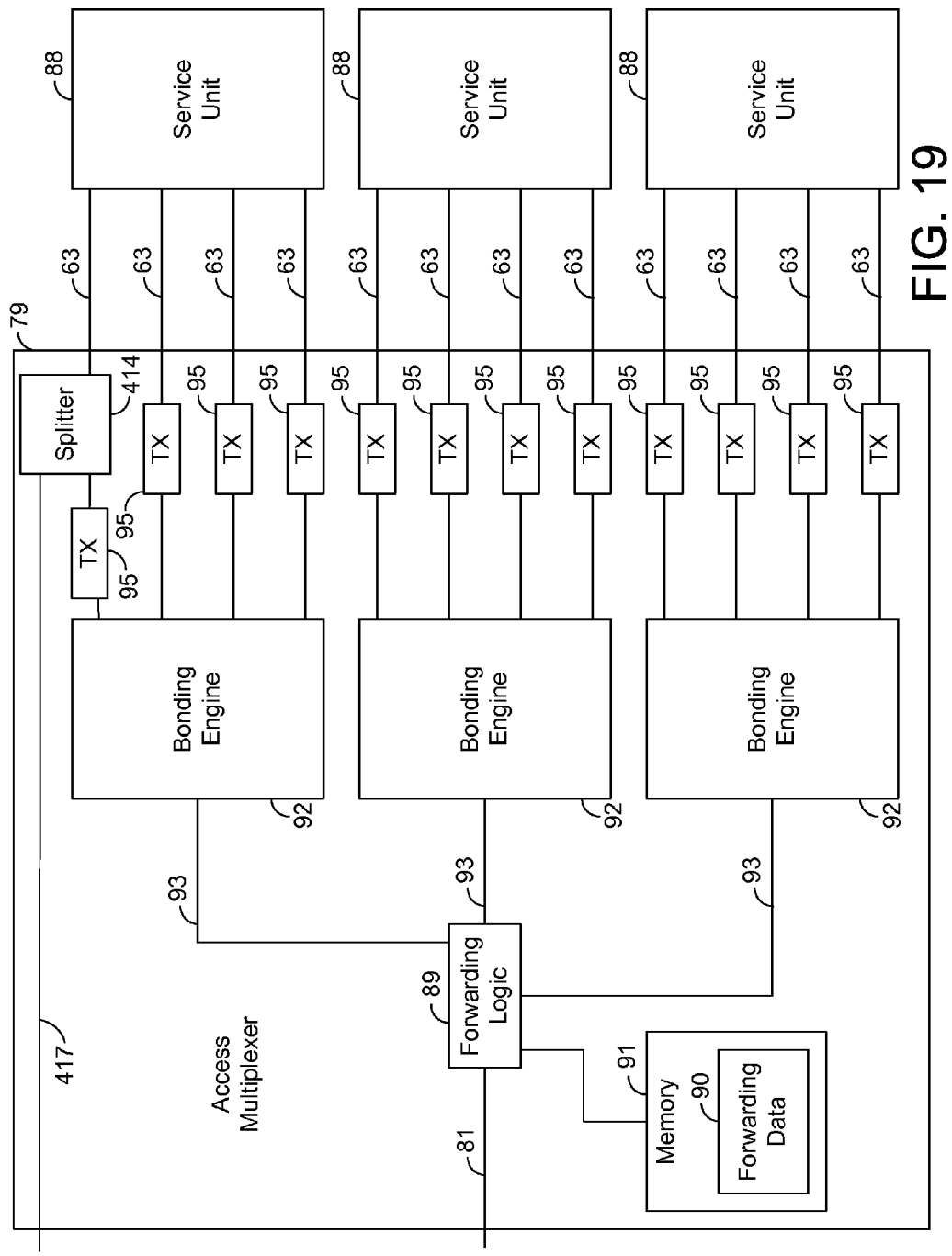
FIG. 19 is a block diagram illustrating an exemplary embodiment of an access multiplexer, such as is depicted by FIG. 3.

Further, FIG. 19 shows another exemplary embodiment for combining a voiceband signal and broadband signal on the same connection 63. As shown by FIG. 19, one of the transceivers 95 is coupled to a splitter 414. The splitter 414 is coupled to a communication connection 417, such as a twisted-wire pair, that extends from the access multiplexer 79 to the network facility 55 (FIG. 2). This connection 417 carries an analog voiceband signal for voice communication. The splitter 414 combines the voiceband signal from connection 417 with a broadband signal from the transceiver 95 that is coupled to the splitter 414. Such broadband signal carries the fragments transmitted to the foregoing transceiver 95 by the bonding engine 92 that is coupled to such transceiver 95. Similar to the embodiment shown by FIG. 18, one of the connections 63 of FIG. 19 carries a combined voiceband and broadband signal that can be filtered to separate the voiceband signal from the broadband signal. Note that the splitter 414 may reside at locations other than the FDI. As an example, the splitter 414 may be implemented in a service unit 88 or at another point in the network. If the splitter 414 combines a voiceband signal and broadband signal to form a combined signal at a service unit 88, then the combined signal may be filtered to separate the voiceband signal and the broadband signal at a customer premises 56 or a location close to a customer premises 56, as will be described in more detail hereafter.

Referring again to FIG. 17, the splitter 411 is configured to separate the broadband signal from the voiceband signal. The broadband signal is transmitted to the transceiver 101 that is coupled to the splitter 411. The voiceband signal is transmitted via a conductive connection 415, such as a twisted-wire pair, to a voiceband terminal device 421, such as a telephone. In such an embodiment, utilization of the connection 415 to reverse power components of the service unit 88 may be problematic due to POTS ringing voltages.

Figure 20:
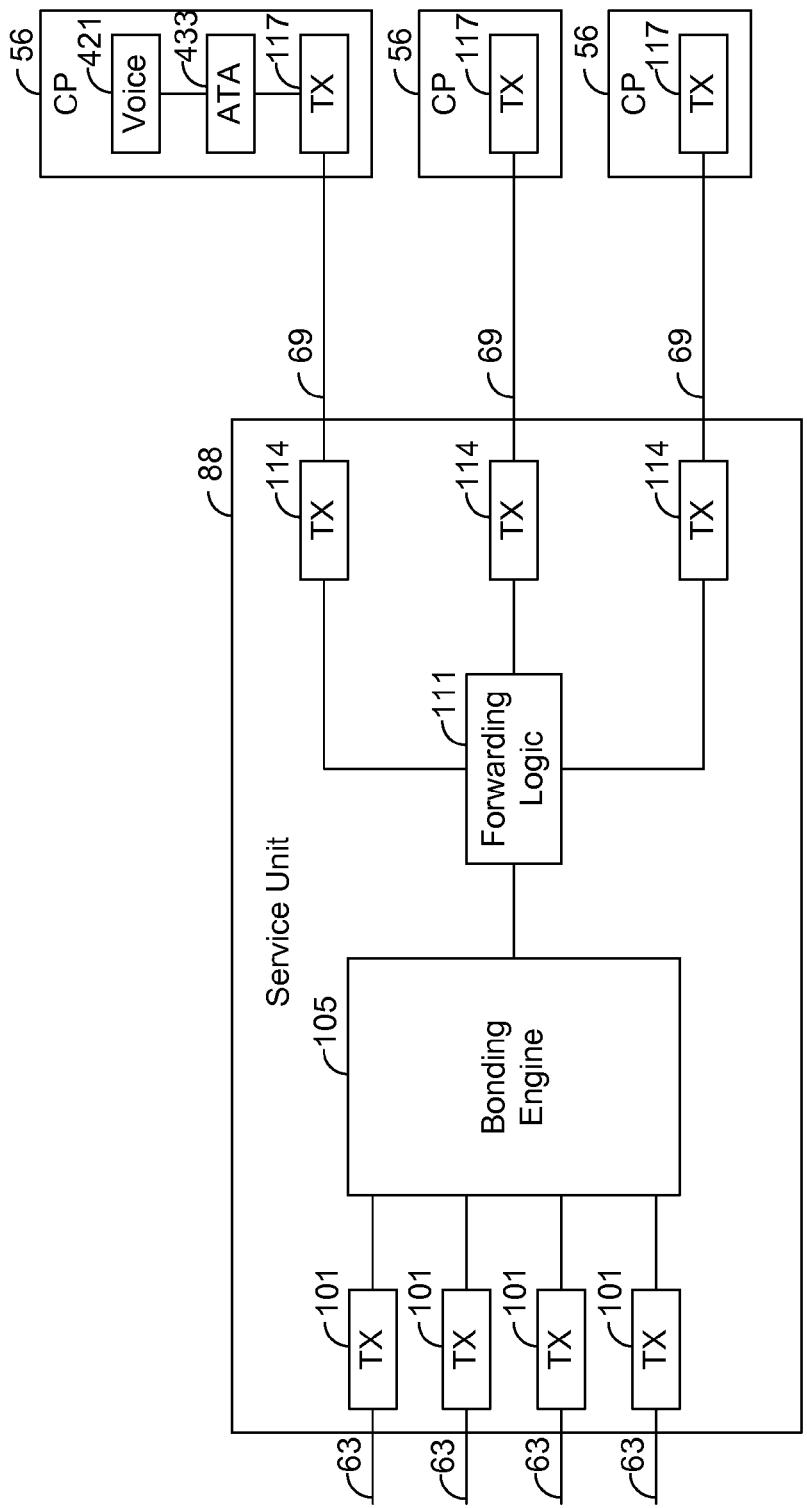
FIG. 20 is a block diagram illustrating an exemplary embodiment of a service unit, such as is depicted by FIG. 3.
Figure 21:
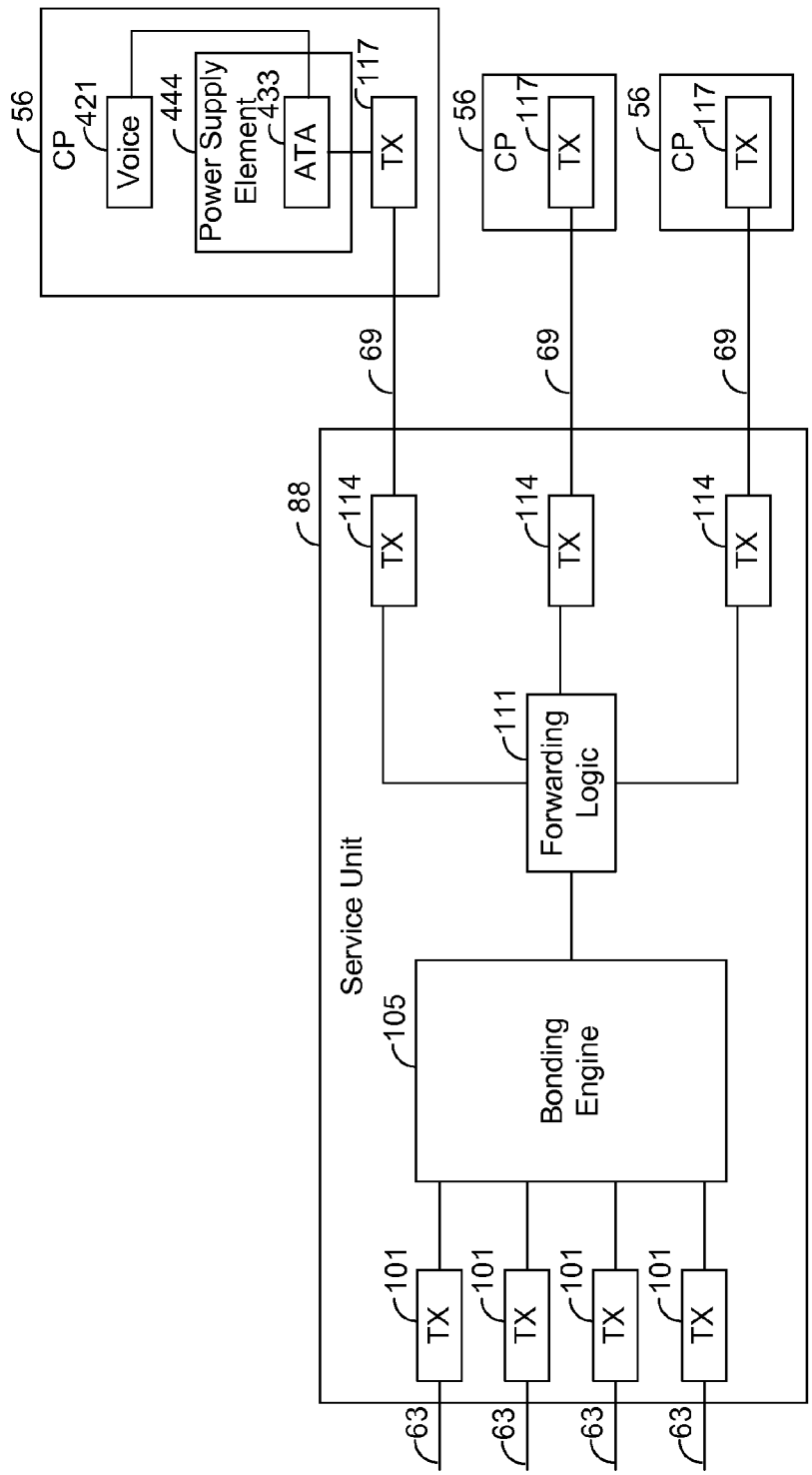
FIG. 21 is a block diagram illustrating an exemplary embodiment of a service unit, such as is depicted by FIG. 3.

In another exemplary embodiment, voice data is not split from the broadband data at the FDI 52 but is rather carried along with the broadband data to the customer premises 56. FIG. 20 depicts such an embodiment. As shown by FIG. 20, an analog terminal adapter (ATA) 433 at the customer premises 56 is coupled to the voiceband terminal device 421. The ATA 433 converts the voice data to an analog signal and provides the analog signal to the voiceband terminal device 421. If desired, the ATA 433 and the CP transceiver 117 may be integrated with the CP transceiver 117 at the same customer premises 56 and housed within the same housing unit (not shown). However, other locations are also possible. For example, it is possible for the service unit 88 to be backpowered from the customer premises 56 via a power supply element 444 that is separate from the CP transceiver 117, as shown by FIG. 21. The ATA 433 may be integrated with the power supply element 444 and housed within the same housing unit (not shown). Yet other locations of the ATA 433 are possible in other embodiments.

Figure 22:
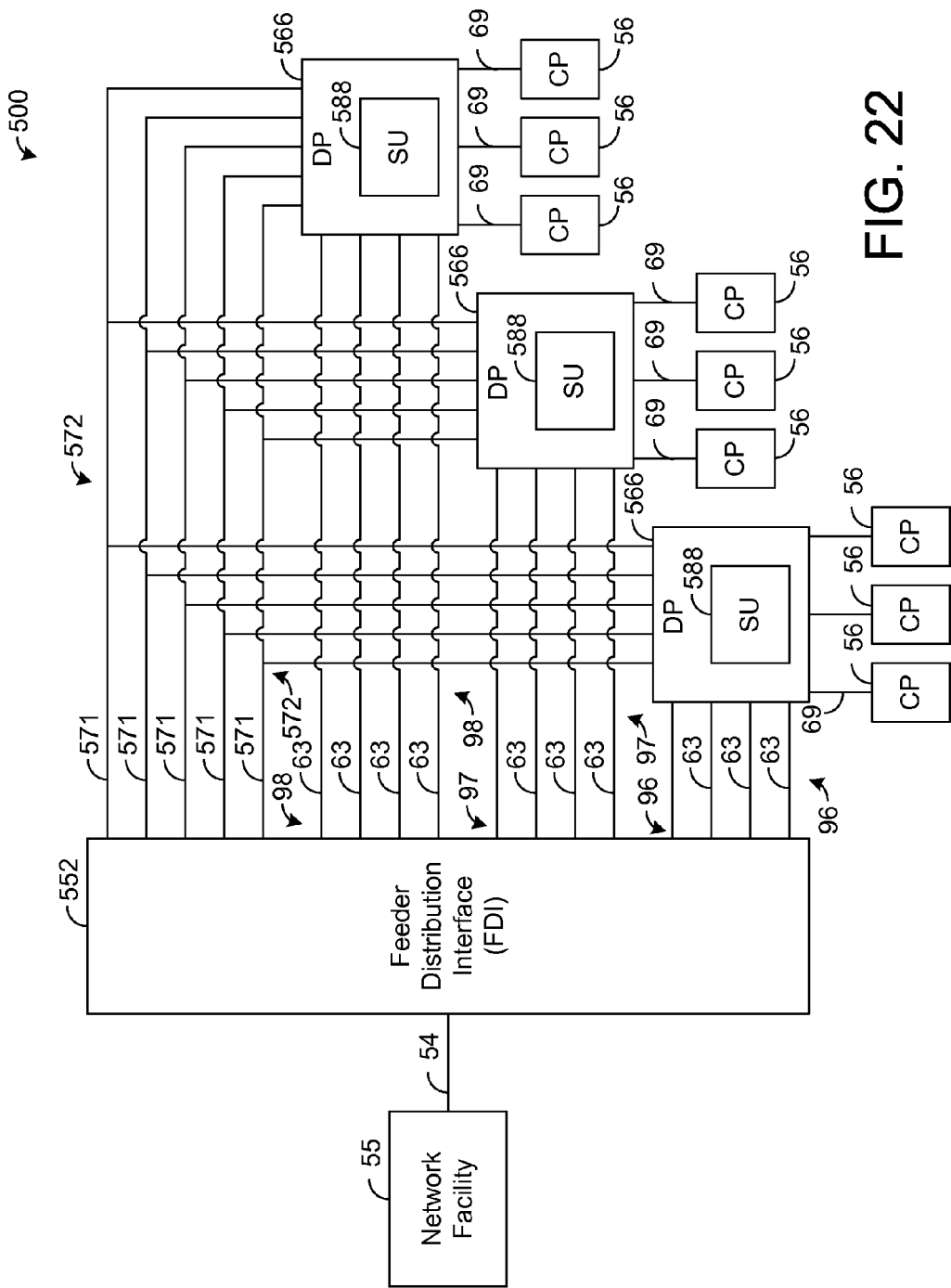
FIG. 22 is a block diagram illustrating an exemplary embodiment of a communication system in accordance with the present disclosure.

FIG. 22 depicts an exemplary embodiment of a communication system 500 that is configured to provide unicast and multicast flows to the customer premises 56. A unicast flow generally refers to a flow of data that is destined for a single destination, which is assumed to be a customer premises 56 for the purposes of illustration herein. A multicast flow generally refers to a flow of data that is destined for multiple destinations. Internet Protocol television (IPTV) is an example of an application that uses multicast flows. In such an example, each multicast flow defines a different TV channel, and multiple customers viewing the same channel may be sent the same multicast flow so that it is unnecessary to transmit the same flow multiple times. For illustrative purposes, it will be assumed that the multicast flows described hereafter are for IPTV. However, it should be emphasized that other types of multicast flows are possible and may be communicated in the system 500 in lieu of or in addition to IPTV.

As shown by FIG. 22, the system 500 is configured similar to the system 50 shown by FIG. 2. In this regard, the system 500 has a plurality of bonding groups 96-98 that extend from an FDI 552 to a plurality of DPs 566. As will be described in more detail hereafter, the connections 63 in the bonding groups 96-98 are used primarily to carry unicast flows and are point-to-point (PTP) connections. The FDI 552 is configured to transmit unicast flows via the PTP connections 63 according to the techniques described above for the system 50. Thus, the data flowing to the same DP 566 flows through the same bonding group 96-98, which provides a shared channel for such data. If a CP transceiver 117 (FIG. 5) serviced by a particular bonding group 96-98 becomes inactive, the data rate of the other active CP transceivers 117 serviced by the same bonding group 96-98 can be increased, thereby providing higher peak data rates than would otherwise be possible when a shared channel is not employed.

Additional conductive connections 571, such as twisted-wire pairs, extend from the FDI 552 to each DP 566. As will be described in more detail below, these connections 571 are used to communicate multicast flows and are point-to-multipoint (PTM) connections. In this regard, each PTM connection 571 extends from a point at the FDI 552 to multiple points, one at each respective DP 566. Thus, data carried by any of the connections 571 is received at each DP 566. In one exemplary embodiment, as will be described in more detail below, the PTM connections 571 are bonded to form a bonding group 572, referred to hereafter as the "PTM bonding group."

Figure 23:
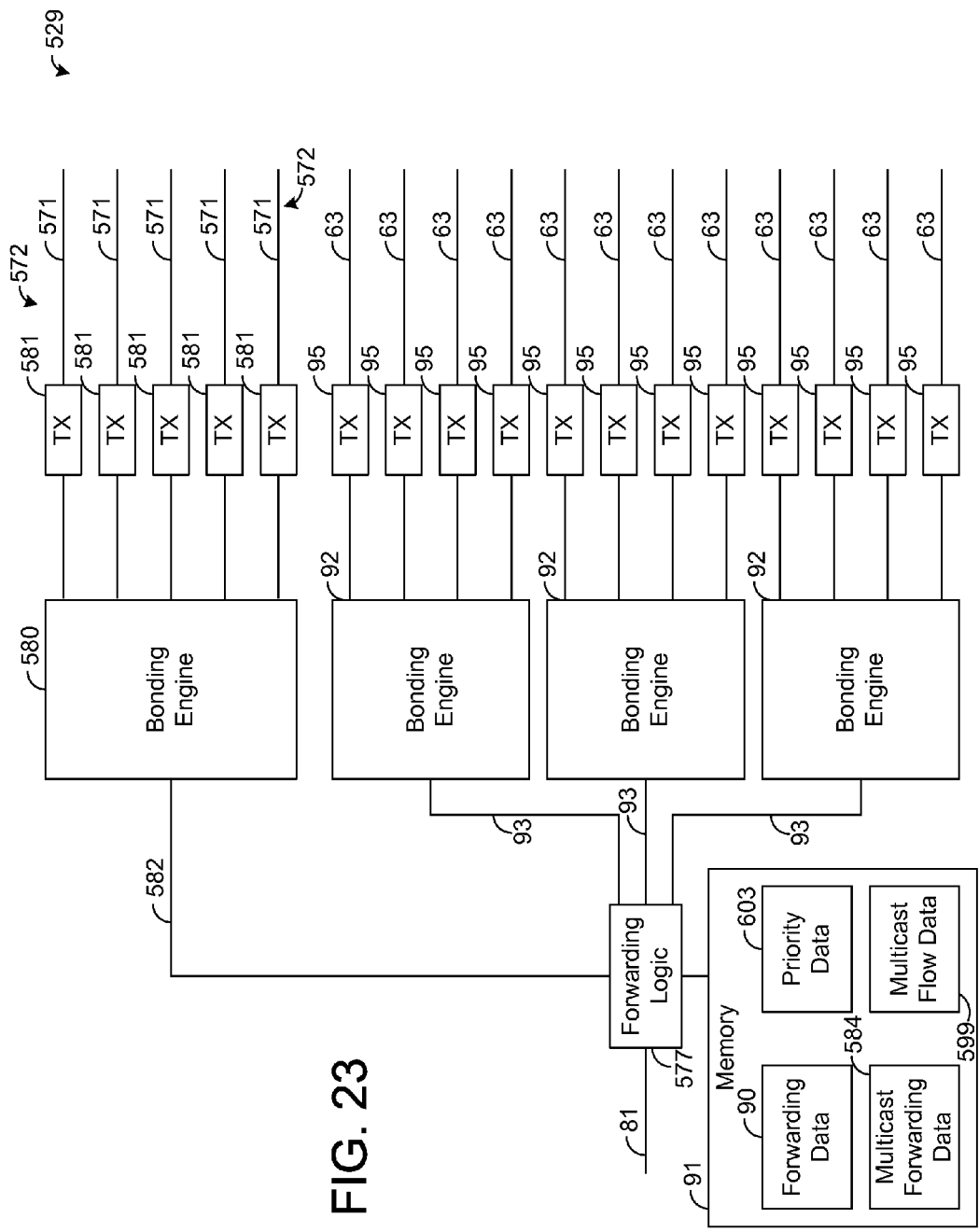
FIG. 23 is a block diagram illustrating an exemplary embodiment of an access multiplexer at a feeder distribution interface (FDI), such as is depicted by FIG. 22.

FIG. 23 depicts an exemplary embodiment of an access multiplexer 529 of the FDI 552 of FIG. 22. As shown by FIG. 23, the FDI 552 comprises forwarding logic 577 that is configured to forward data from the connection 81 to the bonding engines 92 according to techniques similar to those described above for the forwarding logic 89 of FIG. 4. In this regard, forwarding data 90 provides the forwarding logic 577 with sufficient information to map data packets (e.g., data packets of unicast flows) to the appropriate bonding engine 92, as described above.

The forwarding logic 577 is also coupled to a bonding engine 580 via a conductive connection 582. The bonding engine 580 is coupled to a plurality of transceivers 581 that are respectively coupled to the PTM connections 571, as shown by FIG. 23. In one exemplary embodiment, the transceivers 581 are configured to utilize the similar modulation techniques as transceivers 95 but are adapted for communication over PTM connections, such as handling upstream communication from multiple points. In other embodiments, dissimilar modulation techniques relative to those employed by the transceivers 95 are possible.

The forwarding logic 577 is configured to forward data packets of multicast flows to the bonding engine 580 based on multicast forwarding data 584 that is stored in memory 91. In this regard, each multicast flow is identified by an identifier, referred to hereafter as "multicast flow identifier." Each data packet within a given multicast flow has a multicast flow identifier that identifies such flow. Further, the multicast forwarding data 584 generally maps the multicast flow identifiers to the connection 582 so that the forwarding logic 577 will forward the data packets of multicast flows to the bonding engine 580 for transmission across the PTM connections 571. In particular, except as otherwise described herein, the multicast forwarding data 584 maps each multicast flow identifier to the connection 582, and the forwarding logic 577 uses the data 584 to forward each multicast data packet to the bonding engine 580 unless the packet's multicast flow identifier is mapped to one of the connections 93 as will be described in more detail hereafter.

The bonding engine 580 fragments each received packet into a plurality of fragments, similar to how the bonding engines 92 fragment the packets of unicast flows, as described above. The bonding engine 580 then transmits the fragments to the transceivers 581 for transmission across the PTM connections 571 such that the fragments for the same packet may travel across different connections 571. Indeed, a fragment from any packet may travel across any of the PTM connections 571. Since each PTM connection 571 is coupled to each of the DPs 566, a fragment transmitted over any connection 571 will reach all of the DPs 566 and, hence, needs to be transmitted over only one connection 571, even if the fragment is from a packet of a multicast flow that is needed by multiple DPs 566. In this regard, each DP 566 receives each fragment of the packet regardless of which connections 571 carry the fragments, and any of the DPs 566 can reassemble the fragments to recover the packet. Thus, all of the fragments from the bonding engine 580 are received at each DP 566, and any of the DPs 566 can recover any of the packets fragmented by the bonding engine 580.

Figure 24:
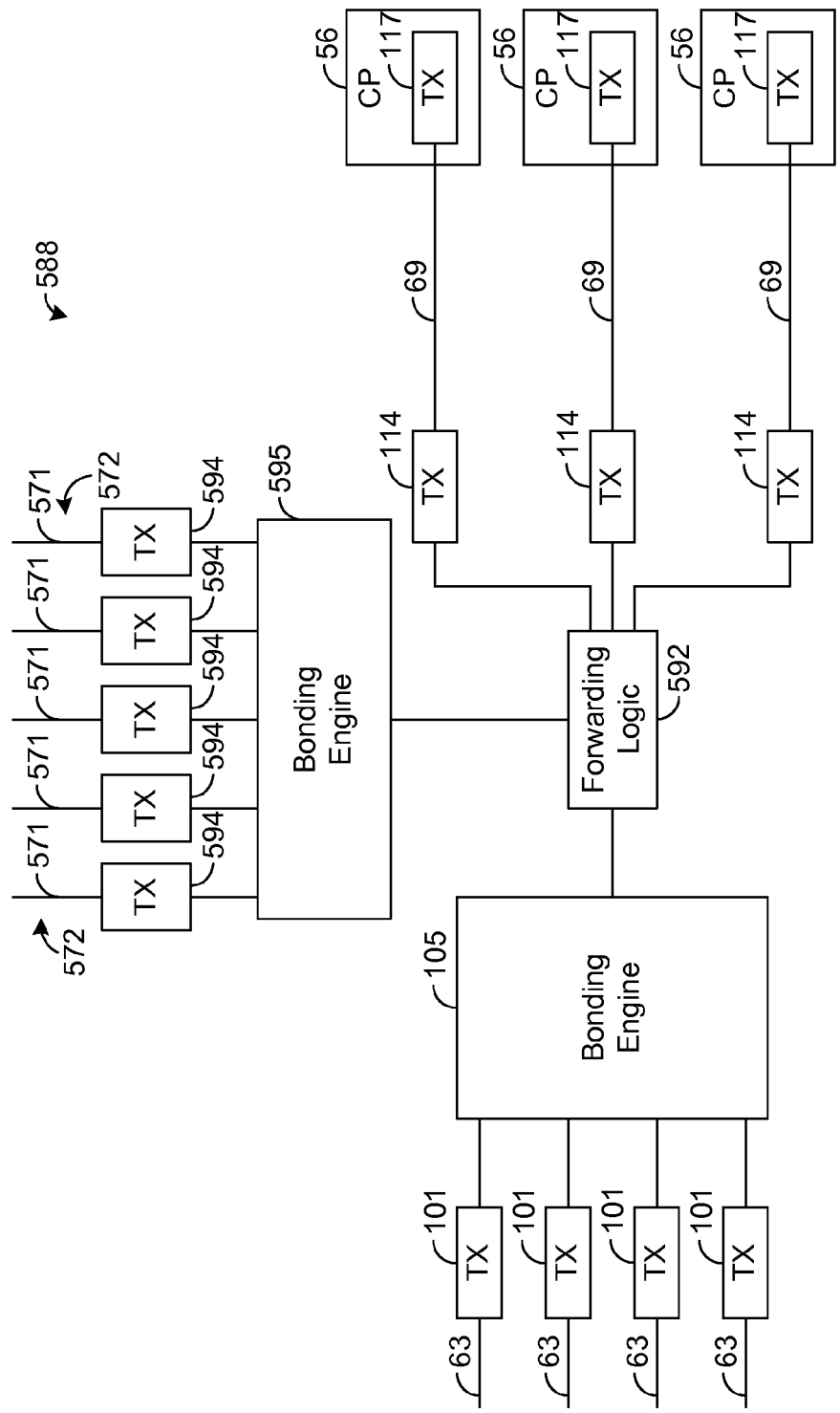
FIG. 24 is a block diagram illustrating an exemplary embodiment of a service unit, such as is depicted by FIG. 22.

FIG. 24 depicts an exemplary embodiment of a service unit 588 at a DP 566. The service unit 588 is similar to the service unit 88 depicted by FIG. 5 and handles data from the connections 63 in the same way as the service unit 88. In this regard, the bonding engine 105 reassembles fragments from the PTP connections 63 and recovers the data stream originally fragmented by a bonding engine 92 (FIG. 23) at the FDI 552. The data packets from this recovered data stream are forwarded by forwarding logic 592 to a plurality of transceivers 114 for communication to the appropriate CP transceiver 117.

However, the forwarding logic 592 also receives packets of the multicast flows transmitted across the PTM connections 571. In this regard, each PTM connection 571 is coupled to a respective transceiver 594, as shown by FIG. 24. Further, each transceiver 594 is coupled to a bonding engine 595 and is configured to demodulate the data signal received from its respective connection 571 to recover the fragments carried by such signal. The transceivers 594 transmit the fragments to the bonding engine 595, which is configured to recover based on such fragments the data packets originally fragmented by the bonding engine 580 (FIG. 23) at the FDI 552. The bonding engine 595 transmits each recovered packet to the forwarding logic 592, which forwards the data packets to the appropriate transceivers 114. If multiple CP transceivers 117 serviced by the same DP 566 are interested in a particular multicast flow that is transmitted via PTM connections 571, the forwarding logic 592 at such DP 566 then transmits each packet of such flow to each CP transceiver 117 deemed by the forwarding logic 592 to be interested in the flow. Accordingly, data packets for unicast flows are generally received by the forwarding logic 592 from the PTP connections 63, which are bonded to provide a shared channel, and data packets for multicast flows are generally received by the forwarding logic 592 from the PTM connections 571, which are also bonded to provide a shared channel.

Upstream communication across the PTM connections 571 from the customer premises 56 to the FDI 552 is similarly fragmented. In particular, a packet from any of the CP transceivers 117 to be transmitted via the PTM connections 571 is forwarded to the bonding engine 595 by the forwarding logic 592 is fragmented by the bonding engine 595. Any fragment may be transmitted across any of the connections 571 such that fragments from the same packet may travel across multiple PTM connections 571. The bonding engine 580 (FIG. 23) at the FDI 552 is configured to recover the data packets based on the transmitted fragments. Since the upstream packets are transmitted from a single service unit transceiver to a single FDI transceiver, the communication of such packets is effectively PTP transmission across PTM connections 571. Upstream packets from the CP transceivers 117 to be transmitted across the PTP connections 63 are similarly fragmented by the bonding engine 105 and recovered at the FDI 552.

Note that the upstream communication from the transceivers 594 (FIG. 24) at the service unit 588 to the transceivers 581 (FIG. 23) at the FDI 552 can be handled in a variety of ways. Since a transceiver 594 at one DP 566 is coupled to a transceiver 594 at each of the other DPs 566 via a PTM connection 571, a protocol or technique for sharing the connection 571 is desired. In one exemplary embodiment, the transceivers 594 coupled to the same connection 571 can be configured to transmit at a different frequency so that filtering techniques can be used by the transceiver 581 at the FDI 552 to recover the transmitted signals and to prevent interference.

In another embodiment, time division multiplexing (TDM) is used to provide separation for the signals transmitted by the transceivers 594 at different DPs 566. In this regard, for each connection 571, each transceiver 594 is assigned time slots in which to transmit such that, at any given time, only one transceiver 594 coupled to the same connection 571 is permitted to transmit. The time slots may be assigned by the transceiver 581 at the FDI 552 via a control channel or otherwise established. In another embodiment, Orthogonal Frequency Division-Multiple Access (OFDMA) may be used.

In yet another embodiment, pair division multiplexing is used. In pair division multiplexing, communication is divided across the connections 571. As an example, communication with one service unit 588 may occur over a subset of the connections 571 while communication with another service unit 588 occurs over another subset of the connections 571. Since the communication occurs over different connections 571, packets transmitted to or from one of the service units 588 do not travel across the same connections 571 as and, thus, do not interfere with the packets transmitted to or from the other service unit 588. Yet other techniques for communicating upstream from the DPs 566 to the FDI 552 are possible in other embodiments including combinations of the above mentioned techniques. Further, as will be described in more detail hereafter, the same or similar techniques described above for separating upstream traffic across the connections 571 may be employed to separate downstream traffic as well. As an example, the downstream traffic may be separated in frequency, in time, and/or by pairs.

To conserve bandwidth, multicast flows are transmitted across the PTM connections 571 on an as-needed basis. For example, assuming that the multicast flows define channels for IPTV, all of the channels that are available to the customer premises 56 are not simultaneously transmitted across the PTM connections 571. When a user at a customer premises 56 desires to begin viewing a new channel, a request (referred to as a "join request") is transmitted from the customer premises 56 upstream back to the FDI 552. Such join request, if accepted, is ultimately received by a video server (not specifically shown) that begins transmitting the requested multicast flow, which is received by the FDI 552 from the fiber 54 (FIG. 22) and transmitted across the PTM connections 571. When the user provides an input indicating that he or she is no longer interested in the multicast flow (e.g., changes channel or turns off the IPTV at the customer premises 56), a request, referred to hereafter as a "leave request," is transmitted from the customer premises 56 back to the FDI 552. Such leave request is ultimately received by the video server, which stops transmitting the multicast stream to the FDI 552 if no other users have requested such stream. Thus, if there are currently no users interested in a particular multicast flow, such multicast flow is not transmitted to the customer premises 56.

In one exemplary embodiment, the forwarding logic 577 (FIG. 23) is configured to monitor the join requests and leave requests to determine which multicast flows are of interest to which customers. In this regard, the forwarding logic 577 stores in memory 91 and maintains multicast flow data 599 based on the join requests and the leave requests. When the forwarding logic 577 receives a join request, the forwarding logic 577 updates the multicast flow data 599 to indicate that the requested multicast flow is currently of interest to the CP transceiver 117 that originally transmitted the join request.

As an example, the forwarding logic 577 may correlate in the data 599 the multicast flow identifier of the requested flow with an identifier (e.g., IP address) of the CP transceiver 117 that transmitted the join request. In one exemplary embodiment, the multicast flow data 599 includes an entry for each possible multicast flow that can be transmitted to the customer premises 56. When a join request is received, the forwarding logic 577 adds, to the entry for the requested multicast flow, the IP address (or other identifier) of the CP transceiver 117 that transmitted the join request. When a leave request for a particular multicast flow is received, the forwarding logic 577 removes, from the entry for the multicast flow, the IP address (or other identifier) of the CP transceiver 117 that transmitted the leave request. Accordingly, the identifiers of CP transceivers 117 stored within an entry for a multicast flow indicate the CP transceivers 117 that are currently interested in receiving the multicast flow. Various other techniques for tracking which multicast flows are of interest to which CP transceivers 117 are possible in other embodiments.

In one exemplary embodiment, the multicast flow data 599 is provisioned to indicate the data rate that is required to transmit each multicast flow and a maximum data rate for the bonding group 572. The forwarding logic 577 uses such information to manage the multicast flows and, specifically, to assign the multicast flows to the PTM bonding group 572. When the forwarding logic 577 is to begin transmitting a new multicast flow (e.g., upon receiving a join request for a flow not currently being transmitted), the forwarding logic 577 sums the data rate of the new flow with the data rates of all of the flows being transmitted across the connections 571. If such sum is less than the maximum data rate specified for the bonding group 572, then the forwarding logic 577 may assign the requested multicast flow to the bonding group 572. In such case, the forwarding logic 577 updates the multicast forwarding data 584 to indicate that packets having the multicast flow identifier for such flow are to be transmitted to the bonding engine 580.

Note that, depending on bandwidth availability, it is possible for the forwarding logic 577 to transmit unicast flows across the PTM connections 571 and to transmit multicast flows across the PTP connections 63. For example, assume that the aggregate data rate of the multicast flows traveling across the PTM connections 571 is less than the maximum data rate of the bonding group 572 such that there is at least some unused bandwidth for the connections 571. In such case, the forwarding logic 577 may forward data packets for at least some unicast flows to the bonding engine 580 for transmission across the PTM connections 571. Such packets will be received by each DP 566. However, for each packet, only one of the DPs 566 is coupled directly to the destination CP transceiver 117 via a drop connection 69. Such DP 566 forwards the packet to the destination CP transceiver 117. The other DPs 566 drop the data packet. In this regard, if a particular forwarding logic 592 (FIG. 24) is not configured to forward packets having a particular destination address to a particular transceiver 114, then the forwarding logic 592 drops the data packet. Accordingly, transmitting data packets for unicast flows across the PTM connections 571 should not cause any data errors but does allow available bandwidth for the connections 571 to be used for unicast flows.

In addition, assume that the forwarding logic 577 receives a join request for a multicast flow that is not currently being transmitted. Also, assume that there is insufficient bandwidth on the connections 571 to accommodate the requested multicast flow. In this regard, the summation of the data rate of the requested multicast flow with the data rates of the multicast flows currently transmitted across the PTM connections 571 exceeds the maximum data rate for the bonding group 572. In such case, the forwarding logic 577 is configured to update the multicast forwarding data 584 to indicate that the multicast flow is assigned to at least one of the PTP bonding groups 96-98, and the forwarding logic 577 is configured to update the multicast flow data 599 to indicate that the CP transceiver 117 that transmitted the join request is interested in the multicast flow. Therefore, the multicast flow is transmitted via the PTP connections 63.

In this regard, when the forwarding logic 577 receives a data packet of the requested multicast flow, the forwarding logic 577 based on the multicast forwarding data 584 determines that the data packet is to be transmitted via at least one PTP bonding group 96-98. Further, based on the multicast flow data 599, the forwarding logic 577 determines the address of the CP transceiver 117 that is interested in the multicast flow. The forwarding logic 577 then transmits the data packet to the connection 93 correlated with such address by the forwarding data 90 such that the packet is received by the bonding engine 92 that is used to service the flows for the destination CP transceiver 117. Accordingly, the multicast flow is transmitted via the PTP connections 63 rather than the PTM connections 571.

The forwarding logic 592 is configured to maintain data similar to the multicast flow data 599 so that the forwarding logic 592 is aware of which CP transceivers 117 are interested in the flow without having to be informed by the forwarding logic 577. Thus, if multiple CP transceivers 117 serviced by the same DP 566 are interested in a particular multicast flow that is transmitted via PTP connections 63, each packet of the multicast flow is transmitted only once to such DP 566. The forwarding logic 592 at such DP 566 then transmits each such packet to each CP transceiver 117 deemed by the forwarding logic 592 to be interested in the flow. Various other configurations for communicating a multicast flow over the PTP connections 63 are possible in other embodiments.

If multiple CP transceivers 117 serviced by multiple DPs 566 are interested in the same multicast flow assigned to the PTP connections 63, then the forwarding logic 577 is configured to send the multicast flow to each DP 566 servicing an interested CP transceiver 117. Thus, if the forwarding logic 577 receives a data packet of such a multicast flow, the forwarding logic 577 transmits the packet across multiple connections 93 and ultimately to multiple DPs 566. The forwarding logic 592 at any such DP 566 transmits the packet to one or more interested CP transceivers 177 according to the techniques described above.

As indicated above, using the PTM bonding group 572 to transmit a multicast flow is generally preferable so that the redundant transmission of multicast flows across multiple PTP bonding groups 96-98 to multiple DPs 566 can be prevented, but allowing the forwarding logic 577 to transmit at least some multicast flows across the PTP connections 63 during periods of congestion enables the forwarding logic 577 to provide multicast flows when there is insufficient capacity available for the PTM bonding group 572.

In one exemplary embodiment, the forwarding logic 577 prioritizes the flows based on priority data 603 (FIG. 23) stored in memory 91 and allocates the bandwidth provided by the PTM bonding group 572 based on such prioritization. In particular, all unicast flows are prioritized below multicast flows. Further, certain multicast flows are prioritized above other multicast flows, as indicated by the data 603. In one embodiment, the multicast flows are prioritized based on popularity, such as how often the multicast flows are requested by customers.

In this regard, some multicast flows are more popular than others. For example, when the multicast flows are for IPTV, it is to be expected that customers, as a whole, are likely to watch some channels more than others. The more popular channels are likely to be requested and watched more frequently. The priority data 603 prioritizes the multicast flows such that more popular flows are prioritized higher than less popular flows.

When there is insufficient capacity for the PTM bonding group 572 to transmit all requested channels, the forwarding logic 577 ensures that the higher prioritized flows are assigned to the PTM bonding group 572 at the expense of the lower priority flows. Thus, if a high priority flow has been requested but there is insufficient capacity to assign the flow to the PTM bonding group 572, the forwarding logic 577 analyzes the multicast forwarding data 584 and the priority data 603 to find the lowest priority flow that is currently being transmitted via the PTM bonding group 572. The forwarding logic 577 then bumps such lowest priority flow from the PTM bonding group 572 and assigns the higher priority flow to such bonding group 572. Thereafter, the higher priority flow is transmitted via the PTM bonding group 572 in lieu of the bumped flow, which may be transmitted via one or more PTP bonding groups 96-98, as described above.

Accordingly, when the summed bandwidth for all multicast flows exceeds the bandwidth available on PTM bonding group 571, the bandwidth provided by the PTM bonding group 572 is utilized for higher priority flows while lower priority flows, which can include lower priority multicast flows and/or unicast flows, are transmitted via the PTP bonding groups 96-98 as bandwidth for these bonding groups 96-98 allows. Prioritizing the flows such that more popular flows are communicated across the PTM bonding group 572 has the advantage of providing the more popular flows to a greater pool of subscribers.

Note that the priority data 603 may be provisioned to indicate the priority level of each multicast flow. Alternatively, the forwarding logic 577 may be configured to automatically learn the priority data 603. For example, the forwarding logic 577 may count the number of join requests received for each multicast flow over time. For each flow, such value indicates the popularity of the flow. Other types of popularity indicators may be used, such as channel ratings. The flows with the higher popularity indicators may be assigned a higher priority within the data 603 by the forwarding logic 577. If desired, the priority data 603 may be provisioned to indicate the expected popularity of the flows, and the forwarding logic 577 may update the prioritization based on monitoring of the join requests, as described above, or otherwise.

Note that the prioritization may take into account various factors in addition to or in lieu of popularity. As an example, the prioritization may be based on the number of customers currently interested in each respective multicast flow or a combination of such number along with a popularity indicator for each flow. As an example, a multicast flow currently being transmitted to a larger number of CP transceivers 117 may be assigned a higher priority than a more popular flow, which is currently being transmitted to a smaller number of CP transceivers 117. There are many different algorithms that may be used to prioritize multicast flows. Further, it is possible for multicast flows to be prioritized in groups. For example, a group of the most popular multicast flows may be assigned the highest priority, and a group of the least popular multicast flows may be assigned the lowest priority. Various other prioritization schemes may be used in other embodiments.

In the embodiment described below with reference to FIG. 25, the priority assigned to each multicast flow is represented by a weighted value. The weighted value may be proportional to the popularity of the flow, as determined by the average number of destinations requesting the flow, or it may be determined by other means. In this embodiment, the priorities (or weights) of several flows may be added together to arrive at the equivalent priority or weight of the several flows when compared as a group to a separate flow or group of flows An exemplary use and operation of the system 500 will now be described with reference to FIG. 25. For illustrative purposes, it will be assumed that the priority data 603 (FIG. 23) is provisioned or otherwise defined to indicate a priority value (P) for each flow that may be received by the forwarding logic 577. A higher priority value indicates a higher priority. For example, a flow associated with a priority value that is higher than the priority value associated with another flow has a higher priority than the other flow. Further, the difference between the priority values indicates the degree to which the higher priority flow is prioritized higher than the other flow. As used in the instant example, a flow's "priority" refers to the priority value in the data 603 that is associated with the flow. The term "priority value" and "priority" may be used interchangeably hereafter.

Figure 25:
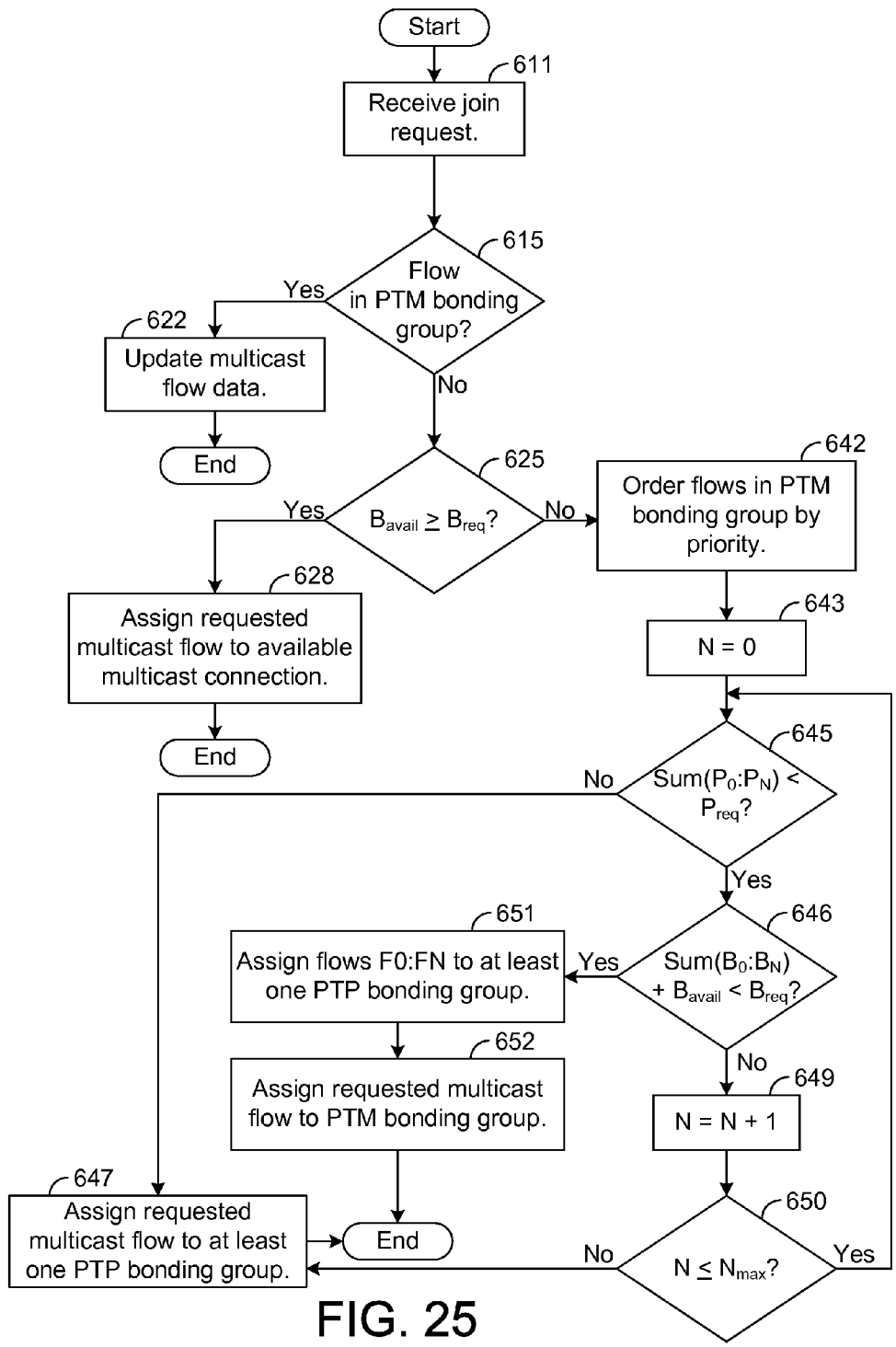
FIG. 25 is a flow chart illustrating an exemplary method of assigning multicast flows to point-to-point (PTP) and point-to-multipoint (PTM) bonding groups.

For illustrative purposes, assume that a join request for a multicast flow, referred to hereafter as the "requested flow," is received in block 611 of FIG. 25 by the forwarding logic 577 from a CP transceiver 117, referred to hereafter as the "requesting transceiver 117." In block 615, the forwarding logic 577 checks the multicast forwarding data 584 to determine whether the requested flow is currently being transmitted via the PTM bonding group 572. If so, the forwarding logic 577 updates the multicast flow data 599 to correlate the address of the requesting transceiver 117 with the multicast flow identifier, as shown by block 622, thereby indicating that the requesting transceiver 117 is interested in the requested flow.

However, if the requested flow is not currently being transmitted via the PTM bonding group 572, the forwarding logic 577 determines whether the available bandwidth $B_{avail}$ in the PTM bonding group 572 is equal to or greater than the bandwidth $B_{req}$ required to transmit the requested flow, as shown by block 625 of FIG. 25. In this regard, the forwarding logic 577 subtracts the summed data rates of all of the flows currently assigned to the PTM bonding group 572, as indicated by the multicast flow data 599 and the multicast forwarding data 584, from the maximum data rate specified for the PTM bonding group 572 by the multicast flow data 599 or otherwise, to determine the available bandwidth $B_{avail}$. The forwarding logic 577 then compares $B_{avail}$ with $B_{req}$.

If $B_{avail}$ is greater than or equal to $B_{req}$, then the PTM bonding group 572 is determined to be available, and the forwarding logic 577 assigns the requested flow to such bonding group 572, as indicated by block 628. That is, the forwarding logic 577 updates the multicast forwarding data 584 to indicate that the requested flow is to be forwarded via the connection 582 to the bonding engine 580, and the forwarding logic 577 updates the multicast flow data 599 to indicate that the requested flow is of interest to (e.g., being transmitted to) the requesting transceiver 117.

If $B_{avail}$ is less than $B_{req}$ in block 625, then the forwarding logic 577 begins an iterative process to determine whether to replace one or more flows currently in the PTM bonding group 572 with the requested flow. The process begins with the flows in the PTM bonding group 572 ordered by priority, with $P_0 < P_1 < \ldots < P_{max}$, as indicated by block 642. Forwarding logic 577 then initializes an iteration index N to 0 as shown by block 643. The forwarding logic 577 then compares the sum of the priorities for the (N+1) lowest priority flows (sum($P_0$:$P_N$)) to the priority of the requested flow ($P_{Req}$), as shown by block 645. If sum($P_0$:$P_N$) is greater than $P_{Req}$, then the priority of the requested flow is lower than the priority of the flows it would replace which are currently transmitted via the PTM bonding group 572. In such case, the forwarding logic 577 assigns the requested flow to the PTP bonding groups 96-98, as shown by block 647. That is, the forwarding logic 577 updates the multicast forwarding data 584 to indicate that the requested flow is to be appropriately forwarded such that it is transmitted to the bonding engine 92 servicing the DP 566 that is coupled directly to the requesting transceiver 117 by a drop connection 96, and the forwarding logic 577 updates the multicast flow data 599 to indicate that the requested flow is of interest to (e.g., being transmitted to) the requesting transceiver 117.

If sum($P_0$:$P_N$) is less than $P_{Req}$, then the priority of the requested flow is greater than the summed priority of the first (N+1) flows identified in block 642. In such case, the forwarding logic 577 then compares the summed bandwidth required for the first (N+1) flows plus the available bandwidth (sum($B_0$:$B_N$)+$B_{avail}$) to the bandwidth required by the requested flow ($B_{Req}$) as shown in block 646. If sum($B_0$:$B_N$)+$B_{avail}$ is greater than or equal to $B_{Req}$, then the forwarding logic 577 bumps the identified flows $F_0$ through $F_N$ from the PTM bonding group 572 in favor of the requested flow. That is, the forwarding logic 577 re-assigns the flows $F_0$ through $F_N$ to the PTP bonding groups 96-98, as shown by block 651. In this regard, the forwarding logic 577 updates the multicast forwarding data 584 to indicate that the flows $F_0$ through $F_N$ are to be appropriately forwarded such that they are transmitted via the at least one PTP bonding group 96-98 as appropriate to arrive at their intended destinations. The forwarding logic 577 then assigns the requested flow to the PTM bonding group 572, as shown by block 652. Thus, the forwarding logic 577 updates the multicast forwarding data 584 to indicate that the requested flow is to be appropriately forwarded such that it is carried by the PTM bonding group 572, and the forwarding logic 577 updates the multicast flow data 599 to indicate that the requested flow is of interest to (e.g., being transmitted to) the requesting transceiver 117.

If sum($B_0$:$B_N$)+$B_{avail}$ is less than $B_{Req}$, then the forwarding logic 577 increments iteration index N by 1 as shown in block 649. The forwarding logic 577 then compares the index to the maximum index $N_{max}$ for the flows in the PTM bonding group. If N is greater than $N_{max}$, then there are no more flows in the PTM bonding group to test. In such case, the forwarding logic 577 assigns the requested flow to the PTP bonding groups 96-98, as shown by block 647 and described above.

If the new value of N is less than or equal to $N_{max}$, then the forwarding logic 577 once again compares the sum of the priorities for the (N+1) lowest priority flows (sum($P_0$:$P_N$)) to the priority of the requested flow ($P_{Req}$), as shown by block 645. The process continues in an iterative manner until either the requested flow is assigned to at least one PTP bonding group as shown in block 647, or the requested flow bumps one or more flows from the PTM bonding group as shown in blocks 651 and 652.

As shown by the example described above, when there is insufficient capacity to add a requested multicast flow to the PTM bonding group 572, the flows allocated to the PTM bonding group 572 are prioritized such that the higher priority flows are assigned to such bonding group 572 at the expense of at least one lower priority flow.

In the embodiment of FIG. 25, it is assumed that there is sufficient capacity for the PTP bonding groups 96-98 to accept the bumped flow. If the bonding groups 96-98 do not have enough capacity to accept the bumped flow, then a sufficient number of the lowest priority flows being transmitted by the PTP bonding groups 96-98 may be dropped to provide enough capacity for the flow bumped from the PTM connections 571. Alternatively, the flow bumped from the PTM connections 571 may be dropped. Various other algorithms for selecting which flows to bump and/or drop are possible in other embodiments.

When DPs are connected to one another, such as shown by FIG. 14, it is unnecessary for the multicast flows to be communicated via a PTM bonding group that is separate from PTP bonding groups. For example, in FIG. 14, both multicast flows and unicast flows may be communicated via the bonding groups 375, 399, and 401. In such an embodiment, the bonding engine 393 of FIG. 16 recovers the packets of the multicast flows as it does for the packets of the unicast flows. The forwarding logic 394 forwards each packet of the multicast flows to the bonding engine 396 so that each multicast flow is communicated downstream to the next DP 366. Further, any multicast packet forwarded to the bonding engine 396 may also be forwarded to a transceiver 114, if a CP transceiver 117 (not shown in FIG. 16) at a customer premises 56 shown in FIG. 16 is interested in the packet. In such an embodiment, each multicast packet is received at each DP 366, similar to the packets of multicast flows transmitted by the PTM connections 571 in the embodiment shown by FIG. 22.

Figure 26:
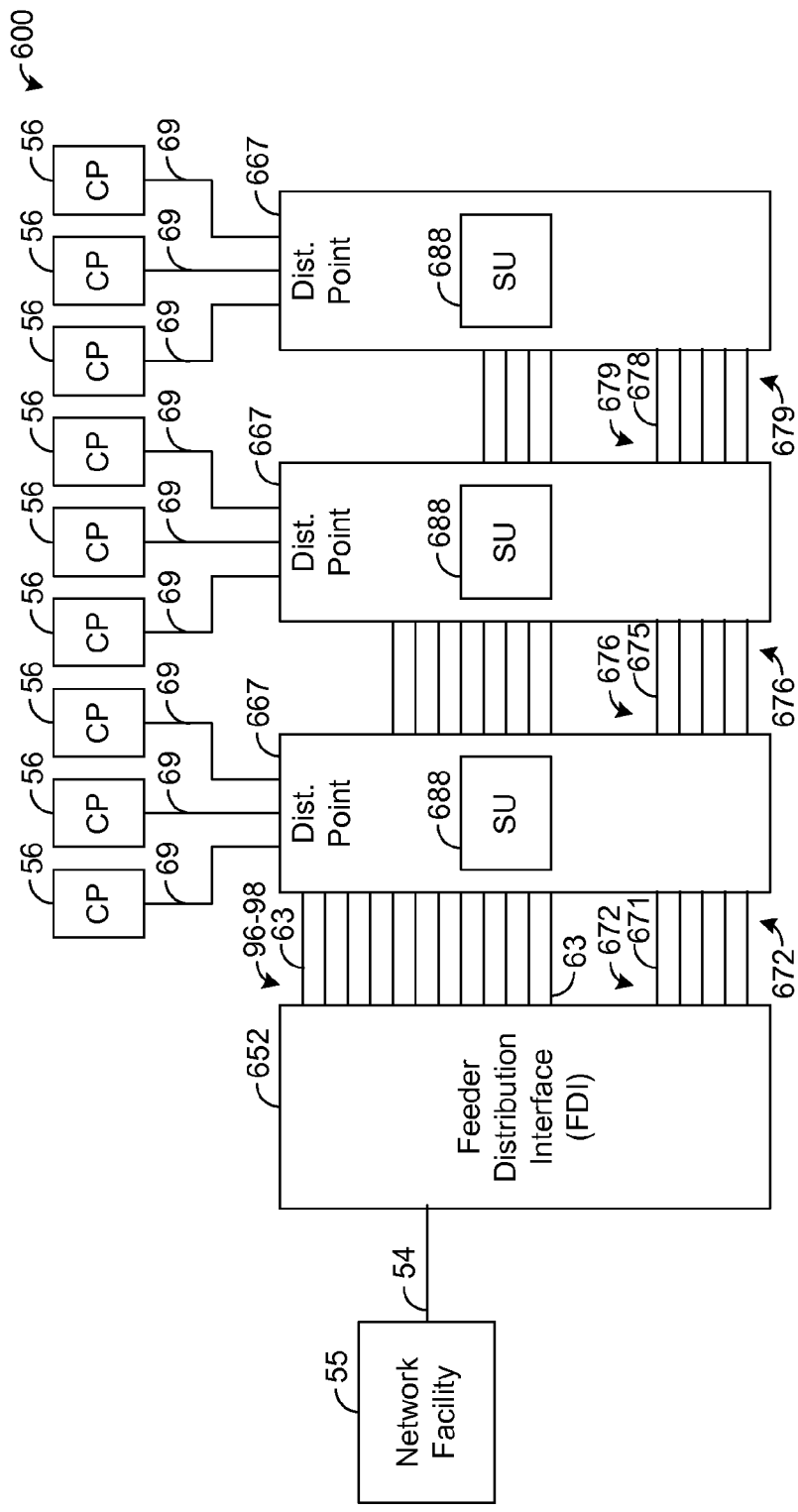
FIG. 26 is a block diagram illustrating an exemplary embodiment of a communication system in accordance with the present disclosure.

FIG. 26 depicts an exemplary embodiment of a communication system 600 that communicates unicast and multicast flows in a repeatered embodiment similar to the embodiment depicted by FIGS. 12 and 13. The system 600 has an FDI 652 that is configured similar to the FDI 352 of FIG. 15 except that it includes forwarding logic (not shown) for forwarding packets of at least some multicast flows to PTP communication connections 671, such as twisted-wire pairs. For example, the forwarding logic may forward high priority multicast flows to the connections 671, similar to the manner described above for forwarding high priority multicast flows to the connections 571 in the embodiment depicted by FIG. 22. In one exemplary embodiment, the connections 671 are bonded to form a bonding group 672, and each connection 671 extends from the FDI 652 to one of the DPs 667 depicted by FIG. 26.

The multicast flows carried by the bonding group 672 are repeated (e.g., amplified or regenerated) at each DP 667 until all of the DPs 667 are reached by the multicast flows. In this regard, the multicast flows carried by the connections 671 are also carried by PTP connections 675 and by PTP connections 678. In one exemplary embodiment, the connections 675 are bonded to form a bonding group 676, and the connections 678 are bonded to form a bonding group 679. Further, each DP 667 has access to each multicast packet from such flows such that the DP 667 can forward the multicast packets to any CP transceiver 117 coupled directly to it via drop connections 69. As an example, if a DP 667 receives the multicast flows via a bonding group, the DP 667 recovers the multicast data packets by reassembling the fragments from such bonding group. Thus, any multicast flow carried by the connections 671 may be received at any customer premises 56, similar to the embodiment depicted by FIG. 22.

In the embodiment depicted by FIG. 26, at least some multicast flows are communicated by the bonding group 672 while other flows, such as unicast flows and/or low priority multicast flows, are communicated via the connections 63, which can be bonded to form bonding groups 96-98, as described above. As an example, the flows carried by the connections 63 may be communicated from DP-to-DP as described above in the embodiment depicted by FIG. 12 or in the embodiment depicted by FIG. 14. Further, if desired, such as when there is available bandwidth on the connections 671, unicast flows may be forwarded to the bonding group 672, similar to how unicast flows may be forwarded to the bonding group 572 for the embodiment depicted by FIG. 22.

Figure 27:
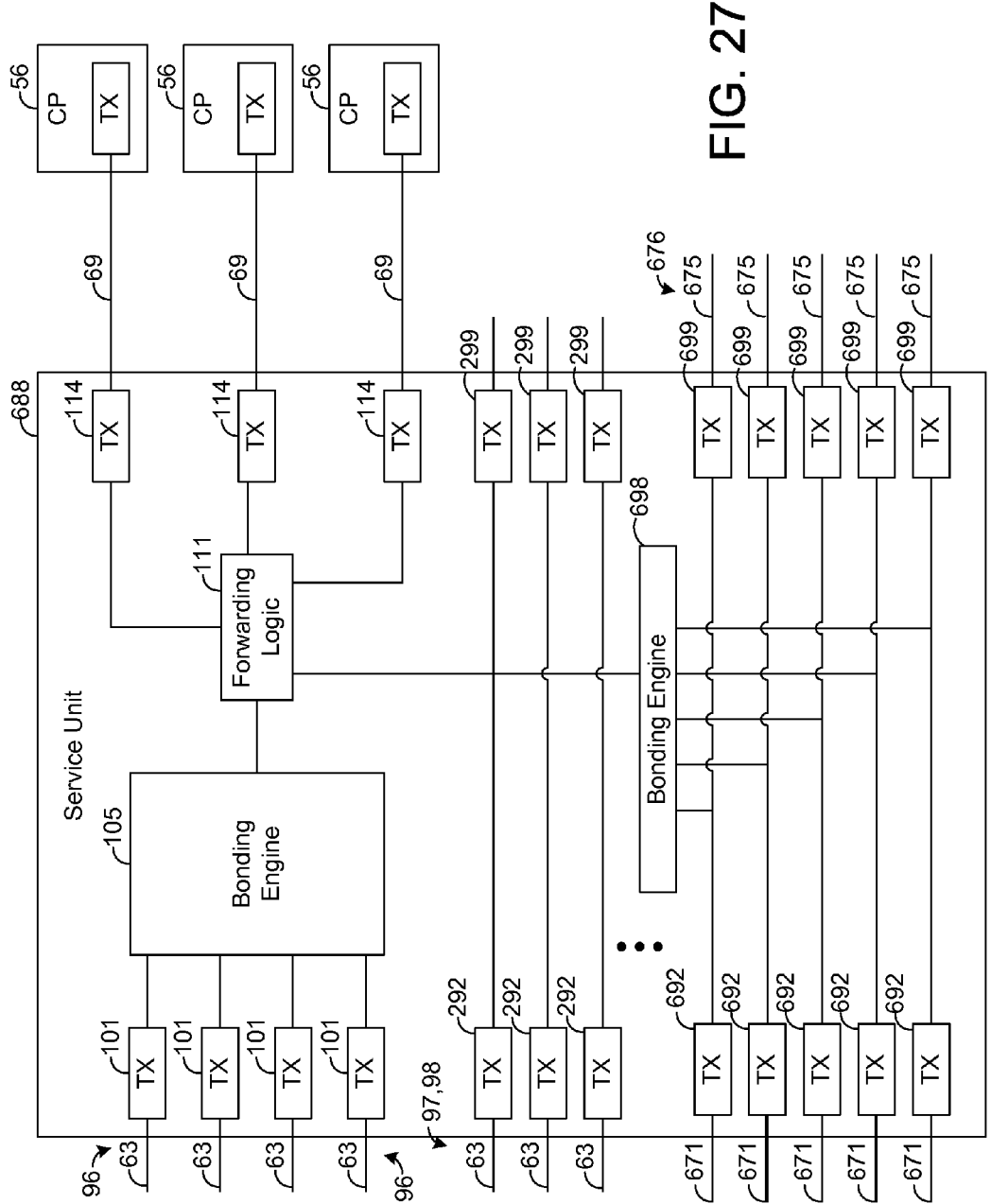
FIG. 27 is a block diagram illustrating an exemplary embodiment of a service unit, such as is depicted by FIG. 26.

FIG. 27 depicts an exemplary embodiment of the service unit 688 at the DP 667 that is coupled directly to the FDI 652 of FIG. 26. In the embodiment depicted by FIG. 27, the service unit 688 is configured to process data from the connections 63 as described above for the embodiment depicted by FIG. 13. However, the service unit 688 also has a plurality of transceivers 692 respectively coupled to the connections 671. The transceivers 692 demodulate the signals received from the connections 671 to recover the data, such as fragments, carried by the signals. The data is transmitted to transceivers 699, which regenerate the signals received by the transceivers 692.

A bonding engine 698 receives the data transmitted by the transceivers 692 and recovers the multicast data packets defined by such data. The bonding engine 698 transmits such packets to the forwarding logic 111, such that the forwarding logic 111 may forward to the transceivers 114 any of the multicast data packets of interest to CP transceivers 117 coupled to such transceivers 114. The other downstream service units 688 of FIG. 26 may be configured similar to the one shown by FIG. 27 such that the multicast data packets are transmitted from DP-to-DP until the multicast data packets reach all of the DPs 667. Other configurations of the service unit 688 are possible in other embodiments.

Figure 28:
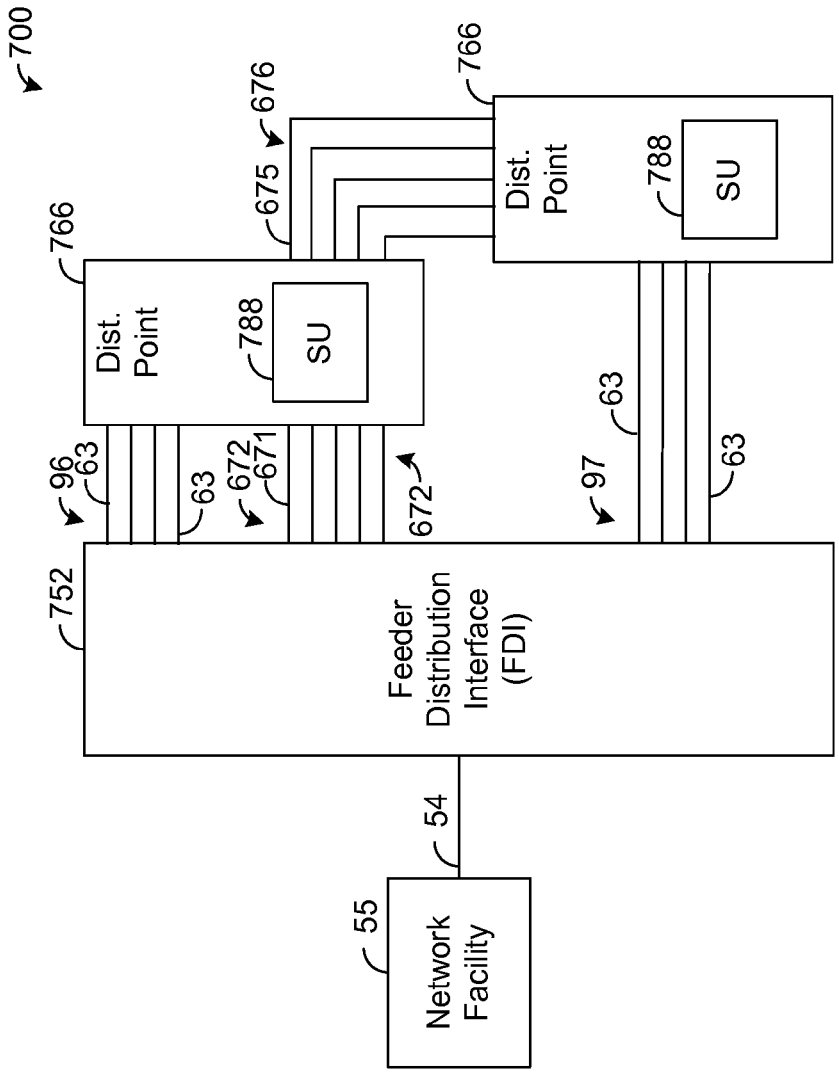
FIG. 28 is a block diagram illustrating an exemplary embodiment of a communication system in accordance with the present disclosure.

Note that multicast flows may be similarly transmitted from DP-to-DP in embodiments in which other flows are transmitted from the FDI directly to at least some DPs. FIG. 28 depicts such an embodiment of a communication system 700. The system 700 has a plurality of DPs 766, and each DP 766 has a service unit 788 that is coupled directly to an FDI 752 via connections 63. In this regard, one DP 766 is coupled to the FDI 752 via a bonding group 96, and another DP 766 is coupled to the FDI 752 via a bonding group 97. The flows transmitted across the connections 63 may be processed at the DPs 766 similar to the embodiment depicted by FIG. 5 or otherwise. Further, flows (e.g., high priority multicast flows) may be transmitted across connections 671 and 675 and handled by the service units 788, as described above for the embodiment depicted by FIG. 26.

Figure 29:
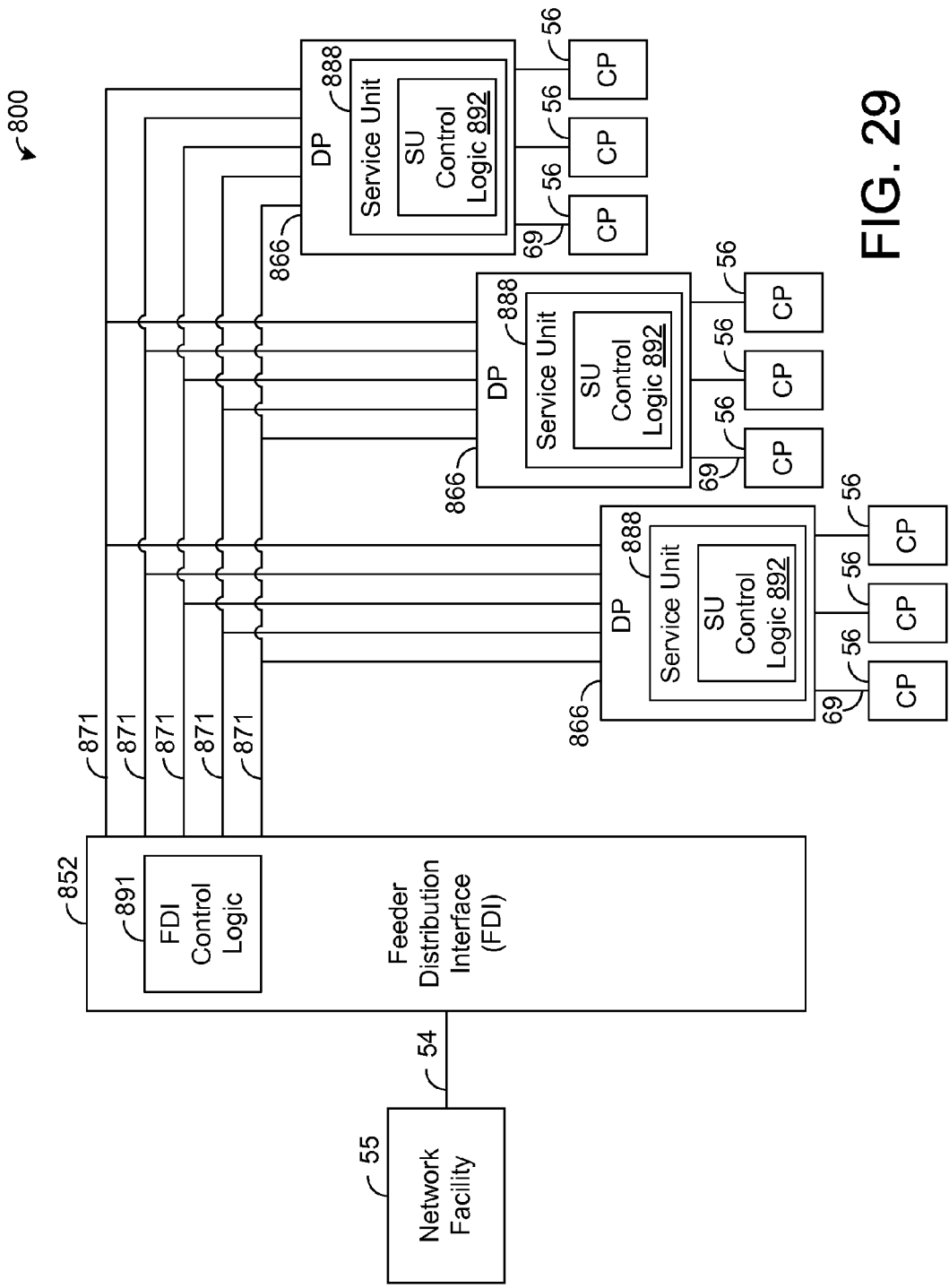
FIG. 29 is a block diagram illustrating an exemplary embodiment of a communication system in accordance with the present disclosure.

It should be further noted that it is not necessary for PTP connections to extend to any of the DPs. FIG. 29 depicts a system 800 similar to the embodiment of FIG. 22 except that the system 800 has no PTP connections 63. In such an embodiment, all of the unicast and multicast flows are communicated across a plurality of PTM connections 871. In this regard, each PTM connection 871 is coupled to a respective transceiver (not shown in FIG. 29) at an FDI 852 and to each of a plurality of service units 888 residing at a plurality of DPs 866. As described for the embodiment depicted by FIG. 22, the connections 871 may be bonded to form one or more bonding groups. However, the communication occurring over the connections 871 may be dynamically changed.

In this regard, the FDI 852 has control logic 891, referred to as "FDI control logic," for controlling communication at the FDI 852, and each service unit 888 has control logic 892, referred to as "SU control logic," for controlling communication at the service unit 888. The FDI control logic 891 and the SU control logic 892 may be implemented in hardware, software, firmware, or any combination thereof. When implemented in software, the control logic 891 and/or 892 may be executed by at least one instruction processing element, such as a DSP or CPU.

The FDI control logic 891 communicates with the SU control logic 892 via a control channel or otherwise to implement desired changes in the communication occurring across the connections 871. As a mere example, it may be desirable to change the allocation of the connections 871. For example, a few of the connections 871 may be bonded for form one bonding group, and other ones of the connections 871 may be bonded to form another bonding group. Indeed, the number of bonding groups that may be formed is limited only by the number of connections 871 in the system 892.

As a mere example, the FDI 852 may receive a burst of unicast data packets to transmit to a particular one of the service units 866. In such case, it may be more efficient to transmit such unicast data packets across a subset of the connections 871 rather than transmitting the packets across all of the connections 871 as may occur when the connections 871 form a single, large bonding group. In this regard, the modulation techniques or data rates used by the FDI 852 may be generally limited or selected depending on the distance between the FDI 852 and the DP 866 that is furthest from the FDI 852. For a limited time, the control logic 891 may allocate a subset of the connections 871 for the unicast data packets to be transmitted to one or more DPs 866 that are closer to the FDI 852 such that the subset of connections 871 is temporarily dedicated to such one or more DPs 866. For illustrative purposes, it will be assumed hereafter that the subset of connections 871 is dedicated to a single DP 866 via pair division multiplexing.

If desired, the subset of connections 871 may be bonded to form a bonding group separate from the bonding groups, if any, implemented by the other connections 871. For the limited time that the subset of connections 871 is allocated to the foregoing DP 888, different modulation formats, data rates, or other communication parameters or techniques may be used to transmit the unicast data packets to such DP 866 thereby reducing the time required to communicate such unicast data packets. While the unicast data packets are being transmitted across the subset of connections 871, data for other ones of the service units 888 may be communicated across the remaining connections 871 via different modulation formats, data rates, or other communication parameters or techniques. Once the burst of unicast data packets has been handled, the communication across the connections 871 may again be changed as may be desired depending on the current conditions.

Any known multiple access protocol, such as time division multiplexing, frequency division multiplexing, or pair division multiplexing, may be used to separate traffic in either direction across the connections 871. Further, the protocols and communication techniques (such as which of the connections 871 are bonded, if any) used for the communication across the connections 871 may dynamically change in any desired manner. Similar techniques for dynamically changing the communication occurring across the connections 871 may be employed in other embodiment, such as the embodiment depicted by FIG. 22.

In various embodiments described herein, communication connections extending to a DP are used to form a shared channel such that data of a given flow can be carried by any of the communication connections of the shared channel to achieve an aggregated data rate for the flow that is greater than the data rate for any single one of the connections. As described herein, bonding can be used to utilize a plurality of communication connections as a shared channel to achieve such an aggregated data rate. However, other techniques for providing such a shared channel are possible, and each of the communication connections is shared by each of a plurality of CP transceivers 117 at multiple customer premises 56.

As an example, link aggregation is a known technique for providing a shared channel via a plurality of communication connections, which also may be referred to as "communication links" or just "links." In link aggregation, logic similar to the bonding engines described herein selectively forwards packets of a flow down any of a plurality of links, referred to as "aggregated links," but does so without fragmenting the packets as is done in bonding. Thus, a given link can carry packets for any of a plurality of customer premises, and the aggregated links are effectively shared among a plurality of subscribers. Link aggregation is described by IEEE 802.3ad.

Although packets of the same flow can be sent across multiple links of a group of aggregated links, some protocols (such as Transmission Control Protocol (TCP)) can be adversely affected by packet reordering. To avoid such adverse effects, packets of the same flow are normally transmitted across the same link in link aggregation. As such, the peak data rate afforded to a customer for a particular flow may be limited relative to a comparable embodiment that employs bonding instead. Nevertheless, it is possible to employ link aggregation instead of bonding in the any of the embodiments described herein.

In this regard, for any embodiment, the bonding engines may be replaced with logic for performing link aggregation. As an example, in FIG. 23, link aggregation logic (not shown) may be used in place of the bonding engine 580 to aggregate the connections 571. Also, link aggregation logic (not shown) may be used in place of any of the bonding engines 92 to aggregate a group of the connections 63 described above as being bonded by the replaced bonding engine 92. In yet other embodiments, other techniques are possible for sharing a group of connections in the distribution plant among a plurality of subscribers in order to achieve a higher data rate for a given flow than is afforded by any one of the connections.

It should also be noted that it is possible for any of the service units 288, 388, 588, and 688 to be configured similar to the service unit 88 shown by FIGS. 5-8, 10, and 11. Indeed, any of the service units 288, 388, 588, and 688 may have a power management unit 125, a wireless access point 133, and/or an optical interface 141, as shown for service unit 88. However, such components are not depicted in the service units 288, 388, 588, and 688 for simplicity of illustration.

In some embodiments described above, the CP side of service units are coupled to a plurality of customer premises. However, in any of the embodiments, the CP side of any service unit can be coupled to one or more CP transceivers 117 at a single customer premises, if desired.

Now, therefore, the following is claimed:

1. A service unit for use at a distribution point between a network facility and a plurality of customer premises, comprising:
   a first plurality of transceivers, including at least a first transceiver and a second transceiver, coupled to a plurality of customer premises (CP) transceivers via drop connections, each of the drop connections coupled to a respective one of the CP transceivers;
   a second plurality of transceivers coupled to the network facility via a plurality of communication connections, each of the communication connections shared by each of the CP transceivers;
   forwarding logic configured to forward data packets to the first plurality of transceivers, wherein the data packets include data received by the second plurality of transceivers; and
   a power management unit configured to receive electrical power from at least one of the drop connections and to power at least one component of the service unit based on the received electrical power, the power management unit configured to estimate an amount of the electrical power received from at least one of the drop connections and to determine whether to activate at least one of the second plurality of transceivers based on the estimate, the power management unit further configured to control an activation state of the second transceiver based on the estimated amount of the electrical power received from the at least one drop connection such that the second transceiver is not activated while the first transceiver is activated, wherein the activation state of the second transceiver affects an aggregate data rate for the plurality of CP transceivers without the activation state preventing any of the plurality of CP transceivers from receiving services via the plurality of communication connections.

2. The service unit of claim 1, wherein a data rate for at least one of the CP transceivers at one of the customer premises is increased in response to at least one of the CP transceivers at another of the customer premises transitioning to an inactive state.

3. The service unit of claim 1, wherein the communication connections are bonded, and wherein the service unit comprises a bonding engine configured to receive fragments from the second plurality of transceivers and to reassemble the received fragments into the data packets, the bonding logic further configured to provide the data packets to the forwarding logic.

4. The service unit of claim 1, wherein the power management element is configured to provide power to at least one of the second plurality of transceivers based on the estimate.

5. The service unit of claim 1, wherein the power management unit comprises a power aggregation circuit coupled to each of the drop connections, the power aggregation circuit configured to aggregate electrical power from a plurality of the drop connections thereby providing a power signal.

6. The service unit of claim 5, further comprising a voltage regulator configured to regulate the power signal thereby providing an output signal with a regulated voltage, wherein the at least one component is powered by the output signal.

7. The service unit of claim 1, wherein the power management unit is configured to deactivate at least one component of the service unit based on an estimate of an amount of electrical power received from the at least one drop connection.

8. The service unit of claim 1, wherein the power management unit is configured to deactivate one of the second plurality of transceivers based on an estimate of electrical power received from the at least one drop connection thereby reducing an aggregate data rate for the plurality of CP transceivers.

9. The service unit of claim 1, wherein the power management unit comprises a power sensing element configured to sense the amount of the electrical power received from the at least one drop connection, and wherein the estimate is based on the power sensing element.

10. The service unit of claim 1, wherein the power management unit comprises control logic configured to determine from which of the drop connections the power management unit is currently receiving at least a portion of the electrical power.

11. The service unit of claim 10, wherein the control logic is configured to select one of the first plurality of transceivers for deactivation in response to a determination that the power management unit is not currently receiving electrical power from one of the drop connections coupled to the selected transceiver, wherein the control logic is further configured to deactivate the selected transceiver based on the determination without deactivating at least one of the first plurality of transceivers that is coupled to at least one of the drop connections from which the power management logic is currently receiving electrical power.

12. The service unit of claim 10, wherein the power management unit is configured to store data indicating a predefined estimate of an amount of electrical power expected from at least one of the drop connections, and wherein the control logic is configured to determine the estimate of the amount of the electrical power received by the power management unit based on the predefined estimate.

13. The service unit of claim 12, wherein the control logic is configured to determine a number of the drop connections from which the power management unit is currently receiving electrical power and to mathematically combine the number with the predefined estimate in order to estimate the amount of the electrical power received by the power management unit.

14. The service unit of claim 1, wherein the power management unit is configured to determine a number of the second plurality of transceivers to be deactivated to ensure that an estimated amount of electrical power received from the at least one drop connection exceeds an estimated amount of electrical power required by the service unit, and wherein the power management unit is configured to deactivate the number of the second plurality of transceivers while at least one of the second plurality of transceivers remains activated thereby reducing an aggregate data rate for the plurality of CP transceivers.

15. A method for use at a distribution point between a network facility and at least one customer premises, comprising the steps of:
  providing a service unit at the distribution point, the service unit having a first plurality of transceivers coupled to a plurality of customer premises (CP) transceivers via drop connections and a second plurality of transceivers coupled to the network facility via a plurality of communication connections, the second plurality of transceivers including at least a first transceiver and a second transceiver, wherein each of the communication connections is shared by each of the CP transceivers;
  receiving via the second plurality of transceivers modulated signals carrying data defining a plurality of data packets;
  forwarding the data packets to the first plurality of transceivers;
  receiving electrical power from at least one of the drop connections;
  powering at least one component of the service unit based on the received electrical power;
  estimating an amount of the electrical power received from the at least one drop connection;
  determining whether to activate at least one of the second plurality of transceivers based on the estimating step; and
  controlling activation states of the first transceiver and the second transceiver based on the determining step such that the second transceiver is not activated while the first transceiver is activated, wherein the controlling step affects an aggregate data rate for the plurality of CP transceivers without the controlling step preventing any of the plurality of CP transceivers from receiving services via the plurality of communication connections.

16. The method of claim 15, further comprising the step of increasing a data rate for at least one of the CP transceivers at one of the customer premises in response to at least one of the CP transceivers at another of the customer premises transitioning to an inactive state.

17. The method of claim 15, wherein the communication connections are bonded, the method further comprising the steps of:
  receiving fragments from the second plurality of transceivers; and
  reassembling the fragments to recover the data packets.

18. The method of claim 15, further comprising the steps of:
  determining whether to deactivate at least one of the second plurality of transceivers based on an amount of electrical power received from the at least one drop connection; and
  deactivating one of the second plurality of transceivers based on the determining whether to deactivate step while at least one of the second plurality of transceivers remains activated thereby reducing an aggregate data rate for the plurality of CP transceivers.

19. The method of claim 15, further comprising the step of determining which of the drop connections are providing at least a portion of the received electrical power.

20. The method of claim 19, further comprising the steps of:
selecting one of the first plurality of transceivers for deactivation in response to a determination that one of the drop connections coupled to the selected transceiver is not providing at least a portion of the received electrical power; and
deactivating the selected transceiver based on the selecting step while at least one of the first plurality of transceivers coupled to at least one of the drop connections is determined to be providing at least a portion of the received electrical power remains activated.

21. The method of claim 19, further comprising the step of storing, in memory, data indicating a predefined estimate of an amount of electrical power expected from at least one of the drop connections, wherein the estimating step is based on the predefined estimate.

22. The method of claim 21, further comprising the steps of:
determining a number of the drop connections currently providing at least a portion of the received electrical power; and
mathematically combining the number with the predefined estimate.

23. The method of claim 15, wherein the estimating step comprises the steps of estimating a second power value based on the amount of the electrical power received from the at least one drop connection and determining which of the drop connections are currently providing the electrical power to the service unit, and wherein the method further comprises the steps of:
storing, in memory, predefined power indicators for a plurality of components of the service unit, each of the power indicators indicating an amount of electrical power estimated to be used by a respective one of the plurality of components;
selectively activating and deactivating each of the plurality of components;
combining the power indicators for the plurality of components that are currently activated thereby determining a first power value indicative of an estimated amount of electrical power required by the service unit;
comparing the first and second power values; and
selecting at least one of the plurality of components for activation based on the comparing step.

24. The service unit of claim 1, further comprising memory for storing predefined power indicators for a plurality of components of the service unit, each of the power indicators indicating an amount of electrical power estimated to be used by a respective one of the plurality of components, wherein the power management unit comprises control logic configured to selectively activate and deactivate each of the plurality of components, wherein the control logic is configured to combine the power indicators for the plurality of components that are currently activated in order to determine a first power value indicative of an estimated amount of electrical power required by the service unit, wherein the control logic is configured to estimate a second power value based on the estimated amount of electrical power received from the at least one drop connection, the second power value based on a determination by the control logic as to which of the drop connections are currently providing electrical power to the service unit, and wherein the control logic is configured to perform a comparison between the first and second power values and to select at least one of the plurality of components for activation based on the comparison.

25. The service unit of claim 1, wherein the power management unit is configured to activate a number of the second plurality of transceivers based on the estimate such that the estimated amount of the electrical power exceeds an estimated amount of electrical power required by the service unit, and wherein the number of the second plurality of transceivers activated by the power management unit affects an aggregate data rate for the plurality of CP transceivers.

26. The service unit of claim 1, wherein the power management unit is configured to ensure sufficient power availability for powering the service unit by controlling activation states of the second plurality of transceivers based on the estimate such that each of the CP transceivers providing a portion of the electrical power receives service from the service unit at a respective data rate based on a number of the second plurality of transceivers activated by the power management unit.

27. The method of claim 15, further comprising the step of ensuring sufficient power availability for powering the service unit by controlling activation states of the second plurality of transceivers based on the estimating step such that each of the CP transceivers providing a portion of the electrical power receives service from the service unit at a respective data rate based on a number of the second plurality of transceivers that are activated.

* * * * *